United States Patent
Haney et al.

(10) Patent No.: US 7,360,683 B2
(45) Date of Patent: Apr. 22, 2008

(54) AUTOMATED TRANSACTION MACHINE WITH SHEET ACCUMULATOR AND PRESENTER MECHANISM

(75) Inventors: Sean Haney, North Canton, OH (US); Mark D. Smith, North Canton, OH (US); Nat Ramachandran, Uniontown, OH (US); Matthew Force, Uniontown, OH (US); H. Thomas Graef, Bolivar, OH (US); Robert G. Miller, Bath, OH (US); Mark Owens, Epping (AU); Andrew Junkins, Round Rock, TX (US); Elizabeth M. Herrera, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 1696 days.

(21) Appl. No.: 09/967,327

(22) Filed: Sep. 27, 2001

(65) Prior Publication Data
US 2002/0053594 A1    May 9, 2002

Related U.S. Application Data

(60) Provisional application No. 60/236,489, filed on Sep. 29, 2000.

(51) Int. Cl.
*G07F 19/00* (2006.01)
(52) U.S. Cl. .................................. 235/379; 705/43
(58) Field of Classification Search ............... 235/381, 235/379; 705/43; 271/3.2; 270/60
See application file for complete search history.

(56) References Cited

U.S. PATENT DOCUMENTS

| | | | |
|---|---|---|---|
| 4,822,018 A * | 4/1989 | Hain | 271/3.2 |
| 5,186,334 A | 2/1993 | Fukudome et al. | |
| 5,247,159 A | 9/1993 | Yuge et al. | |
| 5,735,516 A * | 4/1998 | Gerlier et al. | 270/60 |
| 6,109,522 A | 8/2000 | Force et al. | |
| 6,270,010 B1 | 8/2001 | Junkins et al. | |
| 6,273,413 B1 | 8/2001 | Graef | |
| 6,296,242 B1 | 10/2001 | Saltsov et al. | |

* cited by examiner

*Primary Examiner*—Michael G. Lee
*Assistant Examiner*—Kristy A. Haupt
(74) *Attorney, Agent, or Firm*—Ralph E. Jocke; Daniel D. Wasil; Walker & Jocke

(57) ABSTRACT

An automated transaction machine (600) includes a note receiving storage and dispensing mechanism (624). The mechanism (624) includes a stacker mechanism (654). The stacker mechanism collects in a stack notes such as currency bills that are to be dispensed from the machine to a user, and the stack is then presented to the user from the machine. The stacker mechanism includes a stack support member (668), a flexible member (692) and spaced supports (694). Notes are engaged in supporting connection with the stack support member as the stack support member is rotated in a first rotational direction. After the stack is accumulated, rotation of the stack support member in an opposed rotational direction delivers the stack from the stacker mechanism.

37 Claims, 54 Drawing Sheets

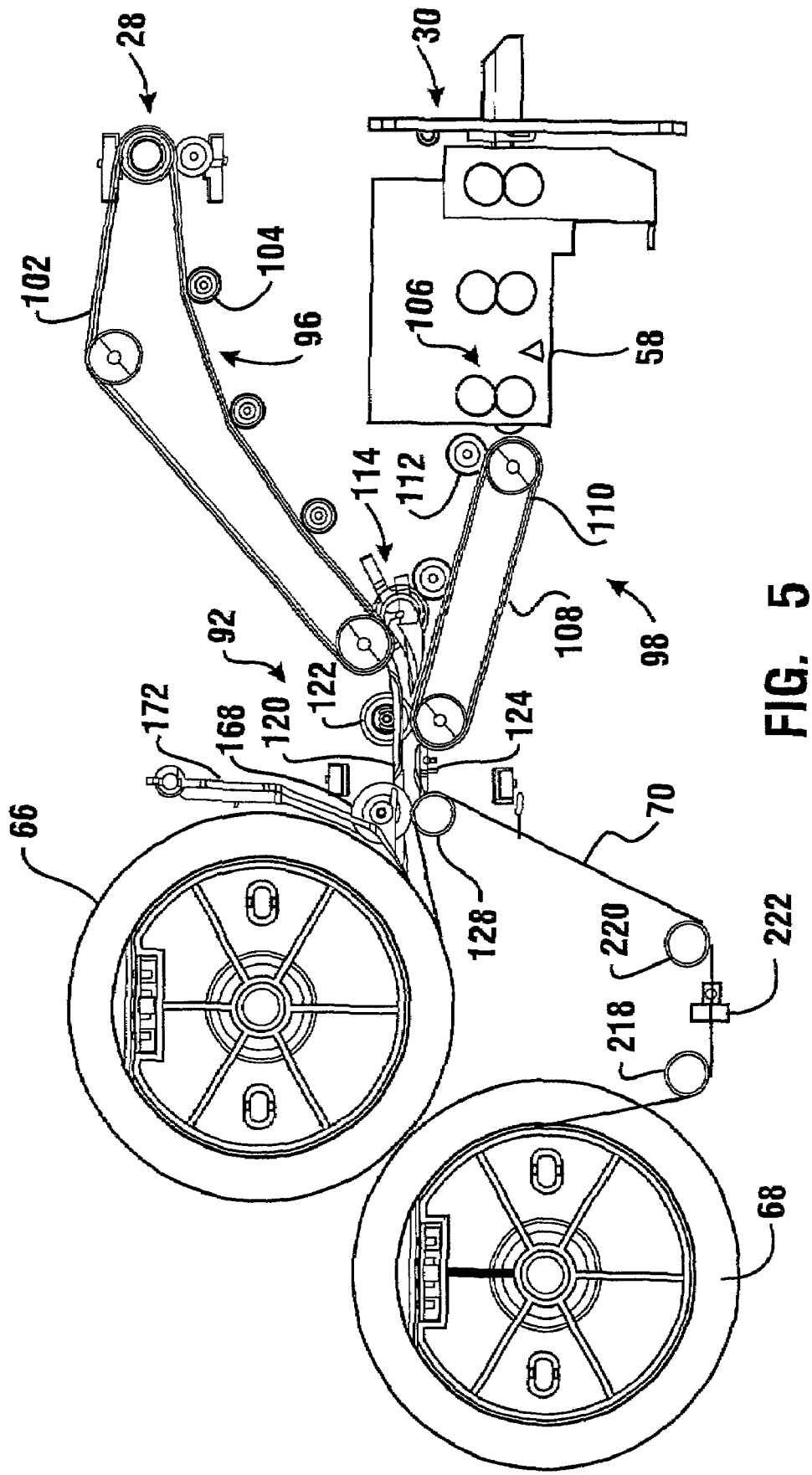

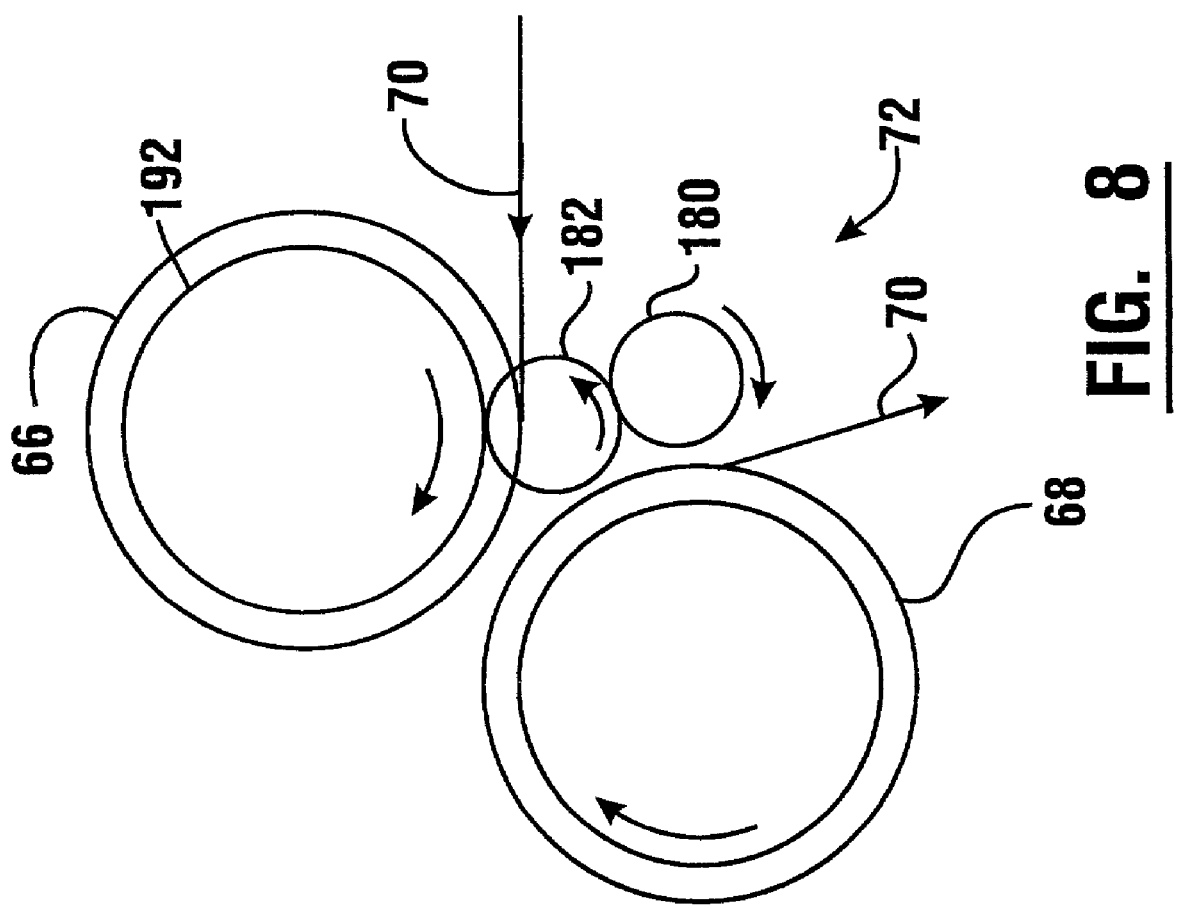

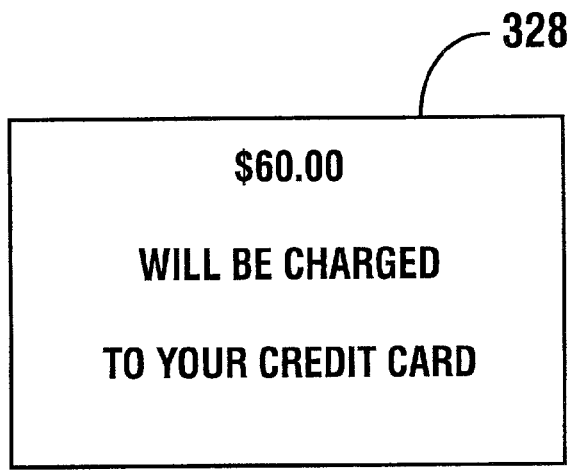
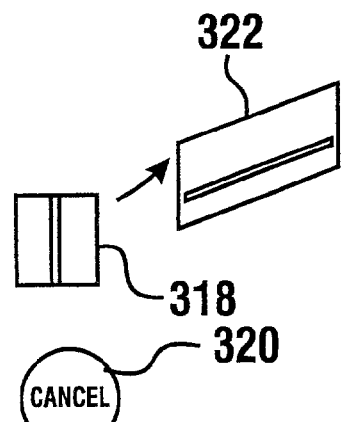
FIG. 28
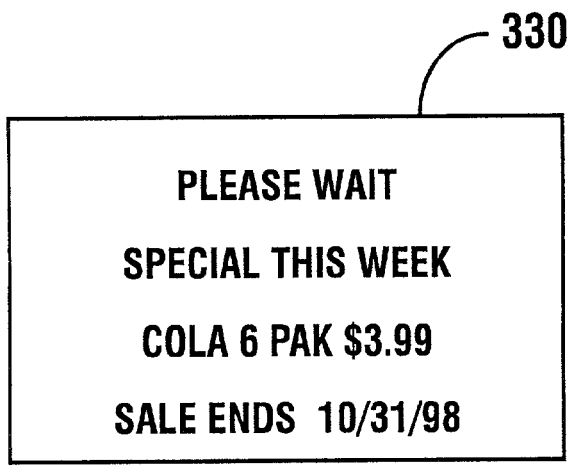
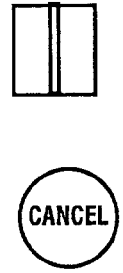
FIG. 29
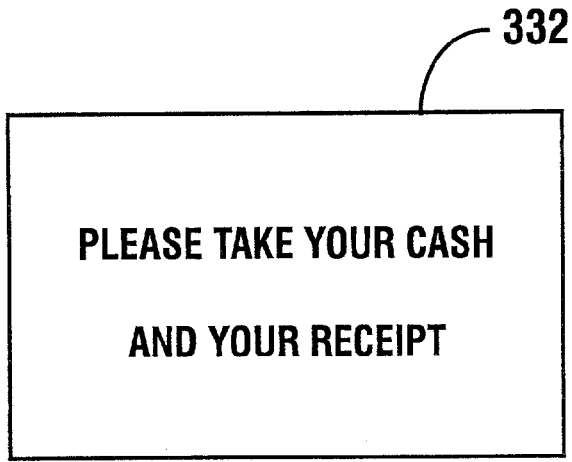
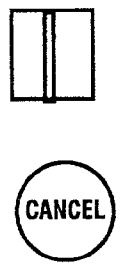
FIG. 30

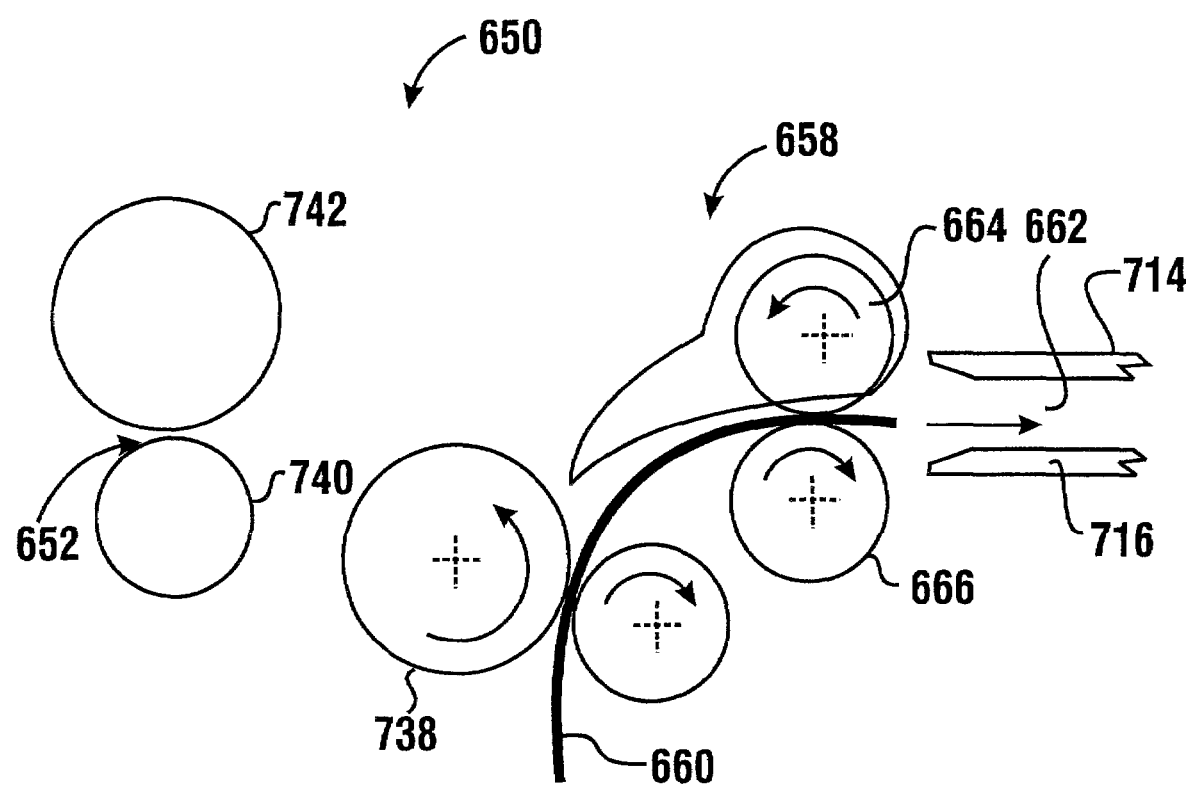
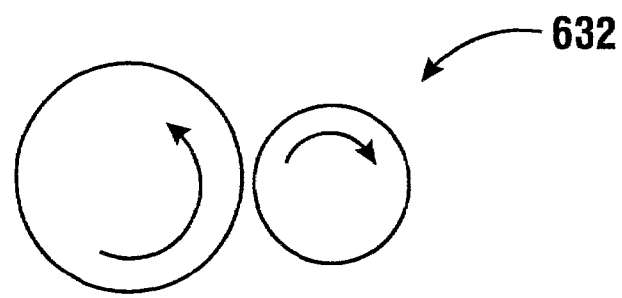
FIG 67

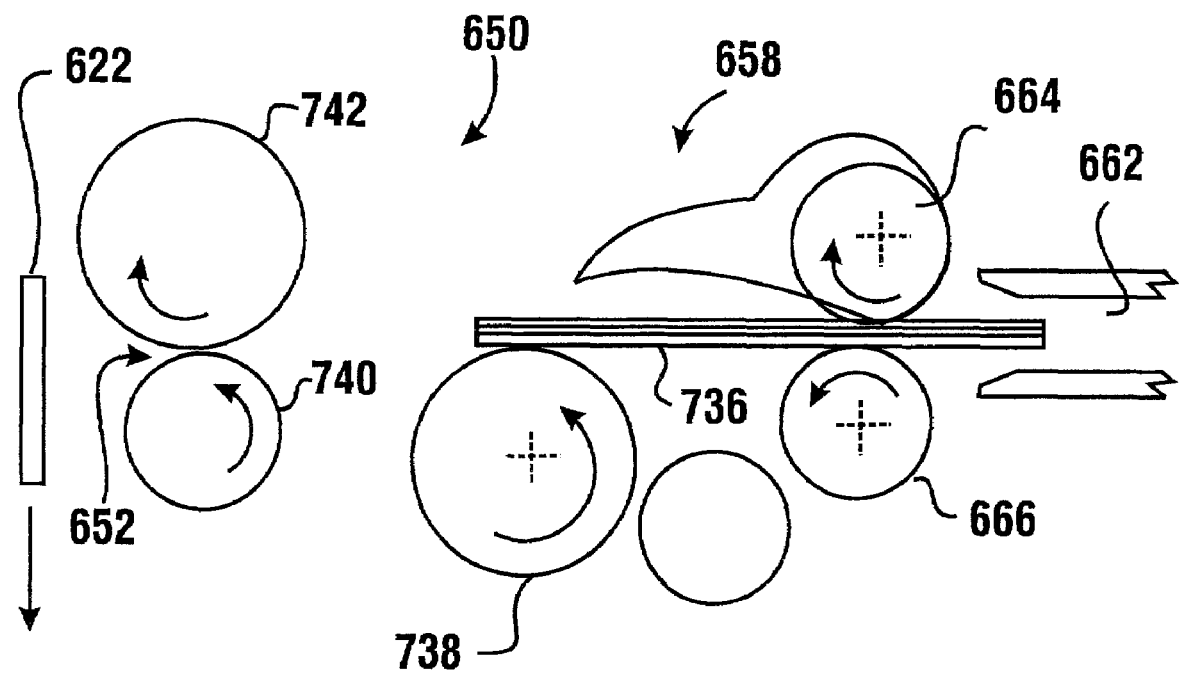
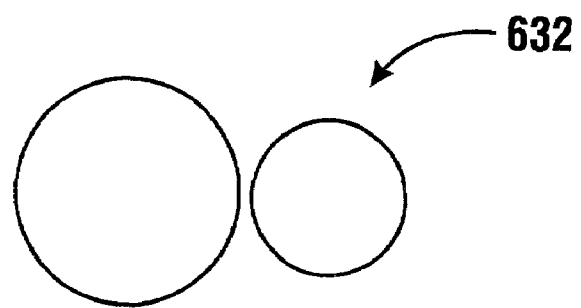
FIG 68

AUTOMATED TRANSACTION MACHINE WITH SHEET ACCUMULATOR AND PRESENTER MECHANISM

TECHNICAL FIELD

This invention relates to automated transaction machines. Specifically this invention relates to an automated transaction machine that dispenses notes to users and which has an internal note storage area which may be replenished without accessing the interior of the machine.

BACKGROUND ART

Automated transaction machines are known in the prior art. A common type of automated transaction machine is an automated teller machine (ATM). ATMs have been developed which are capable of performing a variety of transactions including the dispensing of currency notes. Other types of automated transaction machines dispense notes and other types of sheets to users such as bank tellers, cashiers and other service providers. Other types of automated transaction machines dispense items such as tickets, travelers checks, scrip, vouchers or gaming materials. Automated transaction machines generally dispense such materials while assessing appropriate charges and credits to the respective accounts of the user, the machine owner and the provider of the dispensed materials. For purposes of this description an automated transaction machine or an automated banking machine includes any machine that is capable of carrying out transactions including transfers of value. Also for purposes of this description notes may include currency notes, sheets, and other items such as tickets, travelers' checks, scrip, vouchers, travelers checks, gaming materials, promotional sheets or other similar items.

Automated transaction machines that dispense notes, including sheets representative of value, are generally constructed to prevent access to the supply of notes within the machine by unauthorized persons. In most cases such automated transaction machines include a secure chest or other secure enclosure. Access to the enclosure is controlled by a lock or other security device so that the interior thereof may only be accessed by appropriate personnel. The interior of the secure enclosure generally includes storage areas for notes, including currency notes, sheets, and other items representative of value. The storage areas are often disposed on the inside of removable canisters or other types of enclosures that may be readily installed in and removed from the machine when the secure area is accessed. Notes are dispensed by the machine to users from the note storage areas. When the storage areas require replenishment a service person opens the secure chest and replenishes the supplies. In some cases this is done by removing the depleted or partially depleted canisters and replacing those canisters with filled canisters. In other situations it may involve inserting a "brick" of currency notes or other notes into the canisters or other note storage areas to replenish the note supplies.

A drawback associated with the construction of such conventional automated transaction machines is that replenishing the note supplies requires opening the secure area of the machine. This provides the service person with access to all the valuable notes as well as the sensitive electronic equipment within the machine. This presents opportunities for theft and tampering. When canisters are changed, several individuals may have access to the canister during the times when it is being loaded, transported and installed in the machine. Likewise partially depleted canisters returning from machines for replenishment may pass through several hands. This may present opportunities for pilferage, the responsibility for which cannot be readily determined. Tamper resistant and tamper indicating note holding canisters have been developed. However such containers are not failsafe and may still be subject to compromise by skilled thieves. Note holding canisters may also be stolen in their entirety when in transit to and from machines. The use of currency canisters is also expensive. The use of such canisters adds to the cost of the automated transaction machines by requiring the inclusion of mechanisms that can open, close and work in conjunction with note containing canisters. The handling and transport of canisters also add to the cost of machine operation.

Lower cost automated transaction machines are often installed in gas stations, convenience stores and other merchandising facilities. Such automated transaction machines often carry out only cash dispensing transactions. While the reduced capabilities of such machines results in a lower machine acquisition cost, the problems of handling notes still exist. Because the security in such merchandising facilities is often not as high as that found in banking environments, it is not uncommon to use armored car type courier services to carry out cash replenishment transactions in such machines. This adds to the cost of machine operation.

Operators of automated transaction machines in merchandising facilities may desire to replenish the note supplies in such machines with cash that is available within the establishment. Doing this can avoid the cost of having to pay a third party to carry out cash replenishment, which reduces operating costs. However, in many merchandise transaction environments the trustworthiness of the personnel may not be verifiable. As a result the machine operator may not want to give their personnel access to the large amounts of cash which are available within the interior of an automated transaction machine. Replenishing the currency supplies within such machines may be an activity limited to supervisory level personnel. However, despite such precautions shortages and discrepancies can occur. This is particularly true when several individuals have the capability of accessing the interior of a machine.

Recently automated transaction machines have been developed that are capable of "recycling" currency. Such machines are capable of accepting currency notes from a user or operator, and determining the genuineness and particular type of each note. Such machines selectively store the deposited notes in locations within the machine. At a later time when the same or another user requests a dispense of notes, the machine dispenses the previously deposited notes to the user. An example of such a machine is shown in U.S. Pat. No. 6,109,522 which is owned by the assignee of the present invention and the disclosure of which is incorporated herein by reference. While such machines have the capability of having the note supplies replenished without accessing the interior of the machine, such machines are often complex and expensive. The installation of such a machine may not be cost justified in situations where relatively low cost, cash dispense only type machines are currently used.

There are also many other types of self service and vending machines that users operate, such as motor fuel dispensing pumps, vending machines, automated ticketing machines and automated gaming machines. Often such machines have a user interface that is capable of reading a user's credit card. Such machines also generally have the capability of assessing a charge to a user's account in exchange for merchandise or services provided. Increasingly self service machines are being provided with the capability of accepting a user's smart card. Smart cards include a memory thereon which has data representative of monetary value. Instead of assessing a charge to a user's account, such machines also have the capability of deducting the monetary value from the value represented by data in the memory of the user's smart card. Cash receiving and dispensing capability has generally not been provided machines such as those described above, and these machines could be improved by adding the capability to accept and dispense notes.

There are several factors which have discouraged advances in this area. First, cash dispensing and accepting mechanisms have in the past generally been expensive and would render such machines cost prohibitive to acquire and operate. Second, such machines generally do not include the security features included in automated teller machines or cash dispensers, because the items generally dispensed by such machines are not readily disposed of for cash value. Another reason such machines have not been provided with cash accepting and/or dispensing capability is that to do so would require the machine operators to incur the additional costs associated with cash handling previously discussed, that are often encountered in the use of operating ATMs and cash dispensers. A further drawback has been that making cash acceptance and dispensing an integral part of such machines may limit their operation to selected hours and locations where greater security may be maintained. Thus, while users may benefit from having machines such as motor fuel dispensing pumps and vending machines accept and receive cash, it has generally been cost prohibitive to provide such machines with these capabilities.

Thus there exists a need for an automated transaction machine that is more economical to produce and operate, but that is also highly reliable. There further exists a need for an automated transaction machine that is capable of being replenished with notes, including currency notes or other sheets of value without having to access the note storage areas in the interior of the machine. There further exists a need for an automated transaction machine which includes a note receiving and dispensing component that adds only limited cost to the production and operation of the machine.

DISCLOSURE OF INVENTION

It is an object of the exemplary form of the present invention to provide an automated transaction machine.

It is a further object of the exemplary form of the present invention to provide an automated transaction machine which is capable of dispensing notes having value, such as currency notes.

It is a further object of the exemplary form of the present invention to provide an automated transaction machine which dispenses currency notes from a note storage area within the machine and which is capable of having the note storage area replenished without accessing an interior of the machine.

It is a further object of the exemplary form of the present invention to provide an automated transaction machine which includes a note supply that can be replenished without accessing an interior area of the machine and which is configurable to be replenished from either the front or the rear side of the machine.

It is a further object of the exemplary form of the present invention to provide an automated transaction machine that is relatively economical to produce and to operate.

It is a further object of the exemplary form of the present invention to provide an automated transaction machine that is capable of receiving, validating and dispensing notes such as currency notes.

It is a further object of the exemplary form of the present invention to provide an automated transaction machine which may provide for the receiving and dispensing of currency notes as a supplementary function to a primary vending or self service function that is carried out by the machine.

It is a further object of the exemplary form of the present invention to provide an automated transaction machine which is capable of dispensing notes from a note storage area within the machine and which is capable of having a note supply readily removed from the machine by authorized personnel.

It is a further object of the exemplary form of the present invention to provide an automated transaction machine that is easy for users to operate and which may be operated to provide timely promotional and other messages to users of the machine.

It is a further object of the exemplary form of the present invention to provide an automated transaction machine that provides separate user interfaces for both the merchant and the customer/consumer.

It is a further object of the exemplary form of the present invention to provide an automated transaction machine that provides an enclosure having an upper portion including user interface areas and a separately connected lower portion including note storage areas.

It is a further object of the exemplary form of the present invention to provide an automated transaction machine that provides a note inlet opening and a note outlet opening adjacent the rear of the machine for a merchant side user, and a note outlet opening adjacent a front of the machine for a consumer side user.

It is a further object of the exemplary form of the present invention to provide an automated transaction machine that provides a merchant user interface adjacent the rear of the machine, and a consumer user interface adjacent a front of the machine.

It is a further object of the exemplary form of the present invention to provide an automated transaction machine that presents notes to customers together in stacked relation.

It is a further object of the exemplary form of the present invention to provide an automated transaction machine that accumulates notes into a stack within the machine.

It is a further object of the exemplary form of the present invention to provide a method for accumulating notes into a stack within an automated transaction machine.

It is a further object of the exemplary form of the present invention to provide a method in which notes are moved from storage areas in the machine and accumulated into a stack and then the stack is presented to a customer operating the machine.

Further or other objects of exemplary forms of the present invention will be made apparent in the following Best Modes For Carrying Out Invention and the appended claims.

The foregoing objects are accomplished in an exemplary embodiment by an automated transaction machine. The automated transaction machine may be a machine whose primary function is the receipt and/or dispensing of notes such as currency notes. Alternatively the automated transaction machine may be associated with a primary function such as the vending of motor fuel, lottery tickets, gaming materials, food items, tobacco items, checks, money orders or other transactions and may include the dispensing and/or receipt of notes having value, such as currency.

The automated transaction machine in one exemplary embodiment includes a machine housing. The housing includes a user interface area including at least one input device through which the machine may receive at least one input from a user of the machine. A note inlet opening extends through the housing as does a note outlet opening.

Within the housing of the machine is a note receiving and dispensing mechanism. The note receiving and dispensing mechanism includes a note storage area which in the described exemplary embodiment is used for holding currency notes. The note receiving and dispensing mechanism also includes a passage area through which notes are passed when they are being received by the mechanism for storage in the storage area. Notes also pass through the passage area when they are being dispensed by the mechanism from the storage area.

The described exemplary embodiment further includes a note inlet transport which extends between the note inlet opening and the passage. A note validator is positioned adjacent the note inlet transport. The note validator is operative to sense notes which are inserted through the inlet opening for purposes of determining whether the notes are valid. The machine further includes a note outlet transport. The note outlet transport extends between the passage and the note outlet opening through the housing. The machine further includes one or more drive mechanisms that are operatively connected to the note inlet and outlet transports and which enable the selective movement of notes or other sheets therein.

The automated transaction machine of the described exemplary embodiment further includes at least one controller. The controller is in operative connection with the validator and the drive for the note inlet and outlet transports. The controller is also in operative connection with the input devices as well as the validator. The controller is operative to control the machine such that in response to at least one input to the input device, notes or other sheets stored in the storage area are dispensed by the mechanism and moved through the note outlet transport to the note outlet opening. The controller is further operative responsive to insertion of a note or other sheet into the inlet opening to have the validator determine if the inserted note or sheet is valid. If so, the note is accepted by the receiving and dispensing mechanism and stored in the storage area.

Configurations of the automated transaction machine of the present invention may provide for both receiving notes from and dispensing notes to customers while charging and crediting appropriate accounts. Alternatively embodiments may be configured for only dispensing notes to customers who operate the machine. In some embodiments acceptance of notes may be limited to personnel who are authorized to replenish the machine on behalf of the machine owner or operator. Alternative configurations of the machine may provide for the note inlet and outlet openings to be positioned on generally one side of the machine, while other alternative forms may provide for such openings to be on generally opposed sides of the machine. Some embodiments may provide for accepting notes into the note inlet opening one note at a time while others may be configured for accepting stacks of notes which are then separated, authenticated and stored within the machine.

In some exemplary embodiments, the machine may be configured for separate usage by the merchant and consumer. For purposes of this description, a merchant should be understood to include cashiers, vendors, bank tellers, cash handlers, or other service providers. For example, the merchant may be authorized to use the merchant side interface. The merchant would be able to use a rear side of the machine which would include a merchant user interface, a note inlet opening, and a note outlet opening. The customer or consumer would be able to use the opposite or front side of the machine which would include a consumer user interface and a note outlet opening. Also, the user interfaces may be located in a portion of the machine distinct from a portion of the machine including note storage areas. The portions may be operatively connected for carrying out input and output functions. Such an arrangement of distinct portions provides additional security between the user interface areas and the note storage areas.

In some exemplary embodiments the note storage area may include one or more note storage mechanisms of the roll storage type. An exemplary note storage mechanism includes a flexible web that extends between a note storage reel and a take-up reel. The note storage reel and take-up reel are moved by a reel drive mechanism that enables selectively moving the reels to deliver notes to and to receive notes from the passage area. The note storage and take-up reels in some embodiments are contained within a note storage module that is readily installed in and removed from the machine housing by authorized personnel. Such exemplary embodiments are highly reliable and yet relatively lower in cost to produce and operate.

Embodiments may include a user interface with a display. The display is used for presenting promotional or other messages to users of the machine. These messages may be time sensitive and/or of limited duration. In an exemplary embodiment such messages are provided by interaction of the controller with a replaceable plug-in memory such as a smart card. Various forms of user interfaces may also be provided to simplify and facilitate operation of automated transaction machines.

Alternative embodiments of the present invention may further include a stacking mechanism within the machine. The stacking mechanism operates to accumulate into a stack the notes such as currency notes or other notes to be dispensed from the machine. The stack of notes, once accumulated in the stacking mechanism, is then presented to a user at the machine. The makeup of the stack may be controlled in some embodiments responsive to the programming of one or more controllers in the machine so that notes are arranged in a certain order. This may include placing notes in order by denomination or alternatively placing notes which include advertising material or premiums such as coupons, receipts or other notes to which the customer's attention is to be drawn, at the top of the stack. Although in exemplary embodiments stacking mechanisms within the machine can be used for accumulating stacks prior to the presentation thereof to customers, stacks may also be accumulated in alternative embodiments for other purposes such as to facilitate note orientation, retention or storage.

BRIEF DESCRIPTION OF DRAWINGS

FIG. 5 is a schematic view showing the components included in the note paths of the automated transaction machine shown in FIG. 1.

FIG. 8 is a schematic view similar to FIG. 7 with the reel drive mechanism operating to move the note storage and take-up reels in a note receiving direction.

FIGS. 25-30 are schematic views of a user interface and the operation thereof which may be used in connection with embodiments of the invention.

FIG. 67 is a schematic view of a note transport gate shown in a position directing notes to the note stacker mechanism.

FIG. 68 is the note transport gate shown in FIG. 57 shown moved to a position enabling a stack of notes to be moved toward an opening in the housing of the automated transaction machine.

BEST MODES FOR CARRYING OUT INVENTION

Figure 1:
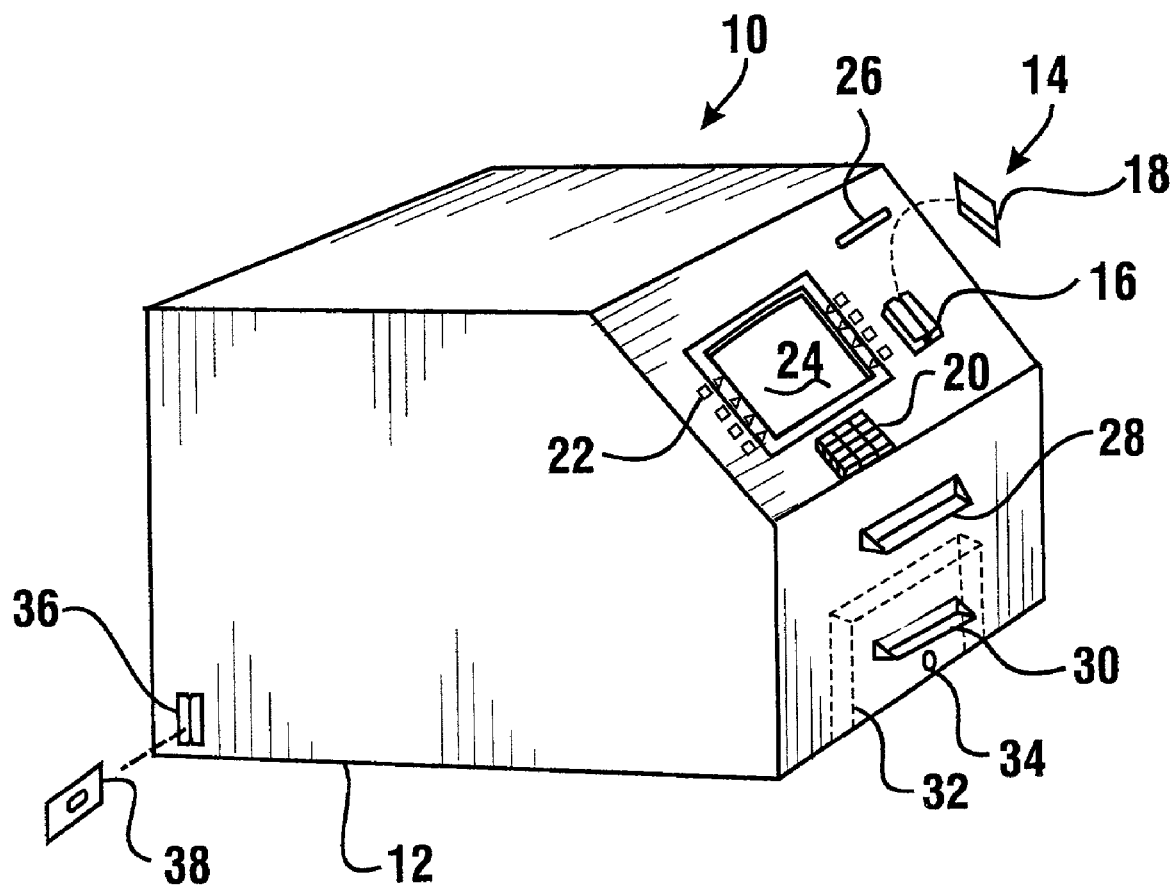
FIG. 1 is an isometric view of one exemplary embodiment of an automated transaction machine of the present invention.

Referring now to the drawings, and particularly FIG. 1 shown therein is an automated transaction machine of a first exemplary embodiment of the present invention generally indicated 10. The exemplary embodiment of a machine 10 illustrated in FIG. 1 is an automated teller machine whose primary functions are to dispense and receive currency notes. It should be understood however that other embodiments may be machines whose primary functions include conducting other types of transactions. These may include for example the dispense of motor fuel, the dispense of tickets, the dispense of vouchers, the dispense of gaming materials, the ordering or dispense of food items, the dispense of checks, the dispense of tobacco products or other functions that a user may carry out using the machine.

Machine 10 includes a housing 12. As used herein housing 12 refers to the external enclosure of the machine as well as the internal structures which support components of the machine therein. A user interface generally indicated 14 is supported on the housing and is accessible by a user. In the embodiment shown the user interface includes input devices and output devices. One of the input devices is a card reader 16. Card reader 16 in the machine shown is a swipe type card reader which is operative to read magnetic stripe cards 18 which are passed through the reader by customers. Cards 18 may be various types of cards such as credit cards, debit cards or smart cards which include information for identifying the user and/or their accounts.

User interface 14 of the described exemplary embodiment also includes other input devices. These include a keypad 20 and function keys 22. Users are enabled to input data and instructions to the machine by selectively pressing the keys which make up the keypad as well as the function keys 22.

The user interface 14 further includes an output device which includes a display 24. Display 24 of the described exemplary embodiment may be a CRT or LCD type display that is operative to display messages to a user, including messages which instruct the user in operation of the machine.

It should be understood that the input devices and output device shown are exemplary and that other embodiments may employ other types of input and output devices. These include for example other types of card readers for reading magnetic stripe or other types of cards. These may include for example motorized readers or dip readers. Other types of cards may also be employed with the machine. Such cards include varieties of so called "smart cards" which include a programmable memory with data thereon. Such data may include information about the user and their accounts. It may also include information representative of monetary value. Such value may be deducted from the memory as the card is used to make purchases or otherwise receive value for the monetary amount represented on the card. Some cards may have the value thereon periodically replenished. Other types of input devices may be used which read articles such as articles encoded with optical indicia which can be used to identify the user or their accounts. Other types of input devices may include biometric type reading devices such as fingerprint readers, retina scan devices, iris scan devices, speech recognition devices or other types of input devices which are capable of providing an input which can identify a particular user and/or their accounts.

The keypad and function keys which serve as input devices in the described exemplary embodiment may be replaced in other embodiments by other types of devices which are capable of selectively receiving data or instructions from a user. Other types of output devices may also be used. These may include other types of visual and nonvisual output devices which are capable of communicating a message to a user and which can instruct the user in the operation of the machine. Of course when automated transaction machines of these and other exemplary embodiments are incorporated with other devices which carry out other functions, other types of input devices associated with carrying out those other functions may also be included. These may include for example switching and control devices for controlling the dispense of motor fuel when an exemplary embodiment is incorporated with a motor fuel dispensing device. The particular additional devices will depend on the environment in which the embodiment is used.

Returning to the description of the machine 10 shown in FIG. 1, the housing includes therethrough a receipt opening 26. The receipt opening is used to provide the user with printed receipts for the transactions conducted at the machine. The housing further includes a note outlet opening 28. The note outlet opening 28 is used to deliver notes dispensed from the machine to a user. It should be understood that the note outlet opening 28 may also be referred to herein as a sheet outlet opening, and that in embodiments of the invention a variety of notes, including promotional sheets or sheets representative of value, may be received and dispensed from the machine.

The machine 10 further includes a note inlet opening 30. Note inlet 30 is used for inserting notes or other types of notes into the machine for storage. As indicated in phantom, in some embodiments the note inlet opening 30 may be rendered inaccessible by a movable cover 32. The cover 32 is selectively secured by a suitable locking mechanism 34. The cover 32 may be used in circumstances where the machine operator only wants selected authorized personnel to be able to insert notes for storage in the machine 10. This may be the case when the machine operator wants users to use the machine 10 only as a cash dispenser. In some embodiments the cover 32 may provide a note supporting surface or include a note holding structure such as a pocket to facilitate holding dispensed notes for the user of the machine when the cover 32 is in position.

As shown in FIG. 1 the housing 12 of the machine further includes a connector 36. The connector 36 is operative to releasibly receive a plug-in memory 38. The plug-in memory 38 in the embodiment shown is used for holding messages that are to be provided to users of the machine 10 through the display 24. As later discussed, the plug-in memory 38 may hold promotional messages which are displayed to users of the machine 10 on a timely basis. Such promotional messages may include for example discounts on certain merchandise or special offers which expire on a certain date. In one exemplary embodiment the plug-in memory 38 may be supported on a smart card. The plug-in memory 38 may include one or more promotional items which are promoted only during certain times of day, on certain days of the week or during particular time periods. The use of this feature is later discussed in detail.

Figure 2:
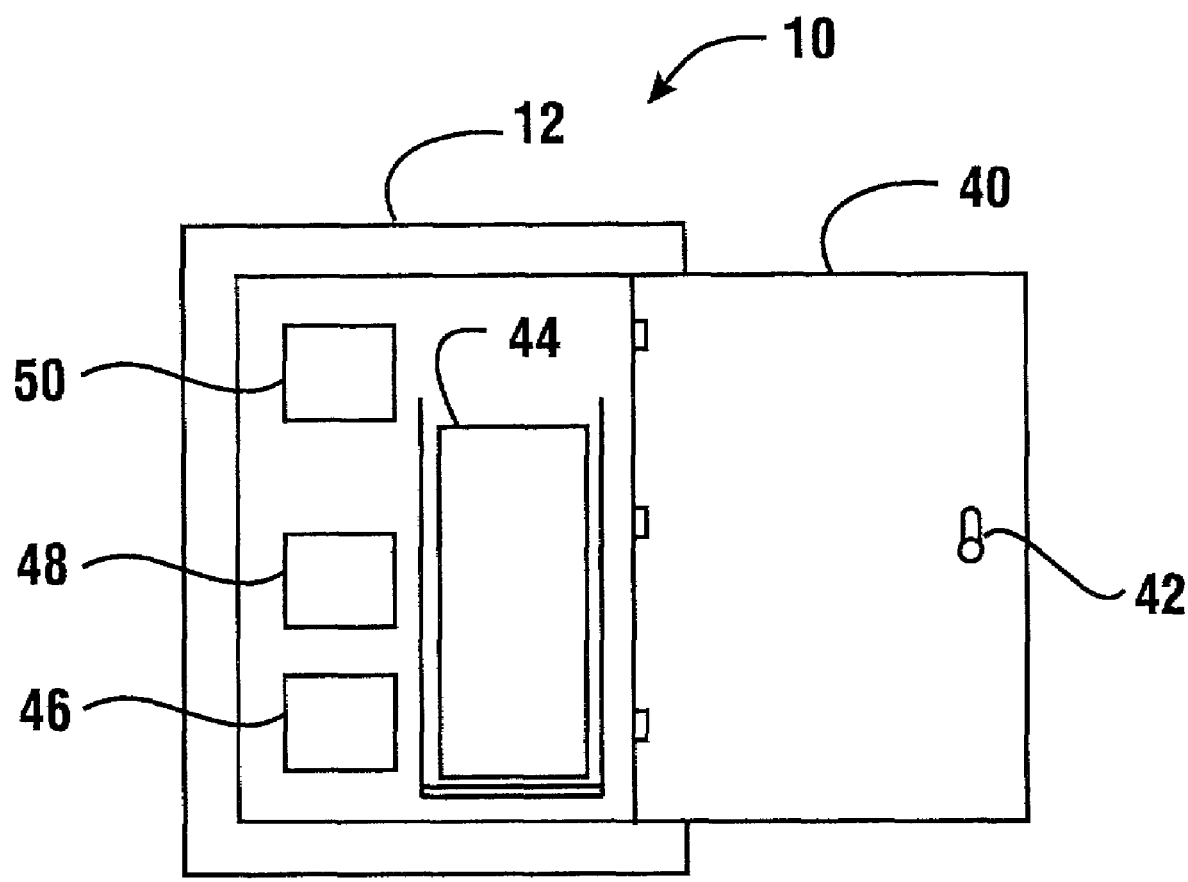
FIG. 2 is a rear plan view of the machine shown in FIG. 1 with an access door in an open position.

FIG. 2 shows the rear of the machine 10. The housing 12 of the machine 10 includes an access door 40 which is shown in the open position in FIG. 2. The access door 40 includes a locking mechanism 42. The locking mechanism 42 is normally used to secure the access door 40 in the closed position. The locking mechanism 42 may be opened by authorized personnel to enable them to access an interior area of the machine 10.

The interior area of the machine 10 includes various components which are shown schematically. Such components may include for example a note storage module 44. As later described in detail the note storage module 44 includes a note storage area for holding notes within the machine 10. In the exemplary embodiment note storage module 44 is readily removable and installed in the machine 10 once the access door 40 is in the open position. Other components within the housing of the machine 10 may include a journal device 46. The journal device 46 may be for example a journal printer which makes a permanent hard copy record of transactions which are carried out by the machine 10. Other devices within the interior of the machine 10 may include a communications device 48. The communications device 48 may be for example a modem, wireless transmitter, lease line interface connection, communication board or other suitable device for communicating with other computers to carry out transactions with the machine 10. These other computers may include for example computers in credit and/or debit card networks which are capable of handling transaction messages and settling accounts between users, sources of monetary value and the operator of the machine 10. Another device shown schematically in the interior of the machine 10 in FIG. 2 is a receipt printer 50. The receipt printer 50 is operative to produce printed receipts that are dispensed to customers through receipt opening 26.

Figure 3:
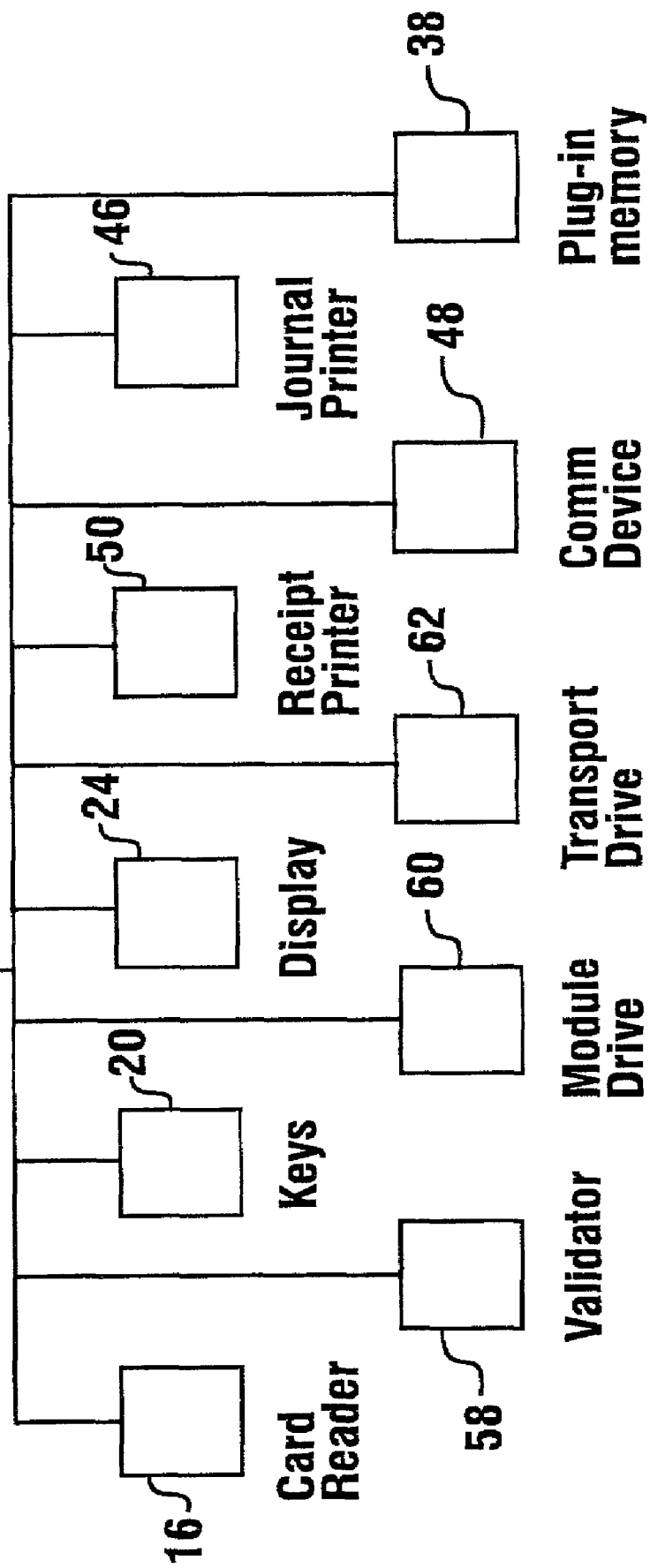
FIG. 3 is a schematic view showing a controller of the automated transaction machine and transaction function devices and other devices in operative connection therewith.

FIG. 3 shows schematically the electrically controlled devices which are included in the described exemplary embodiment of the machine 10. At least one controller 52 serves as a control device for controlling the electrical devices within the machine 10. The controller 52 includes an internal clock device schematically indicated 54. The controller 52 is in operative communication with a memory 56 which is also referred to herein as a data store, and may be of the volatile or non-volatile memory type. The controller 52 may in various embodiments include one or more processors or operatively connected computers which serve as an electrical signal source for devices which are in operative connection with the controller 52.

As shown in FIG. 3 the controller 52 is operative to communicate with the transaction function devices, which include the devices which comprise the user interface 14 previously described. These transaction function devices include the card reader 16, the keypad and function keys 20 and 22 and the display 24. The controller 52 is also operative to communicate and control operation of other transaction function devices, including the receipt printer 30 and the journal device 46, which in this case is a journal printer. The controller 52 is also in operative communication with the plug-in memory 38 and the communication device 48 which is used to communicate with other devices. In the described exemplary embodiment the controller 52 is also operative to communicate with other devices. These include for example a note validator 58 which will later be discussed in detail. The note validator 58 is operative to sense notes to determine their validity and to distinguish between valid and invalid notes inserted into the machine 10. It may also incorporate a drive mechanism to move notes into and out of the note validator 58. The controller 52 is also operatively connected to a module drive 60 and a transport drive 62 which are control circuits for controlling motors which operate to move notes within the machine 10. These are later discussed in detail. It should be understood that these transaction function devices are exemplary and that other embodiments may include different and/or additional types of transaction function devices.

Figure 4:
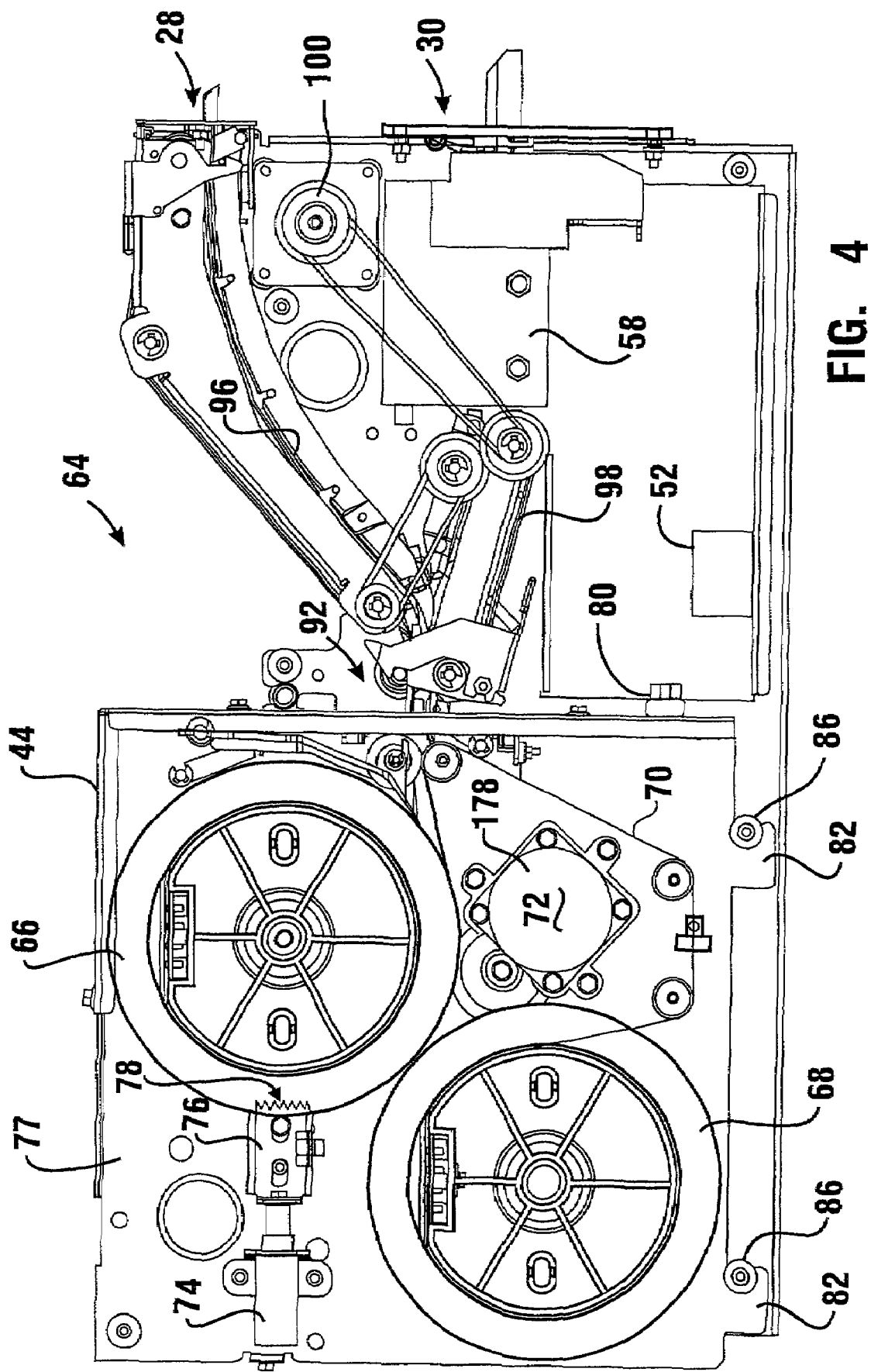
FIG. 4 is a transparent side view of the mechanisms for handling notes such as currency notes in the automated transaction machine shown in FIG. 1.

FIG. 4 is a view of the note handling mechanism that is used for storing and dispensing notes within the machine 10. The note handling mechanism generally indicated 64, includes the note storage module 44 previously discussed which is removably mounted on the housing of machine 10. The note storage module 44 includes a note storage reel 66 which is rotatably mounted in supporting connection with the housing 12 of the machine 10 in the note storage module 44. A take-up reel 68 which in the exemplary embodiment is identical to the note storage reel 66, is also rotatably mounted in the machine 10. A flexible web 70 extends between the note storage reel 66 and the take-up reel 68.

The note storage module 44 of the described exemplary embodiment includes a note receiving and dispensing mechanism 77. The note receiving and dispensing mechanism 77 includes a reel drive mechanism 72, a note storage reel 66, and a take-up reel 68. The reel drive mechanism 72 is operative in a manner later discussed to selectively drive the note storage reel 66 or the take-up reel 68.

The note storage module 44 also includes therein an actuator 74. The actuator 74 is in operative connection with a movable locking member 76. The locking member 76 is movable by the actuator 74 between a position in which rotational movement of the note storage reel 66 is enabled and a position in which the locking member 76 holds the rotatable note storage reel 66 in relatively fixed position with respect to the note storage module 44. This is accomplished in the locking position of the locking member 76 by engaging cooperating projections and recesses schematically indicated 78 on the locking member 76 and the note storage reel 66.

The actuator 74 is electrically connected with the controller 52 through a releasible connector 80. The controller 52 serves as an electrical signal source which operates the actuator 74 generally to enable the note storage reel 66 to move when it is properly positioned within the machine 10. When the note storage module 44 is positioned in the machine 10 and the releasible connector 80 connects the actuator 74 to the electrical signal source, in this exemplary embodiment a controller 52, the projections and recesses 78 of the locking member 76 and note storage reel 66 are disengaged enabling the note storage reel 66 to move. This feature aids in securing the note storage reel 66 which serves as a note storage area, in fixed position relative to the note storage module 44 when the note storage module 44 is removed from the machine 10. This makes it more difficult for unauthorized persons to extract the note from the note storage module 44 after it has been removed from the machine 10.

Figure 14:
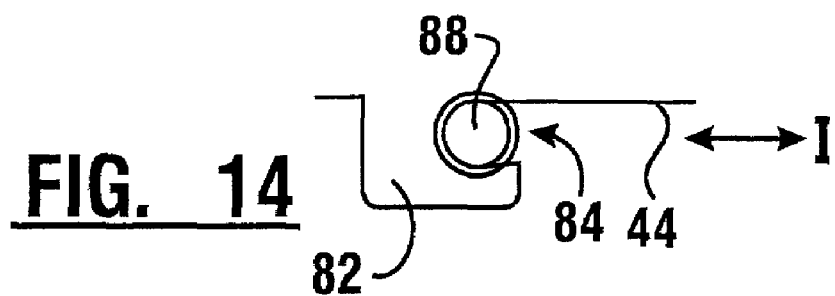
FIG. 14 shows a tab portion on the note storage module engaged with a cylindrical support member.
Figure 15:
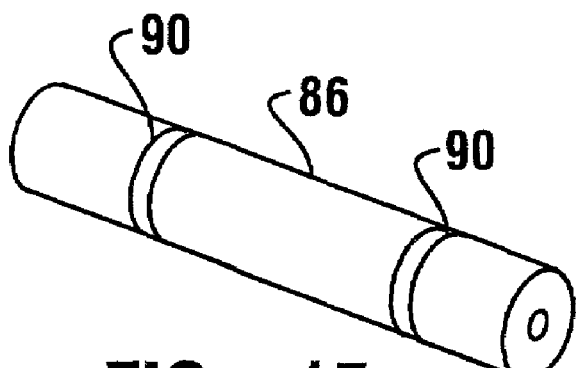
FIG. 15 is an isometric view of the cylindrical support member shown in FIG. 14.

The note storage module 44 is supported in the machine 10 by tab portions 82. Tab portions 82 are generally planar extensions of the walls of note storage module 44 and include semicircular openings or slots 84 (see FIG. 14). Axially elongated cylindrical support members 86 are accepted into the openings 84 when the note storage module 44 is in the operative position within the machine 10.

The openings 84 extend in generally planar areas of the tab portions 82, and are bounded by a surface 88 which serves as an arcuately shaped generally u-shaped projection. The u-shaped projecting surface 88 is positioned to extend into generally annular recesses or slots 90 which extend about the cylindrical support members 86. The interfitting engagement of the u-shaped projecting surface and the annular recesses 90 enables positioning the note storage module 44 in the proper position within the housing 12 of the machine 10. It further enables engaging and disengaging the tab portions 82 and the cylindrical support members 86 from the engaged and disengaged positions by moving the note storage module 44 along the direction of arrow I shown in FIG. 14.

In the described exemplary embodiment the cylindrical support members 86 also serve as supporting members for the construction of the structure surrounding the note storage module 44 within the machine 10. Cylindrical support members 86 include threaded openings in each end to facilitate their engagement to other components. The annular recesses 90 in the cylindrical support members 86 are positioned asymmetrically to facilitate the proper positioning of the note storage module 44. During assembly of the machine 10 the proper positioning of the cylindrical support members 86 is assured by having the threaded openings in each end of the cylindrical support members 86 of a different size and/or thread configuration. This construction along with the mating fasteners which are used to hold the machine components together assure that the cylindrical support members 86 are installed properly during assembly. Of course the construction of the supporting structure and removable note storage module 44 is exemplary and in other embodiments other suitable structures and assembly methods may be used. This includes using a configuration for positioning the note storage module 44 which is generally the reverse of that shown in FIG. 14 as well as other arrangements of interengaging projections and slots.

The note handling mechanism 64 shown in FIG. 4 further includes a passage area 92. The passage area 92 extends through an opening 94 in the front wall of the note storage module 44 (see FIG. 10). Notes passing between the note receiving and dispensing mechanism 77 of the note storage module 44 and the note inlet and outlet openings 28, 30 pass through the passage area 92.

As shown in FIG. 4 a note outlet transport 96 extends between the passage area 92 and the note outlet opening 28. Note outlet transport 96 is operative to move notes in connection therewith. A note inlet transport 98 is operative to move notes between the note inlet opening 30 and the passage area 92. Note inlet transport 98 includes a portion which extends through the note validator 58. As previously discussed the note validator 58 is operative to sense notes which pass through the note inlet transport 98. The note validator 58 is operative to determine if the sensed notes are valid for purposes of acceptance in the machine 10 and to discriminate between valid and invalid notes.

A transport drive 100 is operatively connected to the note inlet and outlet transports 98 and 96 respectively. The note inlet and outlet transports 98 and 96 are shown in further detail in FIG. 5. The note outlet transport 96 includes a belt 102 and a plurality of note engaging idler rolls 104. The belt 102 and idler rolls 104 engage notes therebetween such that the notes move with movement of the belt 102 between the passage area 92 and the note outlet opening 28. It should be understood that while a belt and roll transport is used for the note outlet transport 96 in the described exemplary embodiment, in other embodiments other configurations of cooperating belts, rollers or other moving members suitable for engaging and moving notes may be used.

The note inlet transport 98 in the described exemplary embodiment includes note validator 58. In the described exemplary embodiment note validator 58 may include a standard commercially available note acceptor which is operative to sense and determine the validity of certain types of bills. In the case of a machine 10 which is configured to receive and dispense twenty dollar bills, the note validator 58 may be a device for sensing whether an inserted note is a valid twenty dollar bill. The note validator 58 includes therein or has adjacent thereto a generally nonslip portion 106 of the note inlet transport 98. Nonslip portion is operative to engage and move notes inserted through the note inlet opening 30 through the note validator 58. The generally nonslip portion 106 is operative to move notes past the sensing mechanisms within the note validator 58 as required for sensing the note and determining its validity for purposes of receipt within the machine 10. If an inserted note is determined not to be valid or otherwise not suitable for acceptance within the machine 10, the nonslip portion 106 after moving the note inward into the note validator 58 is operative to move it outward back through the note inlet opening 30. This is done by the note validator 58 operating based on its internal programming or in alternative embodiments operating in cooperating relation with the controller 52.

If a note inserted through the note inlet opening 30 is sensed as valid and acceptable by the note validator 58, the nonslip portion 106 of note inlet transport 98 is operative to release the note to a limited slip portion 108 of the note transport 98. Limited slip portion 108 includes a belt 110 and idler rolls 112. The belt 110 and idler rolls 112 serve as limited slip engaging members which engage notes passing inward from the note validator 58. However, the limited slip portion 108 is not operative to apply sufficient force to a note to remove it from engagement with the nonslip portion 106, until the nonslip portion 106 disengages the note. This enables the note validator 58 of the described exemplary embodiment to move the note sufficiently rearward so that it can engage the limited slip engaging members 110, 112 and still enable the nonslip portion 106 to reverse the direction of the note so that it can be delivered back out through the note inlet opening 30 in the event that the note is determined to be invalid. This feature enables standard commercially available, compact size note validators, which often include a nonslip drive mechanism and a note validating sensor, to be used in the embodiment shown. While the note inlet transport 98 shown in the exemplary embodiment has a generally nonslip portion 106 and a limited slip portion 108, other embodiments may not include such portions depending on the type of note validator 58 used. An example of such an embodiment is later described in detail. In addition although the generally nonslip portion 106 is shown as a plurality of cooperating rolls and the limited slip portion 108 is shown as a belt and roll transport, other embodiments may include other types of cooperating moving members that are operative to move notes in the desired fashion.

Figure 9:
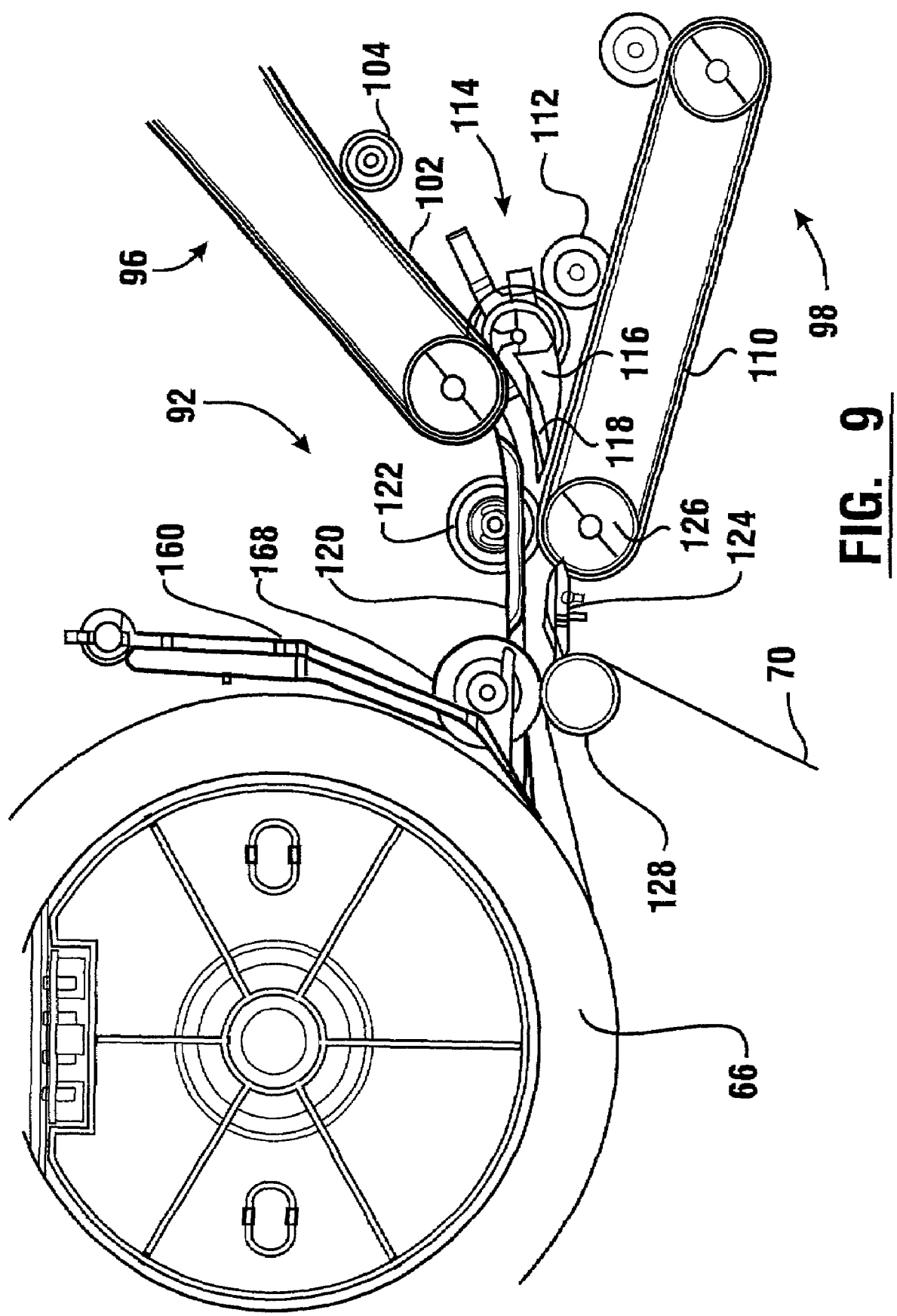
FIG. 9 is a simplified side view of the note handling components in the passage area of the machine.

A gate 114 is positioned adjacent to the passage area 92. Gate 114 is operative to selectively direct notes and enable the passage of notes relative to the note inlet transport 98 and note outlet transport 96. As shown in greater detail in FIGS. 9 and 11, gate 114 includes a rotatably mounted gate member 116. Gate member 116 includes a curved lead surface 118 which is disposed adjacent to the passage area 92. When the lead surface 118 is disposed downward relative to the position shown in FIG. 9 and the mechanism is operated to move notes outward through the passage area 92, the outward moving notes are engaged with the lead surface 118 and are directed to engage the belt 102 and idler rolls 104 of the note outlet transport 96. In this position the notes are carried in an outward direction by the note outlet transport 96 to the note outlet opening 28. Likewise when notes are moved by the note inlet transport 98 towards the passage area 92, the lead surface 118 is moved upward, as oriented in FIG. 9, to an accepting position. In this position notes carried by the note inlet transport 98 are enabled to pass into the passage area 92.

A guide 120 extends adjacent to the gate 114 generally between the note inlet and outlet transports 98 and 96. The guide 120 includes rotatable guide rolls 122 in supporting connection therewith. Guide roll 122 is generally engaged with belt 110 and rotates therewith. The guide 120 and guide rolls 122 further aid in guiding notes through the passage area 92 in a manner later discussed. The passage area 92 is also bounded on an opposed side of the guide 120 by a separating member 124. The separating member 124 also later described in detail, engages the surface of belt 110 which serves as an arcuately shaped moving member in an area overlying belt supporting roll 126. The separating member 124 also engages on an opposed side of this separating member 124, the web 70 in an area overlying a supporting roll 128 which is supported on the note storage module 44. The web 70 serves as a arcuately shaped moving member when it moves over the roll 28 in engagement with the separating member 124.

Figure 11:
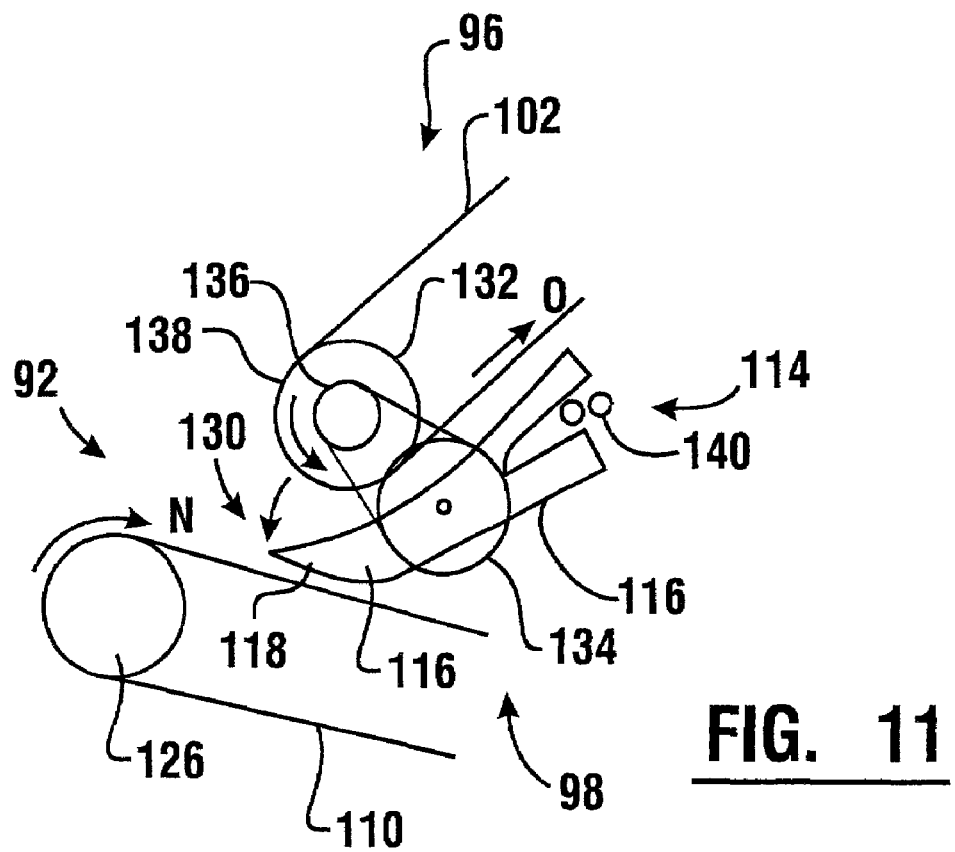
FIG. 11 is a side schematic view of the gate member which serves to direct notes between the note inlet and outlet transports in the passage area.

As shown in FIG. 11, gate 114 is moved between the accepting position which is the position wherein notes are accepted into the passage area 92 from the note inlet transport 98, and the directing position in which notes passing outward through the passage area 92 are directed to the note outlet transport 96, by a limited slip transmission mechanism generally indicated 130. The limited slip transmission mechanism 130 of the described exemplary embodiment includes a slipping member 132. Slipping member 132 is a small relatively slippery belt or similar force transmission member, which can be used to translate the gate member 116 to a desired position and thereafter slip in response to driving motion without causing damage to itself or other connected components. In the described exemplary embodiment the slipping member 132 is connected to a pulley portion 134 which is operatively connected to the gate member 116. The slipping member 132 is also connected to a pulley portion 136 which is connected to a roll 138 which supports belt 102 of the note outlet transport 96. Stops schematically indicated 140 limit the rotation of the gate member 116.

When the note outlet transport 96 is driven to move notes outwardly from the passage area 92, belt 102 is driven in the direction indicated by the Arrow O. This causes the lead surface 118 of the gate member 116 to move downward until the gate member 116 is engaged with the stop 140 which limits its counterclockwise rotation. Because in this position belt 110 is moved in the direction of Arrow N, notes moving through the passage area 92 are engaged by the lead surface 118 in the directing position and moved in connection therewith to engage the outward moving belt 102. The outward moving belt 102 continues to run for as long as it is controlled to do so in response to the controller 52. However once the gate member 116 is against the stop the slipping member 132 slips relative to at least one of the pulley portions 134 or 136. This causes the gate member 116 to be held in the directing position but does not result in further movement nor damage to any of the components.

Figure 18:
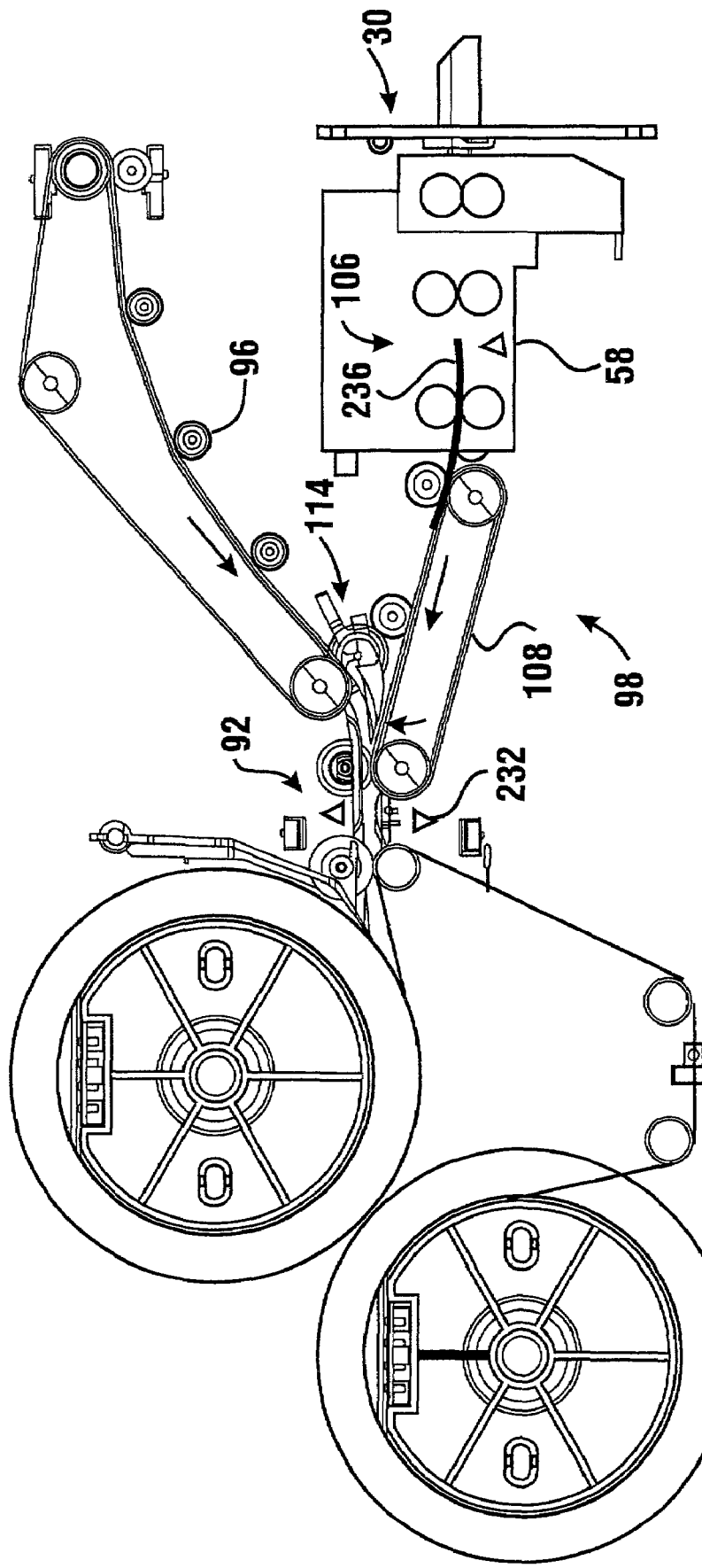
FIG. 18 is a side schematic view showing movement of note handling mechanisms when the note validator is operating to determine if an inserted note is valid.

As can be appreciated from FIGS. 11 and 18, when the note inlet transport 98 moves belt 110 in a direction opposite to that indicated by Arrow N to deliver notes toward the passage area 92, belt 102 is driven moves in a direction opposite to Arrow O. This movement causes roll 138 to rotate the pulley portions 136 and 134 to rotate the gate member 116. The gate member 116 rotates in a clockwise position in the orientation shown to the accepting position where clockwise rotation of the gate member 116 is stopped by engagement with one of the stops 140. Once the gate member 116 has moved to the accepting position the slipping member 132 slips relative to at least one of the pulley portions without causing damage to any of the components. In this position notes are enabled to pass the gate member 116 moving inward in supporting connection with belt 110 to reach the passage area 92.

While in this described exemplary embodiment the gate 114 includes a gate member 116 that is moved by the same drive mechanism as the belt 102, 110, in other embodiments other gate moving mechanisms including separate actuators may be used. Alternatively embodiments may employ passive gate members which enable passage of the notes inwardly by deflection or translational movement of the gate member in connection with the notes. Such passive gate members may through their configuration engage outwardly moving notes and direct them to engage appropriate mechanisms for moving the notes outward. Various arrangements of gate members and note moving members may be used in embodiments of the invention. It should further be understood that while single belts have been described herein as moving notes in the note inlet and outlet transports, other embodiments may include a plurality of parallel moving belts, rolls or other note moving mechanisms which are operative to move the notes in the described directions.

Figure 12:
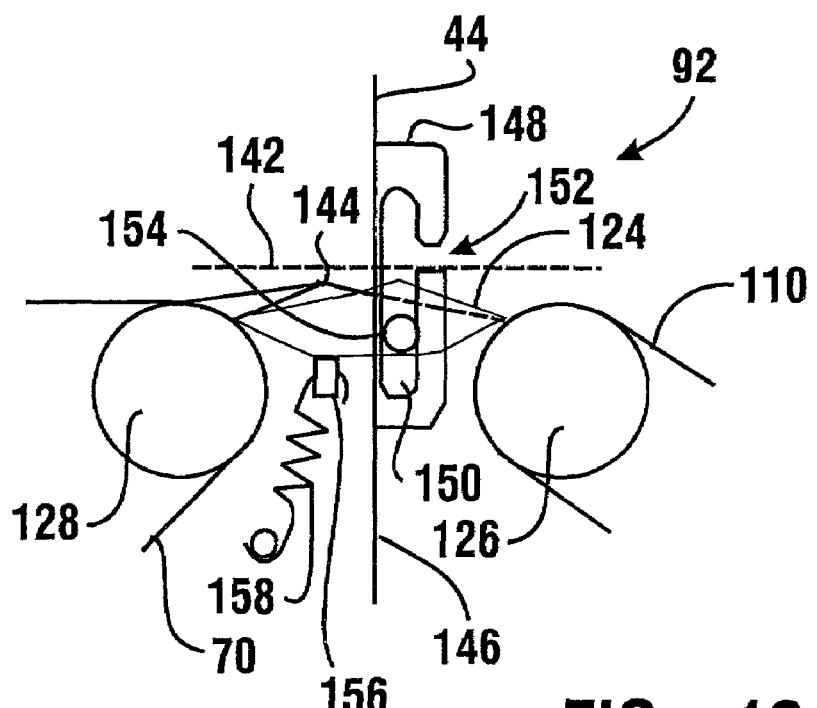
FIG. 12 is a side schematic view of the secondary separating member and its suspension on the note storage module.

FIG. 12 shows in greater detail the operation of the separating member 124 which bounds a first side of the passage area 92 where notes move to and from the note storage module 44. Notes moving through the passage area 92 generally move in a note plane schematically indicated 142 in FIG. 12. The note plane 142 extends generally along an inner surface 144 of the separating member 124, where inner refers to the orientation with respect to passage area 92. The inner surface 144 of the exemplary embodiment includes a plurality of projections as shown. The projections serve to minimize surface tension so that notes will move more easily over the inner surface 144.

The note storage module 44 includes a wall 146 containing an opening 94. The opening extends through the wall and is adapted to align with passage area 92. The opening 94 is bounded on each transverse side by an ear portion 148. Each ear portion 148 includes a generally vertically extending slot 150. A cutout portion 152 extends through the ear portion 148 to the slot 150. The separating member 124 includes a pair of outward extending projections 154 which are sized to be movable in the slot 150. The projections 154 also enable the separating member 124 to be rotatably movable relative to the note storage module 44. The separating member 124 also includes an eye 156. Eye 156 is engaged by a biasing member 158. The biasing member 158 operates to bias the separating member 124 generally in a downward direction as shown.

When the note storage module 44 is installed in the housing 12 of the machine 10, the separating member 124 is moved to a position in which a first end of the separating member 124 engages belts 110 overlying roll 126. Also in the operative position, the opposed end of separating member 124 engages the web 70 overlying roll 128. In this way the separating member 124 engages at its opposed ends arcuately shaped moving members which move notes in supporting connection therewith. The separating member 124 of the exemplary embodiment is configured to ride on the moving members and to engage notes which are supported thereon. The engagement of the separating member 124 with the notes on the moving members serves to separate the notes and direct them generally along the note plane 142 through the note passage. The separating member 124 minimizes the risks that notes will be carried by the supporting belt 110 or web 70 underneath the separating member 124 where they may jam or otherwise disrupt the operation of the mechanism. The floating character of the separating member 124 facilitates its ability to properly position itself both vertically and rotationally in the mechanism when the note storage module 44 is in its operative position. Thus the separating member 124 is enabled to correct for minor misalignments and still perform its function by engaging the arcuately shaped moving members on either side. In addition the configuration of the slot 150 and cutout portion 152 facilitate the ready replacement of the separating member 124. This is accomplished because the projections 154 may be moved through the cutout portion 152. Also the biasing member 158 may be readily disconnected from the eye 156. Thus the removal of an existing separating member 124 and installation of a new one is readily accomplished.

It should be understood that while in the described exemplary embodiment the projections are associated with the separating member 124 and the slots 150 are associated with the supporting housing structure, other embodiments may have these features reversed such that the projections are associated with the supporting housing and the slots associated with the separating member. Also in other embodiments intermediate or additional structures may be used.

Figure 10:
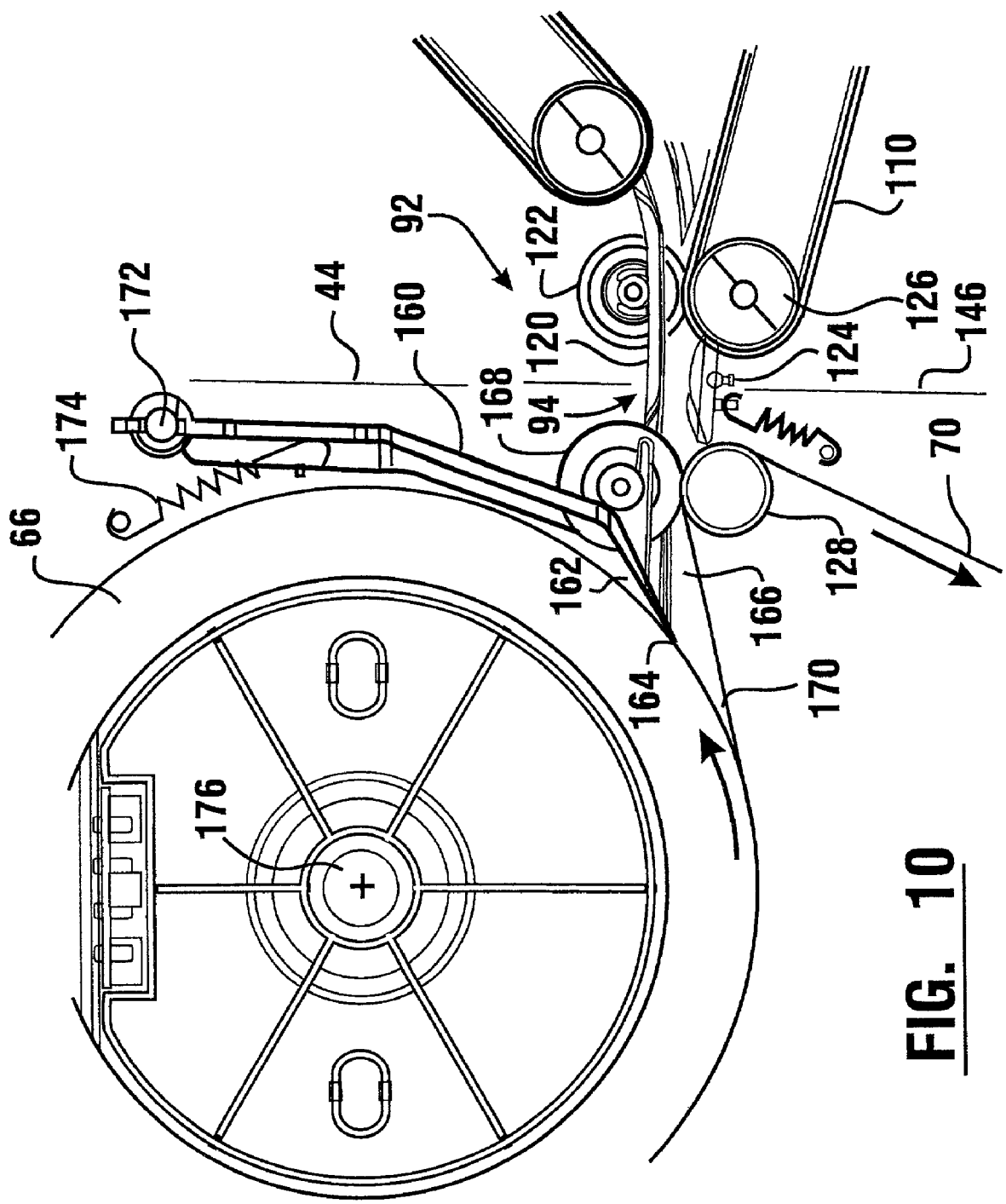
FIG. 10 is an enlarged view of the passage area including the first and second note separating members for separating notes from the note supporting web.

As best shown in FIG. 10 the note storage module 44 of the exemplary embodiment further includes a separating member 160. Separating member 160 engages an opposed side of the web 70 from that engaged by separating member 124. Separating member 160 minimizes the risk that notes supported by the web 70 on the note storage reel 66 will remain with the web 70 when the web 70 moves in a note dispensing direction. The separating member 160 aids in separating notes from the web 70 and directs them toward the passage area 92 when the note storage reel 66 rotates in the direction indicated in FIG. 10.

The separating member 160 includes an edge portion 162. The edge portion 162 engages the web 70 at a location indicated 164. A deflector surface 166 extends from location 164 toward the passage area 92. The deflector surface 166 is positioned to extend generally parallel to the web 70 in the area between the location where the web joins the note storage reel 66 and the passage area 92.

A movable member 168 engages the web 70 in generally overlying relation of the roll 128. The movable member 168 engages inward moving notes so that they can be guided by the deflector surface 166 into a nip 170 generally in the area where the web 70 joins the stored web material on the note storage reel 66. Likewise the movable member 168 serves to engage notes that are separated from the web 70 by the separating member 160 and to move the notes outward through the passage area 92.

The separating member 160 is rotatable relative to the housing 12 about an axis generally indicated 172. The separating member 160 is biased to rotate in a clockwise direction as shown about the axis 172 by a biasing member 174. The reel 66 rotates relative to the housing 12 and note storage module 44 about an axis of rotation indicated 176. In the described exemplary embodiment the angle from the nip 170, through the axis 176, to the axis 172 is a substantial angle of generally about at least 90 degrees. This configuration enables providing relatively controlled angular movement of the edge portion 162 at the location 164 as the amount of web material stored on the note storage reel 66 changes during operation of the machine. This relatively limited movement assures more reliable separation and guidance of notes from and onto supporting connection with the note storage reel 66. The configuration further minimizes the wearing of the web material by maintaining desirable relative positions of the edge portion 162 and to the web 70.

As shown in FIG. 10 the deflector surface 166 is generally located such that it extends on opposed transverse sides of the movable member 168. In certain advantageous embodiments the movable member 168 may include a plurality of transversely disposed movable members across the web 70. The deflector surface 166 may be configured to extend in the intermediate spaces between the movable members 168. In addition the guide surface 120 also extends into the areas intermediate of the deflector surfaces 166. The positioning of the deflector surfaces 166 transversely intermediate of the movable member 168 as well as the guide surfaces 120 provides a relatively movable interfitting relation of surfaces which facilitates guiding notes through the passage area 92. It should also be noted that the use of the separating members 160 and 124 which engage opposed sides of the web 70 generally help to avoid uneven wearing of the web 70 and the buildup of stresses unevenly along the surfaces thereof. This along with the configuration and orientation of the separating members 124, 160 helps to prolong the life of the web 70.

As later discussed in detail the note storage module 44 of the described exemplary embodiment includes a note receiving and dispensing mechanism generally referred to as 77 in FIG. 4. This note receiving and dispensing mechanism 77 includes the note storage and take-up reels 66 and 68 respectively. The web 70 which extends between the reels 66, 68 the roll 128 and movable member 168 which engage the web 70 in the passage area 92, and the separating member 160, serve to assure that notes are separated from the web 70 and directed to and from the passage area 92. In the operation of this described exemplary embodiment, the reel drive mechanism 72 operates to move the reels 66, 68 so that notes can be delivered to and dispensed from the passage area 92. It should be noted that in alternative embodiments a number of different types of note handling mechanisms maybe positioned adjacent to the passage area 92 to accomplish the dispense of notes to or the receipt of notes from customers.

The transport mechanisms described herein while useful are exemplary of but one of many types of mechanisms that may be used. The note storage module 44 of the described exemplary embodiment is useful because the module construction may be used with many types of note transport mechanisms including very low cost mechanisms that are suited for installations in machines that perform other types of primary functions. This includes the ability to retrofit cash dispensing capability to such machines by providing suitable mechanisms to connect the passage area and one or more outlets which may be accessed by a customer. In addition the note storage module 44 may be readily removed by authorized personnel from an interior area of the machine 10. Thus for example in a motor fuel dispensing application, a system operator may readily remove the module 44 from the fuel dispensing pumps during off hours and store such items in a secure location. The removal and reinstallation of such items can be accomplished quickly to minimize the actions required to be taken by personnel in the facility.

The operation of the note receiving and dispensing mechanism 77 within the note storage module 44 is controlled through operation of the reel drive mechanism 72. The reel drive mechanism 72 is operative to control selectively the rotation of the note storage reel 66 and the take-up reel 68. By controlling the rotation of the reels 66 and 68, notes may be brought into supporting connection with the web 70 and stored on the note storage reel 66. Likewise by controlling the rotation of the reels 66 and 68, notes stored on the note storage reel 66 may be delivered to the passage area 92.

Figure 6:
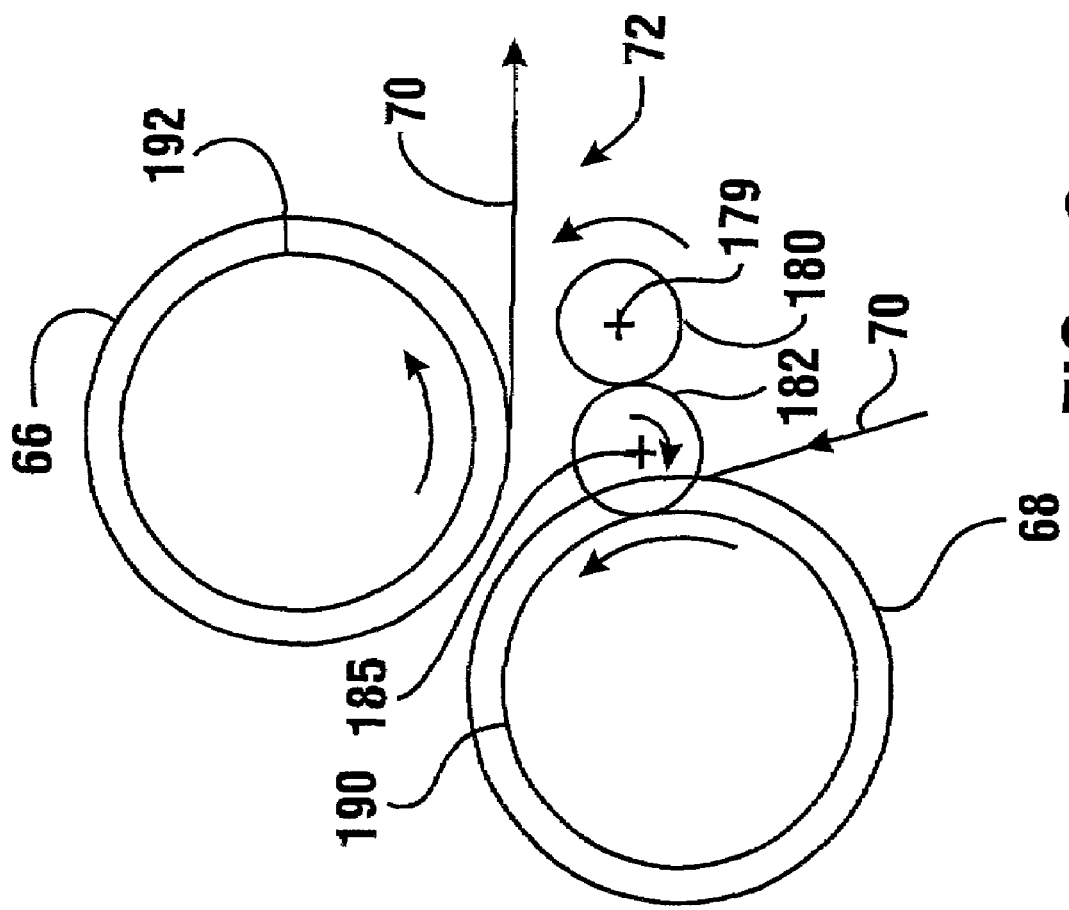
FIG. 6 is a schematic view of a reel drive mechanism operating to move the note storage and take-up reels in a note dispensing direction.

The reel drive mechanism 72 of the exemplary embodiment includes a motor or other drive indicated 178 shown in FIG. 4. The operation of the drive 178 and its direction of rotation is controllable in response to signals from the controller 52 when the note storage module 44 is installed in the machine 10. The drive 178 is operative to rotate a first drive member 180 about an axis of rotation 179 as shown in FIG. 6. The first drive member 180 in the described exemplary embodiment is a gear. However in other embodiments rollers, belts or other force transmission members may be used.

The first drive member 180 is operative to rotate a second drive member 182. In the described exemplary embodiment the second drive member 182 is rotatably connected to the transmission member 184, shown in FIG. 7, and the transmission member 184 is rotatable about the axis of rotation 179 of the first drive member 180. The second drive member 182 rotates about an axis of rotation 185 which is movable with the transmission member 184. Of course in other embodiments other drive arrangements may be used.

Figure 7:
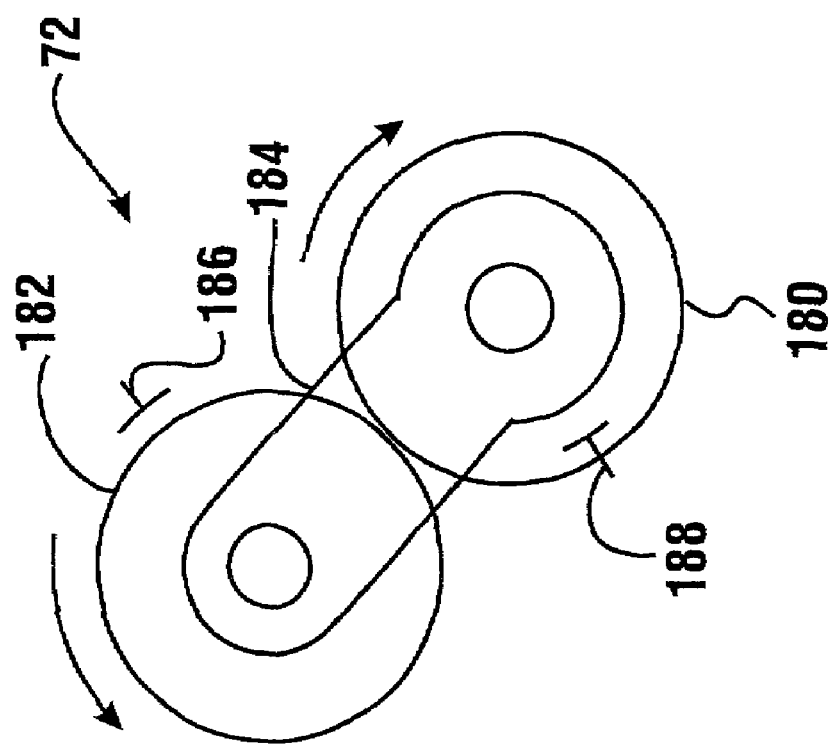
FIG. 7 is a schematic view of the first and second drive members of the reel drive mechanism, along with the transmission member which interconnects the drive members.

As schematically indicated in FIG. 7 a first drag member 186 is in operative connection with the second drive member 182. First drag member 186 is operative to apply a force resisting movement of the second drive member 182 thereon. The first drag member 186 preferably applies a resistance to movement in either rotational direction of the second drive member 182. The first drag member 186 may include a thrust washer, friction disk, bushing or other suitable member for providing a limited and controlled degree of resistance to movement of the second drive member 182. The first drag member 186 is operative so that when the first drive member 180 rotates in a clockwise direction as indicated in FIG. 7, the resistance force applied by the first drag member 186 will also tend to cause the transmission member 184 to rotate with the second drive member 182 in a clockwise position. However when the clockwise rotation of the transmission member 184 is stopped such as due to engagement of the second drive member 182 with a drive surface 192, the second drive member 182 will rotate in a counterclockwise direction responsive to rotation of the first drive member 180. Likewise the counterclockwise rotation of the first drive member 182 will move the transmission member and the second drive member 182 counterclockwise until the second drive member 182 engages a drive surface 190, in which case the second drive member 182 will rotate clockwise. It should be kept in mind that these structures are exemplary and that intermediate drive members and other mechanisms may be included while still achieving the similar results.

As shown in FIG. 7 the reel drive mechanism 72 further includes a transmission drag member 188. The transmission drag member 188 is operative to apply a limited resistance to rotation of the transmission member 184. This limited resistance to rotation is operative to provide a limited and controlled resistance to movement of the transmission member 184. It is also operative to generally hold the transmission member 184 in its then current position until it is deliberately moved responsive to rotation of the first drive member 180. The transmission drag member 188 may include a thrust washer, friction disk, bushing or other suitable device for applying resistance to movement of the transmission member 184.

As shown in FIG. 6 rotation of the first drive member 180 in a counterclockwise direction is operative to move the transmission member and the second drive member 182 counterclockwise to a position where the second drive member 182 engages a drive surface 190 of the take-up reel 68. Drive surface 190 of the take-up reel 68 is preferably a surface including gear teeth adapted for meshing engagement with gear teeth on the second drive member 182. However it should be understood that in other embodiments other drive surfaces suitable for receiving power transmitted by the reel drive mechanism 72 may be used. As shown in FIG. 6 the second drive member 182 operates to rotate the take-up reel 68 in a counterclockwise direction. This causes the web 70 to move in a note dispensing direction as indicated by the arrows shown superimposed on web 70. As the reel drive mechanism 72 operates to move the take-up reel 68 the note storage reel 66 moves in a counterclockwise direction as shown so as to unwind the web 70 therefrom and to deliver notes in supporting connection therewith to the passage area 92.

FIG. 8 shows the operation of the reel drive mechanism 72 when the web 70 is moved in a note receiving direction. The note receiving direction is the direction that the web 70 moves when notes in supporting connection therewith are wound into the note storage area supported on note storage reel 66. Rotation of the first drive member 180 in the clockwise direction shown in FIG. 8 is operative to rotate the second drive member 182 in the clockwise direction relative to the first drive member until the second drive member 182 engages a drive surface 192 on note storage reel 66. When the second drive member 182 engages the drive surface 192 the second drive member 182 rotates in a counterclockwise direction which rotates note storage reel 66 in a clockwise direction. The clockwise rotation of note storage reel 66 causes the web 70 and notes supported thereon to be wound into the web 70 for storage on the note storage reel 66. As the note storage reel 66 pulls the web 70 thereon the web 70 unwinds from the take-up reel 68.

The operation of the drag mechanisms 186 and 188 on the transmission member 184 as well as on the first drive member 180 help to assure that the second drive member 182 remains in positive engagement with the desired drive surface 190 or 192 of the note storage reel 66 and take-up reel 68 during movement thereof. Also referring to FIG. 4 it should be noted that the drive surface 192 of the note storage reel 66 preferably includes mating gear teeth to engage the second drive member 182. These mating gear teeth may also make up the interengaging projections and recesses 78 which enable the locking member 76 to hold the note storage reel 66 in position when the note storage module 44 is removed from the housing 12 as shown in FIG. 4.

Figure 13:
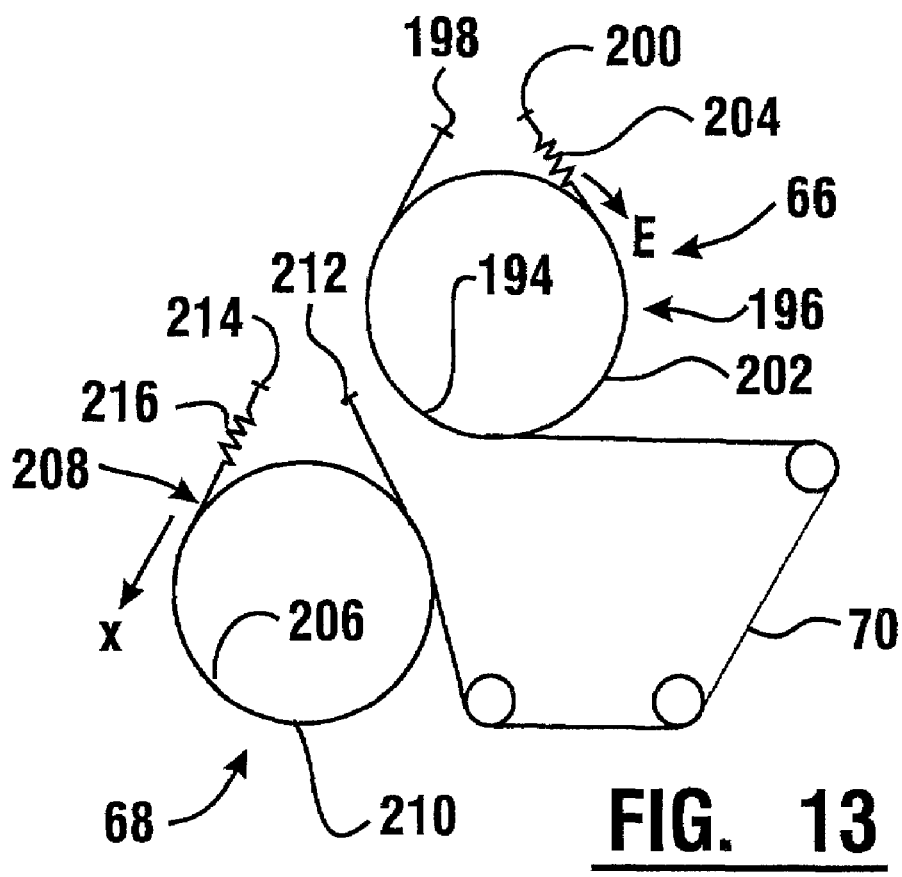
FIG. 13 is a side schematic view of the directional drag applying members used in connection with the note storage and take-up reels.

To facilitate the controlled rotational movement of the note storage reel 66 and the take-up reel 68, a controlled drag applying mechanism is included in the note storage module 44. An exemplary form of this drag applying mechanism is schematically shown in FIG. 13. The note storage reel 66 has thereon an annular brake surface 194. A directional drag applying member 196 extends about the annular brake surface 194 through an angle generally greater than 180 degrees as shown. The directional drag applying member 196 includes a first end 198 and a second end 200 which are generally fixed relative to the housing 12 through the note storage module 44.

The directional drag applying member 196 includes a band portion 202. The band portion 202 extends generally in engagement with the annular brake surface 194 of the note storage reel 66. The directional drag applying member 196 further includes an extendable portion schematically indicated 204. Extendable portion 204 includes a resilient biasing portion that is extendable in the direction of Arrow E as shown in FIG. 13.

During operation of the reel drive mechanism 72, the note storage reel 66 is rotated in a clockwise direction when it is desired to move the web 70 in a note receiving direction such that the web 70 and notes supported thereon are wound onto the note storage reel 66. When the note storage reel 66 is moved in a clockwise direction the extendable portion 204 tends to expand in the direction of Arrow E responsive to the force applied to the band portion 202 by the relative movement of the annular brake surface 194. This enables the note storage reel 66 to rotate in a clockwise direction relatively easily responsive to the force applied by the extendable portion 204. However when the note storage reel 66 is rotated responsive to movement of the web 70 in a counterclockwise direction which corresponds to the web 70 moving in a note dispensing direction, the resistance to movement of the note storage reel 66 is relatively higher. This is because the tension in the band portion 202 is higher due to a lack of an extendable portion 204 between the band portion 202 and the first end 198. As a result the tension in the band portion 202 is maintained relatively higher as the note storage reel 66 is moved in the counterclockwise direction. This provides a relatively higher drag force on the note storage reel 66 which minimizes the risk of overrunning.

A similar but oppositely disposed structure is used for applying drag force to take-up reel 68 in this exemplary embodiment. The take-up reel 68, which as previously discussed in this embodiment is identical to the note storage reel 66, includes an annular brake surface 206 thereon. A directional drag applying member 208 includes a band portion 210 that engages the annular brake surface 206 about an angle of generally more than 180 degrees. The directional drag applying member 208 is generally fixed relative to the housing at a first end 212 and a second end 214. The directional drag applying member 208 includes an extendable portion 216 adjacent the second end 214. Extendable portion 216 is expandable in an extendable direction generally indicated by Arrow X.

In operation of the reel drive mechanism 72 when the take-up reel 68 is rotated in a counterclockwise direction which moves the web 70 in a note dispensing direction, the extendable portion 216 of the drag applying member 208 expands to apply relatively lower resistance to movement of the take-up reel 68. However when the take-up reel 68 is moved in a clockwise direction responsive to the web 70 moving in a note receiving direction, a relatively higher drag force is applied to the take-up reel 68.

As a result of the directional drag applying member 208 of the described exemplary embodiment, the drag force on the reel, 66 or 68 being driven by the second drive member 182 is relatively lower. This reduces the amount of force that the reel drive mechanism 72 must produce to move the take-up and note storage reels 68 and 66. This is useful compared to systems where drag applying members act equally on reels 66 and 68 regardless of the direction in which they are moved.

Referring again to FIG. 5, web 70 extends between the note storage reel 66 and the take-up reel 68 along a web path. The web path extends adjacent to the passage area 92 in which the web 70 is supported by roll 128. The web path further includes a pair of guiding rolls 218, 220 which guide the web 70 along the web path to the take-up reel 68. A web sensor 222 is disposed adjacent to the web path between the guiding rolls 218 and 220. Web sensor 222 is in operative connection with the controller 52 and is operable to sense machine readable indicia 230 in supporting connection with the web 70.

Figure 16:
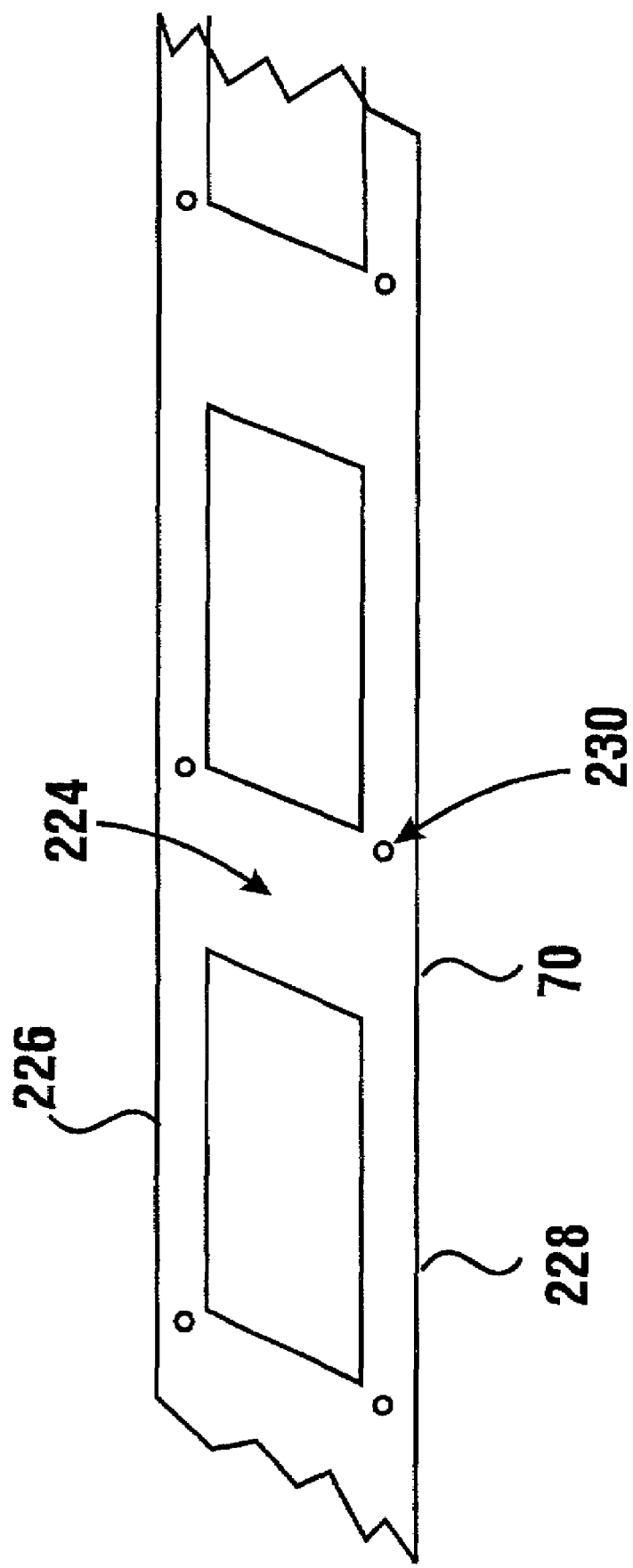
FIG. 16 is an isometric view of a flexible note supporting web with machine readable indicia thereon, the web being shown in supporting connection with notes.

FIG. 16 shows a section of web 70 of an exemplary embodiment of the invention. The web 70 includes a transversely central note engaging area generally indicated 224. The note engaging area 224 operatively engages notes therewith in the passage area 92 and holds notes in supporting connection with the note storage reel 66.

Transversely outward of the note engaging area 224 are a pair of peripheral areas 226 and 228. The peripheral areas 226, 228 extend transversely on either side of the web 70 adjacent the transverse edges thereof. The peripheral areas 226 and 228 include machine readable indicia 230 thereon. In the described exemplary embodiment the machine readable indicia 230 is indicia on the web 70 that serves to block the transmission of radiation therethrough. This blocking of radiation is sensed by the web sensor 222. Of course in other embodiments other types of indicia which can be sensed or read by a sensing device may be used.

As previously discussed, the opposed ends of the web 70 are connected to the take-up reel 68 and the note storage reel 66 respectively. In the described exemplary embodiment the machine readable indicia 230 are configured so as to correspond to a location on the web 70 relative to an end. In the described exemplary embodiment the machine readable indicia 230 are symmetrical on the web 70 and are configured such that the spacing between adjacent indicia 230 decreases with proximity to each end. This construction in the described exemplary embodiment enables the installation of the web 70 in any of four possible orientations. Thus a person replacing the web 70 need not be concerned that it could be installed improperly. This is because of the symmetry of the machine readable indicia 230 in the peripheral areas 226, 228 as well as the decreasing spacing between the machine readable indicia 230 with proximity to the end.

In operation of the machine, the web sensor 222 is operative to cause the controller 52 to include data in the data store 56 representative of the location for the machine readable indicia 230 which is in proximity to the web sensor 222. In the described exemplary embodiment this data may include data corresponding to a count of a number of machine readable indicia 230 which have moved past the sensor from a reference position located adjacent to a first end of the web 70 at a first end area adjacent to the take-up reel 68. By holding this data which corresponds to a count, the controller 52 may be operative to determine the relative position of the web 70 with respect to the ends thereof. In addition or in the alternative, the controller 52 may also hold data representative of a count of the notes which are currently stored in supporting connection with the note storage reel 66. This number of notes may be correlated with the machine readable indicia 230 such that the controller 52 coordinates the location information provided by the machine readable indicia 230 with data corresponding to the number of notes in storage.

Alternatively, the decrease in spacing of the machine readable indicia 230 with proximity to the ends of the web 70 enables the controller 52 in the described exemplary embodiment to detect a condition which suggests that the web 70 is approaching the first end or the second end. This enables the controller 52 to provide a signal through a communications device 48 or through another output device to indicate that the machine is either reaching a condition where it can hold no further notes or is approaching a condition where it is running out of notes. For example the web 70 must move at least a distance somewhat greater than the length of a note in the dispense of one note. If in moving the web 70 this distance during the dispensing of a note the web sensor 222 senses passage of more than a set number of machine readable indicia 230 on the web 70, the controller 52 may determine that the web 70 is approaching the second end which means that few notes are left on the note storage reel 66. By the number of machine readable indicia 230 which pass the web sensor 222 in the dispense of one note or sheet the controller 52 knows generally accurately how close the web 70 now is to reaching the end area when no further notes are stored on the note storage reel 66.

Likewise when operating to receive a note, the reel drive mechanism 72 moves the web 70 a length that is generally slightly greater than the length of one note. If in the process of accepting a note the web sensor 222 senses more than a set number of machine readable indicia 230 passing the web sensor 222, the controller 52 may determine that the web 70 is approaching the first end at which point no further web material is stored on the take-up reel 68. By the number of machine readable indicia 230 passing the web sensor 222 with the receipt of a note, the controller 52 is operative to determine relatively accurately the position of the web 70. This enables the controller 52 and its operatively connected memory 56 to determine and indicate quantity condition data which is indicative of a need to replenish the machine 10, that the machine 10 is full and/or some notes will need to be removed from the machine 10 within a given time period. The machine 10 is still capable of accomplishing this even if the portion of the memory 56 which may be holding information corresponding to an exact location of the web 70 should be lost or corrupted, as discussed in more detail below.

In alternative embodiments the web 70 may be labeled with machine readable indicia 230 which are uniquely indicative of the relative web 70 position. This might be for example machine readable indicia 230 representative of a numerical series. By reading such machine readable indicia 230 with one or more sensors 222, the controller 52 may be operative to determine the position of the web 70 and to provide signals corresponding to conditions that exist as a result of the web 70 being in the particular position.

An example of how one exemplary embodiment may operate to dispense notes and to maintain a count of the number of notes remaining is discussed in connection with FIG. 17. In the described exemplary embodiment notes are dispensed responsive to a user inputting an input through one or more of the input devices. This may include for example a customer passing a card 18 through the card reader 16 which includes account data corresponding to the customer. If the card 18 is a debit card the customer may also input a personal identification number (PIN) through the keys of the keypad 20. The customer may thereafter indicate that they wish to withdraw notes and may enter the value of the notes to be withdrawn through inputs through the function keys 22 and/or the keypad 20 keys. In response to these inputs the controller 52 is operative in the described exemplary embodiment to operate the communications device 48 to determine through communication with another computer system whether the customer is authorized to withdraw the funds requested. Assuming that the customer is authorized to withdraw the funds the communication device 48 receives back from a host computer or other connected system a message indicating that the requested withdrawal by the customer is permissible. The controller 52 then operates the reel drive mechanism 72 to rotate the take-up reel 68 in the direction indicated. This causes the note storage reel 66 to rotate in the direction shown. Rotation of the note storage reel 66 causes notes to be separated from the web 70 and moved into the note passage area 92.

Figure 17:
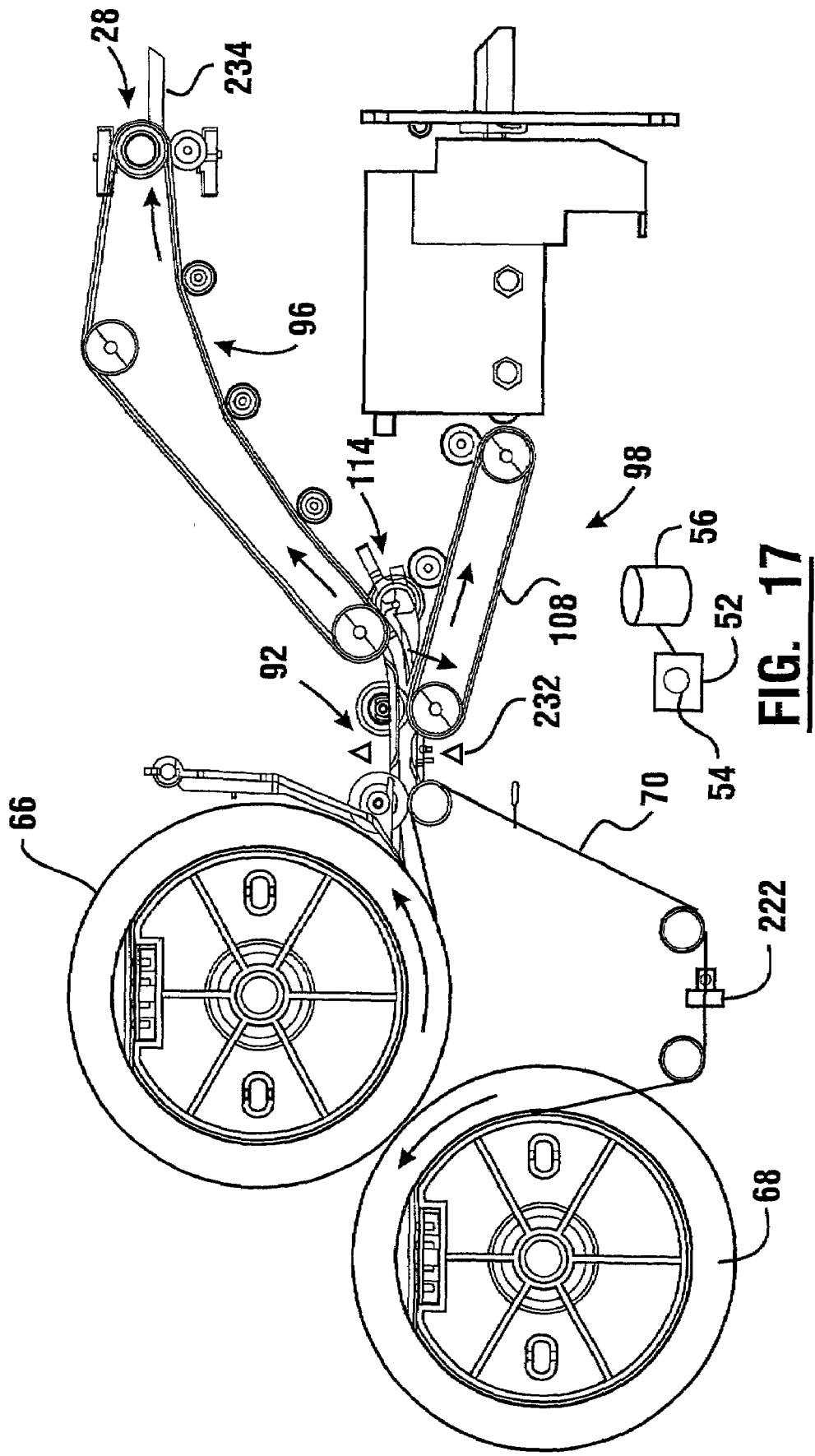
FIG. 17 is a side schematic view indicating movement of parts of note handling mechanisms when dispensing notes.

As shown in FIG. 17 in the described exemplary embodiment a passage sensor 232 is positioned adjacent to the passage area 92. Passage sensor 232 is operatively connected to the controller 52 and is operative to sense notes therein. The passage sensor 232 is operative to sense the leading edge of the note entering the passage area 92. In response to the passage sensor 232 the controller 52 is operative to operate the transport drive 62 which operates the note outlet transport 96. The note outlet transport 96 runs so that notes in connection therewith move toward the note outlet opening 28. This motion of the note outlet transport 96 also causes the gate 114 to move to the directing position to engage notes with the note outlet transport 96. In the described configuration the note outlet transport 96 and the limited slip portion 108 of the note inlet transport 98 move in cooperating relation so as to move notes from the passage area 92 into engagement with the note outlet transport 98.

The reel drive mechanism 72 moves the web 70 in the note dispensing direction until the end of the note is sensed passing the passage sensor 232. The note passing the passage sensor 232 is carried by the note outlet transport 96 to the note outlet opening 28 where it is delivered to the customer. This is represented by a note 234. The note 234 at the note outlet opening 28 may be held in a tray or by other suitable holding devices until taken by the customer. Alternatively a suitable sensor adjacent to the note outlet opening 28 which is connected to the controller 52 may operate to hold the note in connection with the note outlet transport 96 in a stopped relation until the customer physically pulls it from the opening. Various approaches to delivering the notes may be used depending on the nature and character of the automated transaction machine.

Additional notes beyond one may be delivered. The controller 52 operates the reel drive mechanism 72 to dispense additional notes through the passage area 92 and to deliver them through the note outlet transport 96 to the customer. When the number of notes has been dispensed which corresponds to the input from the user, the controller 52 operates to stop both the reel drive mechanism 72 and the note outlet transport 96.

In the course of dispensing notes from the note storage reel 66 the passage sensor 232 senses each note. The passage sensor 232 may be a radiation type sensor that is capable of sensing both the leading and trailing edges of the note. Of course in other embodiments other types of passage sensors may be used. As the web 70 moves to deliver one or more notes to the passage area 92 the web sensor 222 provides signals to the controller 52. In response to the sensing of the machine readable indicia 230 by the web sensor 222 the controller 52 generates signals. These signals include data representative of note quantities. This may include for example in some embodiments a simple count which corresponds to a length of web 70 remaining on the note storage reel 66. Because the notes are generally spaced at a uniform spacing this count data is representative of a quantity of notes remaining. This data can be stored in the memory 56 as a quantity condition which corresponds to the number of notes remaining.

Alternatively in other embodiments the web sensor 222 may be operative to sense the number of machine readable indicia 230 which pass the web sensor 222 as a note is moved through the passage area 92 as sensed by the passage sensor 232. The number of machine readable indicia 230 which pass the web sensor 222 as a single note is dispensed can be correlated with the distance of the location adjacent the sensor to the end of the web 70. The controller 52 is operative responsive to the web sensor 222 sensing more than a determined number of such machine readable indicia 230 during the dispense of a single note may be programmed to store and provide an indication of a quantity condition which indicates that the machine 10 is in need of note replenishment.

In addition to using the machine readable indicia 230 on the web 70 to provide data representative of the quantity of notes remaining, the controller 52 may also be operative to cause actual count data or data representative of a value to be stored in memory 56. In this way the controller 52 may be operative to maintain information on how many notes remain stored in the machine 10 at any time. This may enable a user to query the controller 52 to determine the number of remaining notes.

In the event that the described form of the controller 52 should experience a failure of volatile memory data stored in the memory 56 concerning the number of notes remaining, the controller 52 may operate the machine to execute a recovery operation to determine how many notes are remaining. The executable steps necessary to perform this recovery operation may be stored in nonvolatile memory so that the machine 10 can almost always execute the recovery operation no matter what conditions are experienced. In the recovery operation the controller 52 responds to a loss of available memory data by operating the reel drive mechanism 72 to wind the web 70 onto the note storage reel 66. The reel drive mechanism 72 continues to wind the web 70 onto the note storage reel 66 until a first end area adjacent the end of the web 70 attached to the take-up reel 68 is sensed. This may be done a number of ways, for example by the web sensor 222 sensing a set number of machine readable indicia 230 on the web 70 within a given time period which the controller 52 determines through use of the clock device 54.

Once the controller 52 has determined that the web 70 has been wound onto the note storage reel 66 to generally the full extent, the controller 52 operates the reel drive mechanism 72 to begin moving the web 70 from the note storage reel 66 to the take-up reel 68. As the reel drive mechanism 72 is operated by the controller 52 to do this the controller 52 generates signals responsive to machine readable indicia 230 sensed by the web sensor 222. These signals are indicative of how far the web 70 has moved at any given time. The process of winding the web 70 onto the take-up reel 68 is stopped when the passage sensor 232 senses the first note entering the passage 92. At this point the controller 52 is operative to generate a further signal which corresponds to the location on the web 70 where first note is sensed. Because the notes are generally stored in relatively uniformly spaced relation, the further signal generated is indicative of a number of notes that remain in supporting connection with the web 70 on the note storage reel 66. This enables the controller 52 to closely determine how many notes remain in storage. Further operation of the note receiving and dispensing mechanism 240 may thereafter be continued, using the data corresponding to the note quantity determined through the recovery operation. Of course this is but one example of operation of the machine used in connection with a described exemplary embodiment. In other embodiments other approaches to calculating and determining the number of notes in storage at any given time may be used. For example in cases where the machine readable indicia 230 on the web 70 each indicate a unique web position, the controller 52 may need to move the web 70 only to the next machine readable indicia 230 to determine web 70 position.

Figure 19:
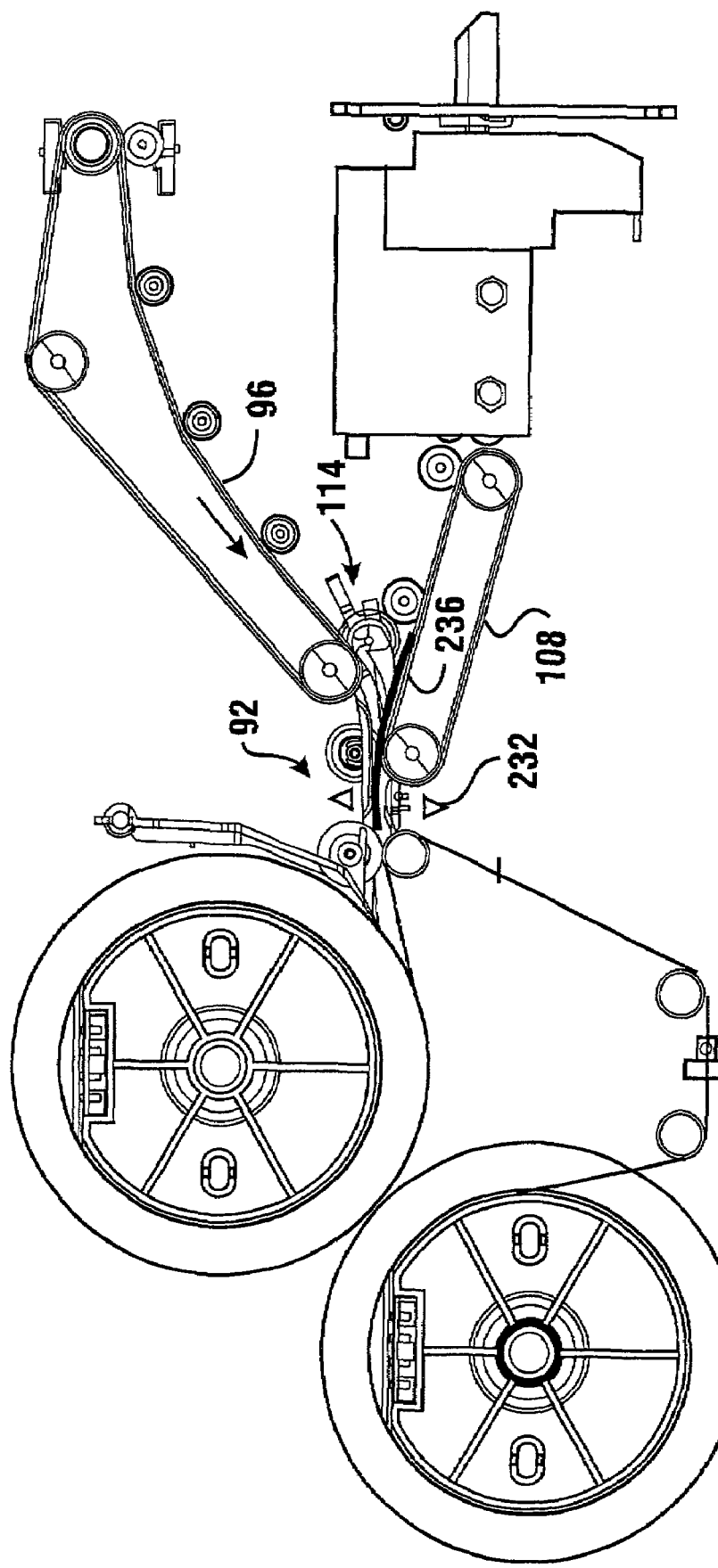
FIG. 19 is a schematic view showing a note that has passed from the note validator to the passage area.
Figure 20:
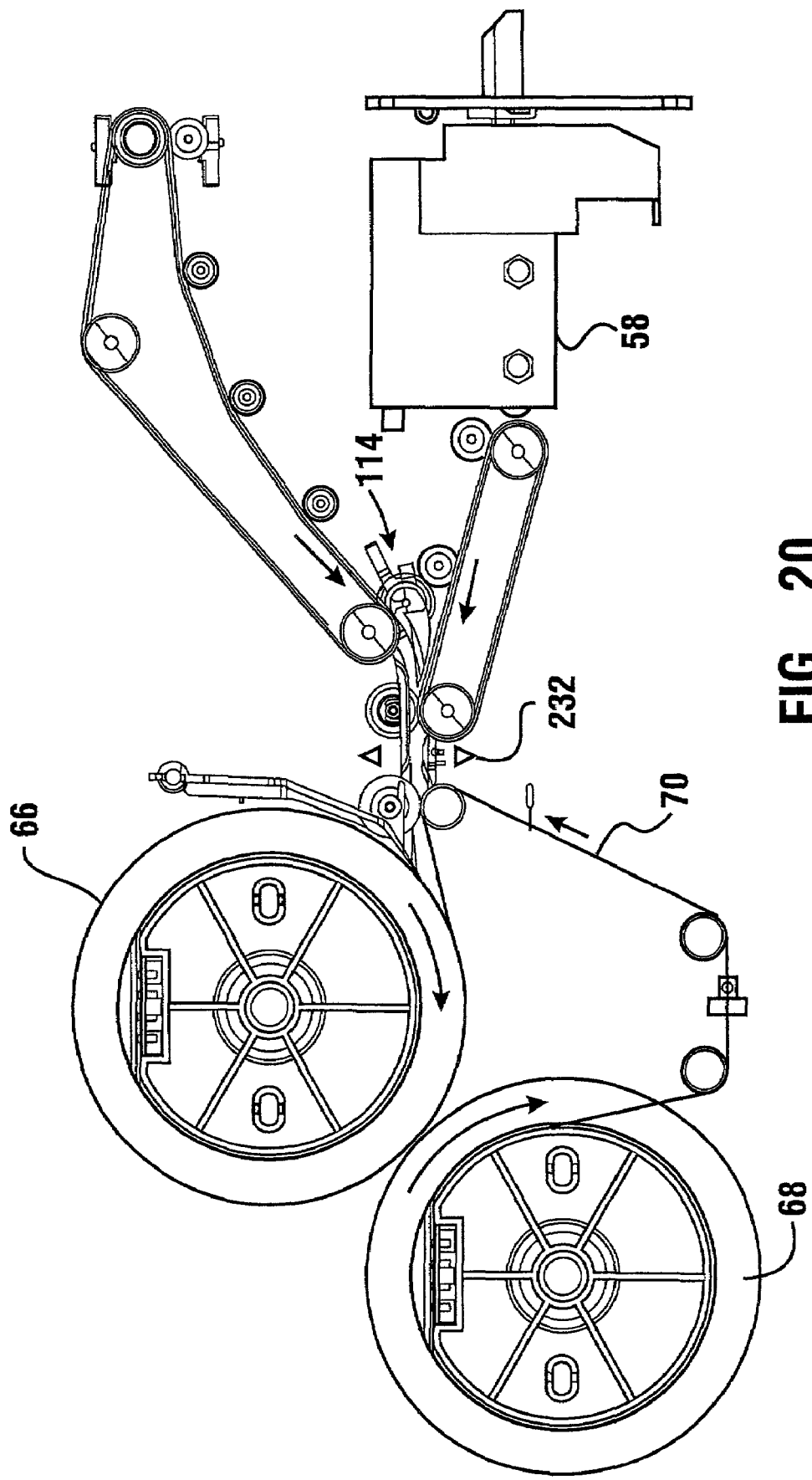
FIG. 20 is a schematic view indicating operation of note handling mechanisms in moving a note through the passage area and into supporting connection with the web and note storage reel.

The operation of the machine 10 to receive a note is now explained with reference to FIGS. 18-20. To insert notes into the machine 10 may require an appropriate input by an authorized user through the input devices. This may include special cards or codes which are used by servicing personnel to replenish notes in the machine 10. Alternatively as was discussed in connection with FIG. 1, the housing 12 of a machine 10 may include a physical security device which can be accessed by authorized personnel and which only enables such personnel to input notes into the note inlet opening 30. Alternatively the note inlet opening 30 may be positioned relative to the housing 12 in such a way that it is generally only accessible by authorized personnel. Finally in some embodiments users may both insert cash into the note inlet opening 30 as well as receive cash through the note outlet opening 28. The particular user activities that may be required enable the machine 10 to operate to accept notes through the note inlet opening 30 will depend on the particular machine and the programming of the controller 52.

When notes are to be accepted a note is inserted through the note inlet opening 30 to the note inlet transport 98. In the note inlet transport 98 the note first extends in the nonslip portion 106 of the note inlet transport 98 which extends adjacent to the note validator 58. The note validator 58 includes sensors therein for sensing if the inserted note is a note that is valid for acceptance by the machine 10. For example in this embodiment the note validator 58 may be configured to accept only US twenty dollar bills and to reject all other inserted notes as invalid for this machine 10. The controller 52 operates in connection with the note validator 58, and a note schematically represented 236 is moved therein by the nonslip portion 106. The nonslip portion 106 may be included within the note validator 58 or, in other embodiments, may be part of the machine 10 in which the note validator 58 is incorporated. As represented in FIG. 18 the note 234 may be extended from the nonslip portion 106 into the limited slip portion 108 which is driven by the transport drive 100 to move in the direction indicated. The limited slip portion 108 engages the note 234 but allows it to be moved back and forth by the nonslip portion 106. In the event that the note 234 is determined to be invalid the nonslip portion 106 may disengage the note 234 from the limited slip portion 108 and move it back outwards through the note inlet opening 30. If the note 234 is determined to be valid however the nonslip portion 106 releases the note 234 into the limited slip portion 108 which moves the note 234 in connection therewith towards the passage area 92.

In the described exemplary embodiment the limited slip portion 108 and the note outlet transport 96 are operated by a common drive mechanism. Because of this, movement of the limited slip portion 108 in the direction indicated also causes the note outlet transport 96 to move in a manner which causes the gate 114 to be rotated to the note accepting position. As a result the note 234 is moved to the passage area 92 as shown in FIG. 19. When the note reaches the passage area 92 it is sensed by the passage sensor 232.

The controller 52 is operative responsive to the note 234 being sensed by the passage sensor 232 to operate the reel drive mechanism 72. The controller 52 is operative to cause the web 70 to move in the note accepting direction as shown in FIG. 20. The reel drive mechanism 72 moves the web 70 so that the note 234 comes into supporting connection therewith and is wound onto the note storage reel 66. The controller 52 continues to operate the reel drive mechanism 72 until the trailing edge of the note 234 is sensed as passing the passage sensor 232. Thereafter the controller 52 may operate the reel drive mechanism 72 to move the note 234 a sufficient distance so as to provide spacing from the next note which is inserted. Once the controller 52 has moved the inserted note 234 a sufficient distance onto the note storage reel 66 the reel drive mechanism 72 stops until instructed to move further by the controller 52.

While in this first described exemplary embodiment the nonslip portion 106 adjacent the note validator 58 is operative to immediately push out notes that are sensed as not valid, alternative embodiments may be programmed to operate differently. For example a controller 52 may be programmed to move a note 234 in the note inlet transport 98 past the note validator 58. If the note validator 58 senses an invalid note, the note 234 may be stopped at the passage area 92 once the trailing edge of the note 234 has passed the gate 114. The controller 52 may thereafter operate to reverse the direction of the transports 96 and 98 which causes the gate 114 to direct the note 234 outward through the note outlet opening 28. The controller 52 may operate both the note inlet and outlet transports 98 and 96 as well as the note storage mechanism to accomplish this. This may include for example causing the invalid note 234 to be stored partially or temporarily in supporting connection with the web 70 before the direction of the note 234 is reversed to deliver the note 234 outward. It should be understood that these approaches are examples and other embodiments may operate differently to reject notes 236.

Figure 21:
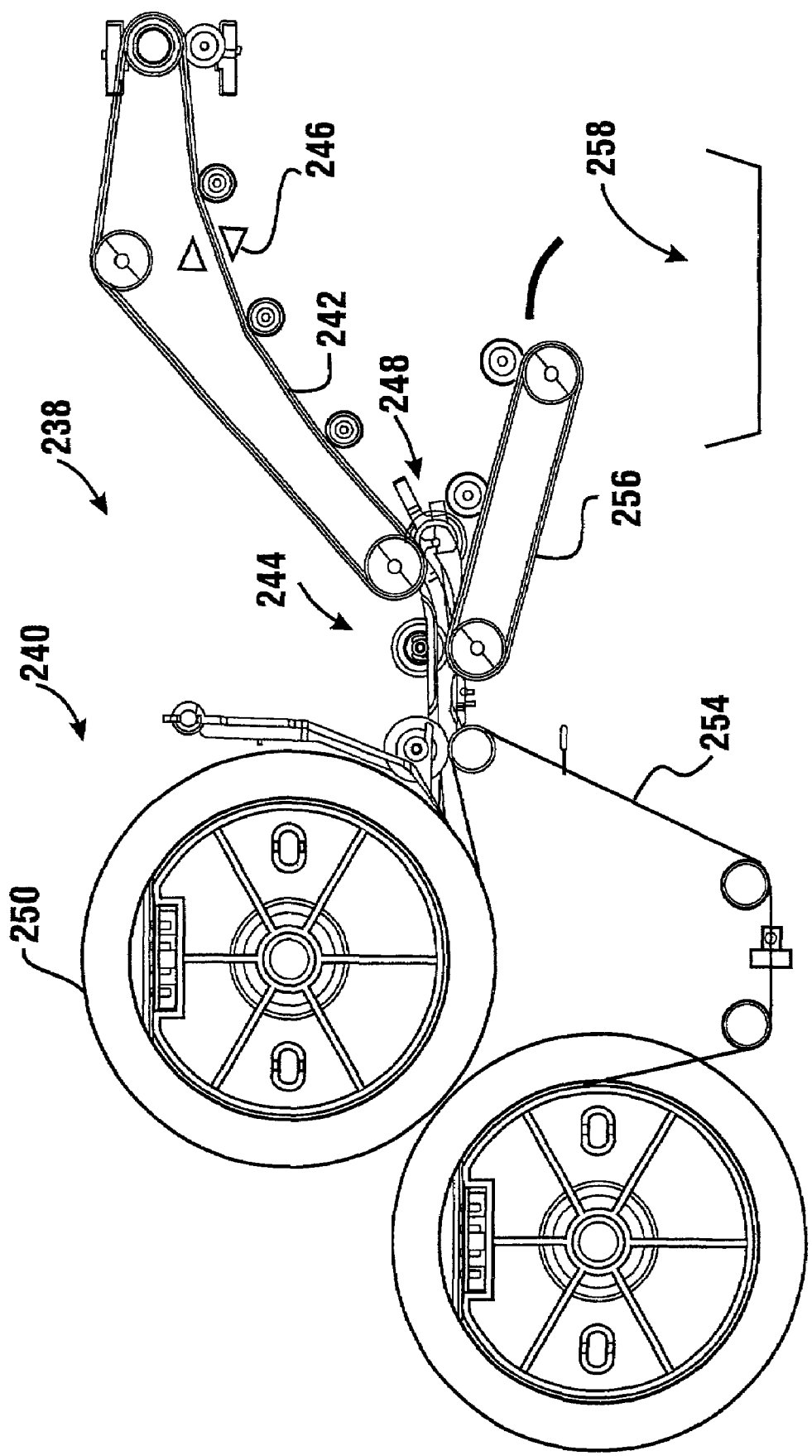
FIG. 21 is a schematic view of an alternative embodiment of an automated transaction machine which includes a common note inlet and outlet transport in connection with a note validator.

Alternative embodiments may be produced to accommodate other types of validating mechanisms. FIG. 21 shows an alternative form of a note handling mechanism generally indicated 238. Note handling mechanism 238 is generally similar to that previously described except as otherwise indicated. It includes a note receiving and dispensing mechanism 240 similar to mechanism 77 previously discussed. Note handling mechanism 238 further includes a combined note inlet and outlet transport 242. Note inlet and outlet transport 242 is selectively operative to both move notes into and out from a passage area 244. Note sensors 246 are positioned adjacent to the transport 242. Note sensors 246 may be operative to sense that the note is valid, such as for example whether a note which is passing through the transport 242 is a valid US twenty dollar bill. An example of a suitable note sensing device for this purpose is described in U.S. Pat. No. 5,923,413 which is owned by the Assignee of the present invention and incorporated by reference as if fully rewritten herein. In other embodiments, a commercially available note validator such as note validator 58 may be used, with suitable adjustments for the additional features often incorporated in such commercial devices.

If the note is sensed as valid it may be moved by a transport 242 past a gate 248 and into a storage location on the note storage reel 250. Likewise when the note is to be dispensed from the note storage reel 250, a web 254 which holds the notes in supporting connection with the note storage reel 250 may move the note into the passage area 244. The gate 248 is moved by an actuator (not shown) to direct the note to engage the transport 242. The transport 242 then operates in a direction to carry the note from the passage area 244 to a note outlet adjacent the end of the transport 242.

If the controller 52 of the note handling mechanism 238 is operating to sense notes being input into the machine 10 and the note sensors 246 operate to sense an invalid note, the transport 242 may be reversed immediately to reject the note. Alternatively if it is not desired to reject the note through the exterior of the machine 10, the note may be moved by the transport 242 into the passage area 244. The note may also be moved partially onto the web 254 as is necessary in the operation of the machine 10. Thereafter, after the note has been moved to the storage area 258, the position of the gate 248 may be changed and the controller 52 may operate a reject transport 256. The reject transport 256 is operated to move the note inward to a storage area 258 inside the housing 12 of the machine 10. As a result suspect notes are held within the housing 12 of the machine 10 until they can be removed by authorized personnel.

An advantage of the described exemplary embodiment shown in connection with note handling mechanism 238 is that a single transport can be used as both the inlet and the outlet transport for notes. This may have advantages in some embodiments in which the validity of notes may be determined within a single note path which moves selectively in opposed directions.

Figure 22:
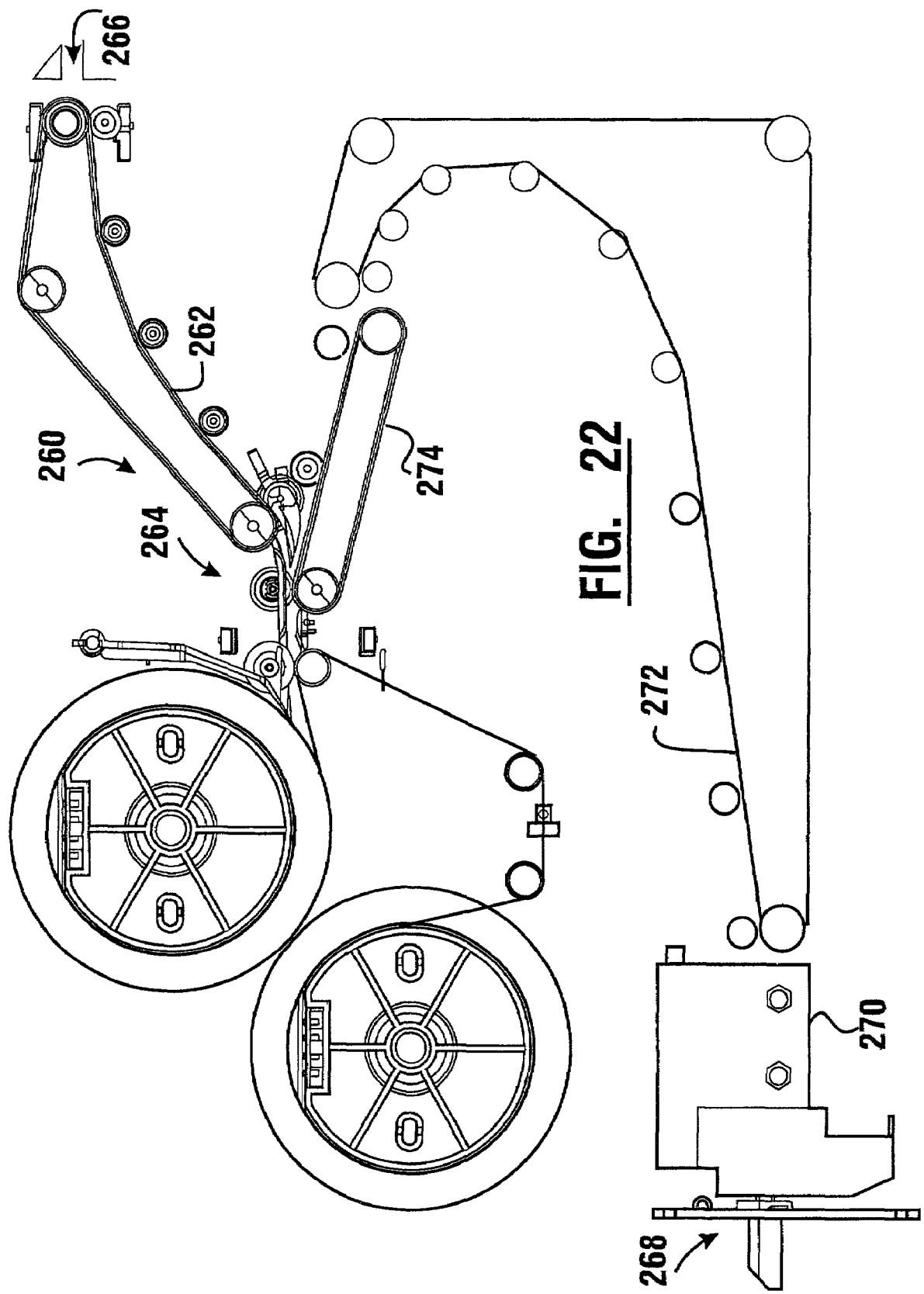
FIG. 22 is a schematic view of a further alternative embodiment which has a note inlet opening on an opposed side of the machine from the note outlet opening.

An alternative note handling mechanism generally indicated 260 is shown in FIG. 22. The note handling mechanism 260 is similar to the first note handling mechanism 64 described except where otherwise indicated. Note handling mechanism 260 includes a note outlet transport 262 that extends between a passage area 264 and a note outlet opening 266. Mechanism 260 further includes a note inlet opening 268. The note inlet opening 268 extends in a housing wall of the machine 10 which is generally opposed of a housing wall in which the note outlet opening 266 extends. Inlet opening 268 is operatively connected to a note validator 270 which may be of a type previously described. The note validator 270 is connected to a first limited slip transport section 272 and a second transport section 274. Transport sections 272 and 274 are operative to carry notes that have passed the note validator 270 to the passage area 264.

The operation of the mechanism 260 is generally similar to the first described exemplary embodiment of the invention. However an advantage of the construction shown in FIG. 22 is that an operator of the machine 10 is enabled to load currency into the machine 10 from the rear. Certain exemplary embodiments may be sufficiently small such that they may be supported on a counter top or on a standard interior building wall. This enables the machine 10 operator to feed notes into the machine 10 from behind the counter or from within an interior room within a building. This may facilitate loading of notes in the machine 10 as the machine operator does not have personnel blocking access to the machine 10 as notes are being loaded, which may discourage customers from using the machine 10. In addition this configuration may eliminate the need for covers or other devices over the note inlet opening 268 to prevent confused customers from attempting to insert things into the note inlet opening 268. Further advantages of this alternative structure shown in FIG. 22 will be apparent to those skilled in the art.

Figure 23:
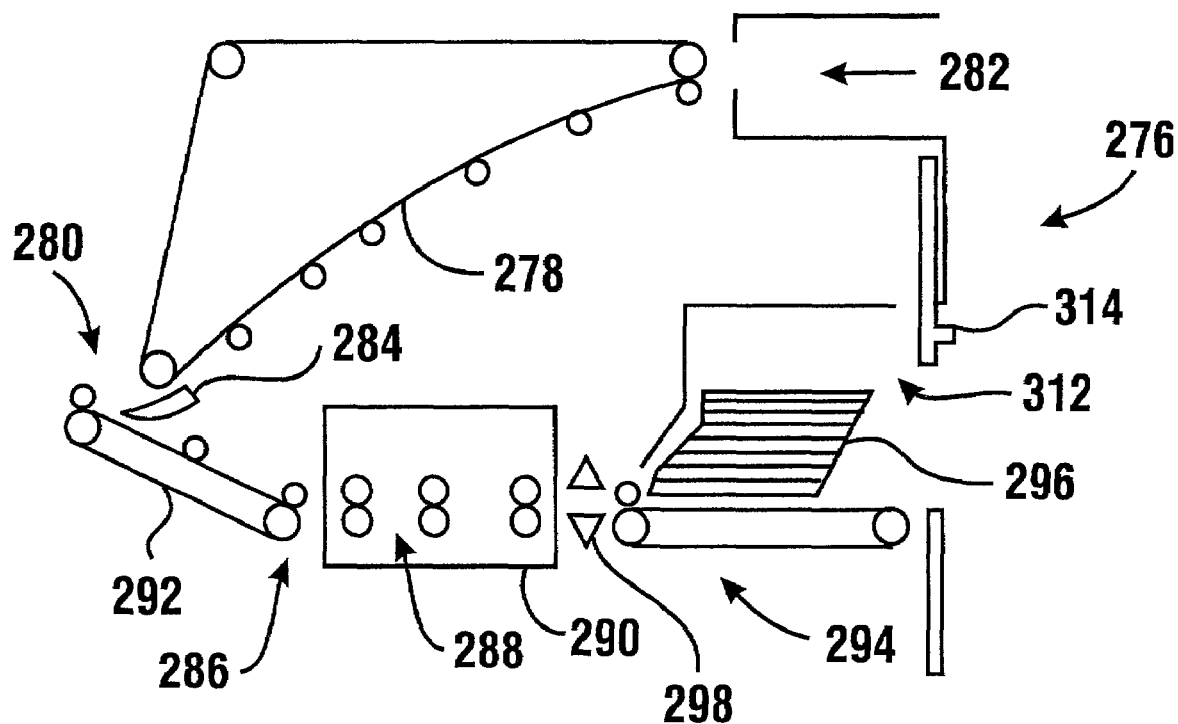
FIG. 23 is a schematic view of an automated transaction machine which is capable of receiving and separating a stack of notes.

Yet another embodiment of a note handling mechanism generally designated 276 is shown in FIG. 23. This alternative note handling mechanism 276 is operative in the described exemplary embodiment to work in connection with the note receiving and dispensing mechanism 77 of the first embodiment including the note storage module 44 which has been previously described. The note handling mechanism 276 is operative to avoid the need for a user to insert notes generally one at a time for storage within the machine.

The note handling mechanism 276 includes an note outlet transport 278 which extends between a passage area 280 and a note outlet opening 282. A gate 284 is positioned adjacent to the passage area 280 and operates in the manner previously described. An note inlet transport 286 includes a first portion 288 which extends adjacent to a note validator 290. A second transport portion 292 extends between the note validator 290 and the passage area 280.

The note separating mechanism generally indicated 294 is positioned generally adjacent to the note validator 290, which may be of a type previously discussed. The note separating mechanism 294 is operative to separate notes individually from a stack 296 and deliver the individual notes to the note validator 290. A note thickness sensor 298 is positioned adjacent to the note separating mechanism 294. The note thickness sensor 298 operates to sense if more than one note has been removed from the stack. In the event that more than one note is sensed as passing from the stack toward the note validator 290, the controller 52 is operative to cause the note separating mechanism 294 to reverse the movement of the note. The note is moved back into the stack and another attempt made until a single note is separated as sensed by the thickness sensors 298 and delivered to the note validator 290.

Figure 24:
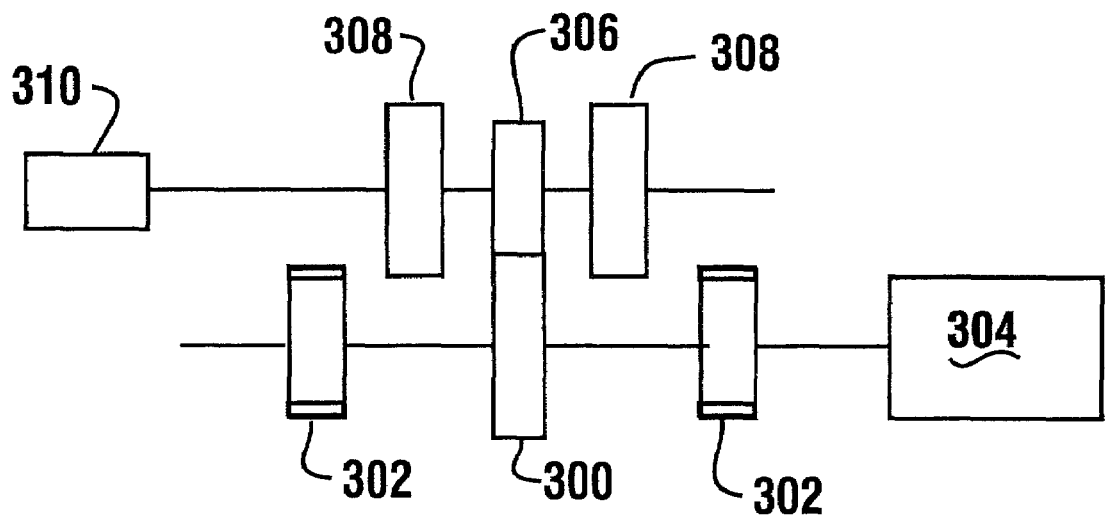
FIG. 24 is a schematic view of a mechanism used for separating notes individually from the stack in the embodiment shown in FIG. 23.

An exemplary note separating mechanism 294 is shown schematically in FIG. 24. The arrangement includes a central feed roll 300 which is flanked by two supplementary belt supporting feed rolls 302. The feed rolls 300 and 302 are rotated by a drive schematically indicated 304. The drive 304 is selectively operated responsive to signals from a controller 52.

A contact stripper roll 306 and a pair of non-contact stripper rolls 308 are positioned in generally opposed abutting arrangement with feed rolls 300 and 302. Rolls 306 and 308 are connected on a common shaft to a one-way clutch 310. The one-way clutch 310 is operative to resist rotation of rolls 306 and 308 in a direction which would facilitate the movement of notes from the stack towards the note validator 290. However the one-way clutch 310 readily enables the rolls 306 and 308 to rotate in a direction generally moving notes away from the note validator 290 towards the stack. When the drive 304 moves rolls 300 and 302 to move a note at the bottom of the stack 296 towards the note validator 290, both rolls 306 and 308 resist motion of the note. This generally prevents all but the first note at the bottom of the stack from moving past the sensors 298 to the drive portion 288 adjacent the note validator 290. If however multiple notes are sensed by the sensors 298 as being passed out of the stack, the controller 52 operates to reverse the direction of drive 304. In this situation rolls 306, 308, 300 and 302 cooperate to readily help move the notes back into the stack.

As shown in FIG. 23 in the described exemplary embodiment the stack 296 may be inserted in an unstack area 312 within the housing 12 of the machine 10. Access to the unstack area 312 may be controlled by a door schematically indicated 314. In the described form of the mechanism shown in FIG. 23, the machine operator is enabled to place a stack of notes in the unstack area 312 and then close and secure the door 314. The machine 10 may thereafter operate to separate the notes in the stack to validate them as proper and to store the notes in the storage reel of a connected note storage module 44. If in the course of sensing the notes invalid notes are found, the invalid notes may be diverted through operation of the gate 284 into the transport 278 which can deposit the notes in the area adjacent to the note outlet opening 282. Alternative embodiments may provide other storage areas for holding invalid notes. Further alternative embodiments may provide for interrupting the note validating and stacking operation of the machine for a user who wishes to operate the machine 10 for dispensing purposes. An example of a note separation mechanism which may be used in embodiments is shown in U.S. Pat. No. 6,109,522, the disclosure of which is incorporated herein by reference. Of course other alternative arrangements and configurations utilizing the principles described herein may be devised by those skilled in the art.

Figure 25:
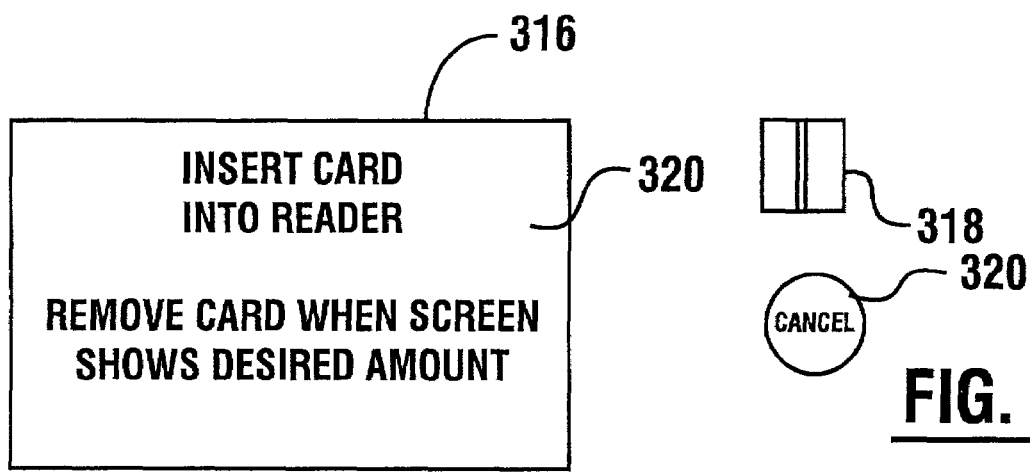

As previously discussed, alternative forms of user interfaces may be provided for use in connection with embodiments of the invention. Such an alternative embodiment is shown in FIGS. 25-30. The alternative embodiment includes a display 316 which in various embodiments may be an LCD, CRT or other type of visual or nonvisual output device. The user interface further includes an input device in the form of a dip card reader for reading magnetic stripe cards generally indicated 318. The user interface further includes a cancel button indicated 320. In this simplified user interface the controller 52 operates to display messages which can be observed by the user on the display 316. These various displays which include preprogrammed text and/or graphics are referred to as screens herein. When the machine 10 is waiting for a customer to begin operating the machine 10 an initial screen indicated 320 and shown in FIG. 25 is output on the display 316. The initial screen 320 instructs a user to insert their card into the dip reader and to withdraw the card therefrom when the amount that they desire is on the screen.

Figure 26:
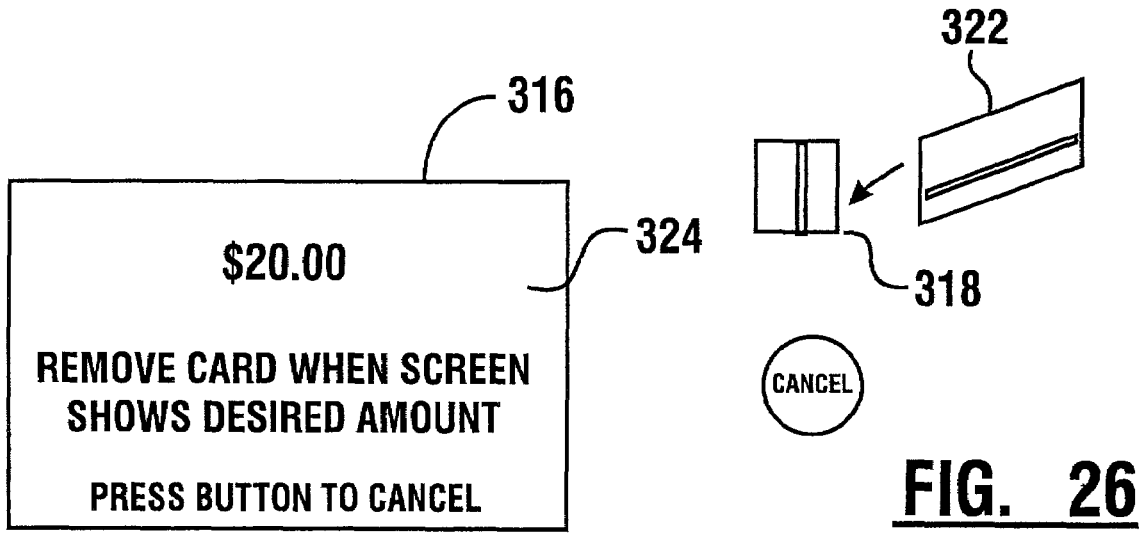
Figure 27:
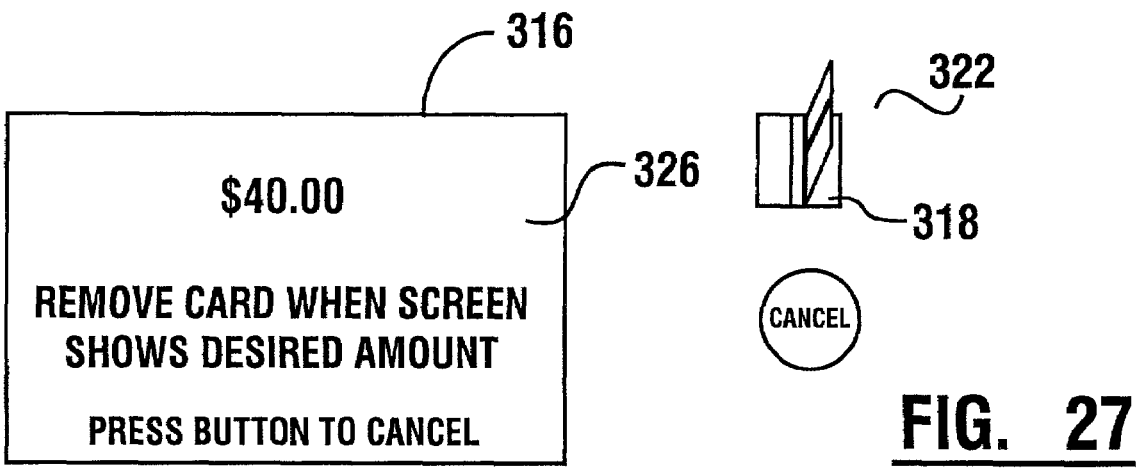

FIG. 26 shows a card schematically indicated 322 of the magnetic stripe variety being inserted into the reader 318. In response to the card 322 being inserted and held therein a first amount screen indicated 324 is displayed. The first amount screen 324 which is generated responsive to the controller 52 advises the customer of an amount and to withdraw their card from the card reader when the amount shown on the screen corresponds to a desired amount that they wish to receive. In the described exemplary embodiment within approximately five seconds after the first screen is displayed a second account screen indicated 326 and shown in FIG. 27 is displayed. The second amount screen shows a different amount and again instructs the user to remove the card from the card reader when the amount that they desire is shown. Assuming that the user does not withdraw the card from the card reader when the second amount screen 326 is shown. A short time later (a few seconds in this exemplary embodiment) a third amount screen is displayed. Because the described exemplary embodiment dispenses twenty dollar bills each sequential display screen increases the amount by twenty dollars. This sequence is continued until a maximum amount screen is reached or until the customer presses the cancel button 320.

Assuming that the customer removes their card from the reader 318 when a sixty dollar amount is displayed, a withdrawal screen generally indicated 328 and shown in FIG. 28 will be displayed. The withdrawal screen 328 advises the customer of the amount that will be charged to their account. Again assuming that the customer does not promptly hit the cancel button 320 the controller 52 operates to communicate through its associated communication device 48 with an appropriate host computer or other system to determine whether the customer is authorized to charge the amount requested. During this time period a wait screen 330 shown in FIG. 29 is displayed. When the machine 10 receives authorization indicating that the customer is authorized to receive the amount requested, the controller 52 operates the components of the machine 10 to cause the requested amount to be delivered to the customer through the note outlet opening 28 in the housing 12. The controller 52 also operates to have a transaction receipt printed. After this is done a completion screen generally indicated 332 and shown in FIG. 30 is displayed. The completion screen advises the customer to take their cash and their receipt. Of course if for some reason the transaction is not authorized, an alternative screen advising the customer of this is displayed to the customer. Thereafter the controller 52 is operative to return to the initial screen 320.

An advantage of this exemplary user interface is that it can be used with machines that dispense cash in response to credit card inputs and requires no further input devices other than a cancel button 320 and a card reader 318. Such components may be found on types of automated transaction machines whose primary function is not the dispensing of cash. This interface facilitates incorporating the note dispensing mechanism described herein into other types of automated transaction machines. In addition other embodiments may eliminate the cancel button by enabling the customer to cancel the transaction by removing the card at a time when a particular screen is displayed. Many alternative embodiments employing these principles may be devised. For example alternative machines may be provided with the capability of providing audio outputs that give the customer the same information as the display screen, and may in some cases eliminate the need to have a display screen.

A further useful aspect of the described exemplary embodiment is the ability of the machine 10 to display selected promotional messages to the customer on a timely basis. Such a promotional message is shown in screen 330 and indicates a sale on a beverage item. In an exemplary embodiment this promotional message is generated in response to the data stored on the plug-in memory 38 which is connected to the connector 36 on the housing 12. The data stored in the plug-in memory 38 which in the described exemplary embodiment is a smart card, includes a promotional message as well as time parameters associated with the promotional message. Thus for example if the special offer represented in screen 330 is to extend only until a certain date, the controller 52 and its associated clock device 54 are operative to sense the passage of this date and to no longer display the particular promotional message once this date has passed. For example if the operator of the machine 10 fails to remove the plug-in memory 38 and the controller 52 determines that the message is no longer timely, screen 330 may include only a blank space or a blank area below the "please wait" notice on the screen while the machine 10 is operating to obtain verification and to dispense the user's cash.

Likewise other data may be stored in the plug-in memory 38 so that particular promotional messages are displayed at particular times of day or within particular time periods. The plug-in memory 38 may also include several promotional messages which are designed to be displayed at various times or sequentially to users of the machine 10. Alternatively the data stored in the plug-in memory 38 may include public service messages such as promoting various charitable organizations and events. The data stored in the plug-in memory 38 may also be operative to generate graphical presentations as well as other types of video and audio presentations that may be of interest to a user. Other data stored in the plug-in memory 38 may include for example logos or other advertising for the establishment where the automated transaction machine is operated.

Because the exemplary embodiment enables the presentation of promotional messages selectively by simply plugging a smart card into an associated connector 36, the promotional messages may be changed readily and inexpensively from outside the machine 10. For example the merchandising establishment or entities sponsoring promotional events may provide promotional messages on smart cards to operators of the machine 10. The operators of the machines 10 may plug the cards into the machine 10 and during the selected time windows for presentations of the messages, the messages will be displayed. At times when the plug-in memory 38 indicates that such messages are not to be displayed, screens including the messages are not provided to users of the machine 10. Thus the providers of promotional messages are able to avoid their promotions being presented beyond the expiration date or at other times when it is not appropriate.

Of course the automated transaction machine may be operative to output such promotional messages at other times during its operation. This may include for example periodically displaying promotional messages in place of the initial screen 316. This may include for example alternating a promotional message with the initial screen 316 during relatively brief time periods such as a period of a few seconds. In this way a user walking up to the machine 10 will be advised in a very brief period of time how to operate the machine 10. However such a user will also receive at least one and perhaps several promotional messages before they proceed to insert their card 322 into the card reader 318. In this way the described exemplary embodiment enables operators of the machines 10 to conduct additional marketing relatively simply and reliably and at a minimum cost.

It should be understood that while in the exemplary embodiment the plug-in memory 38 includes a smart card, other embodiments may include other types of memory devices. These may include for example floppy disks, PROMS, CD-ROMs or other devices. It should further be understood that access to such replaceable memory items may be limited by a cover, such as for example the cover for the note inlet opening 30 or 268 previously discussed. In this way access to the connector or reader for the plug-in memory 38 is limited to persons who are authorized to change the plug-in memory 38. However, such persons do not need to have access to the note storage area inside the machine 10 to change the plug-in memory 38.

In alternative embodiments of the invention, the memory element for providing promotional messages may be programmably changeable and/or may be remotely located from the machine 10. For example in some embodiments the promotional messages may be stored on a computer in a network owned by the machine operator. The machine operator may selectively download these messages into a programmable memory at each machine 10. When this occurs, the machine 10 will display promotional messages based on the information that the operator has stored. The operator may change the stored information at any given machine 10 either manually or automatically. This can be done by downloading new promotional information to the memory at the machine 10. Alternatively the promotional material may be stored in the machine operator's network and accessed by the controller 52 in the machine 10 at the time that a transaction is being conducted. In this way the machine operator may provide selected promotional messages by making postings on an internal network which the machines 10 connected thereto can access and display. This may include for example HTML documents or other items which the machine operator wishes to have output. In further alternative embodiments the machine 10 may include a suitable connection for accessing promotional material at other locations. This may include accessing advertising data at sites on the Internet or other sites from which HTML or other documents can be obtained. The machine 10 may cache such documents or data in local memory for presentation to users at the time of operation. The machine 10 may periodically or upon command access new promotional material for storage in memory and later presentation during transactions. Of course alternative embodiments may access and display promotional items from a network in real time to the user. These embodiments enable the machine operator to use the machine 10 for providing promotional material or other information in a selective and timely manner.

Figure 31:
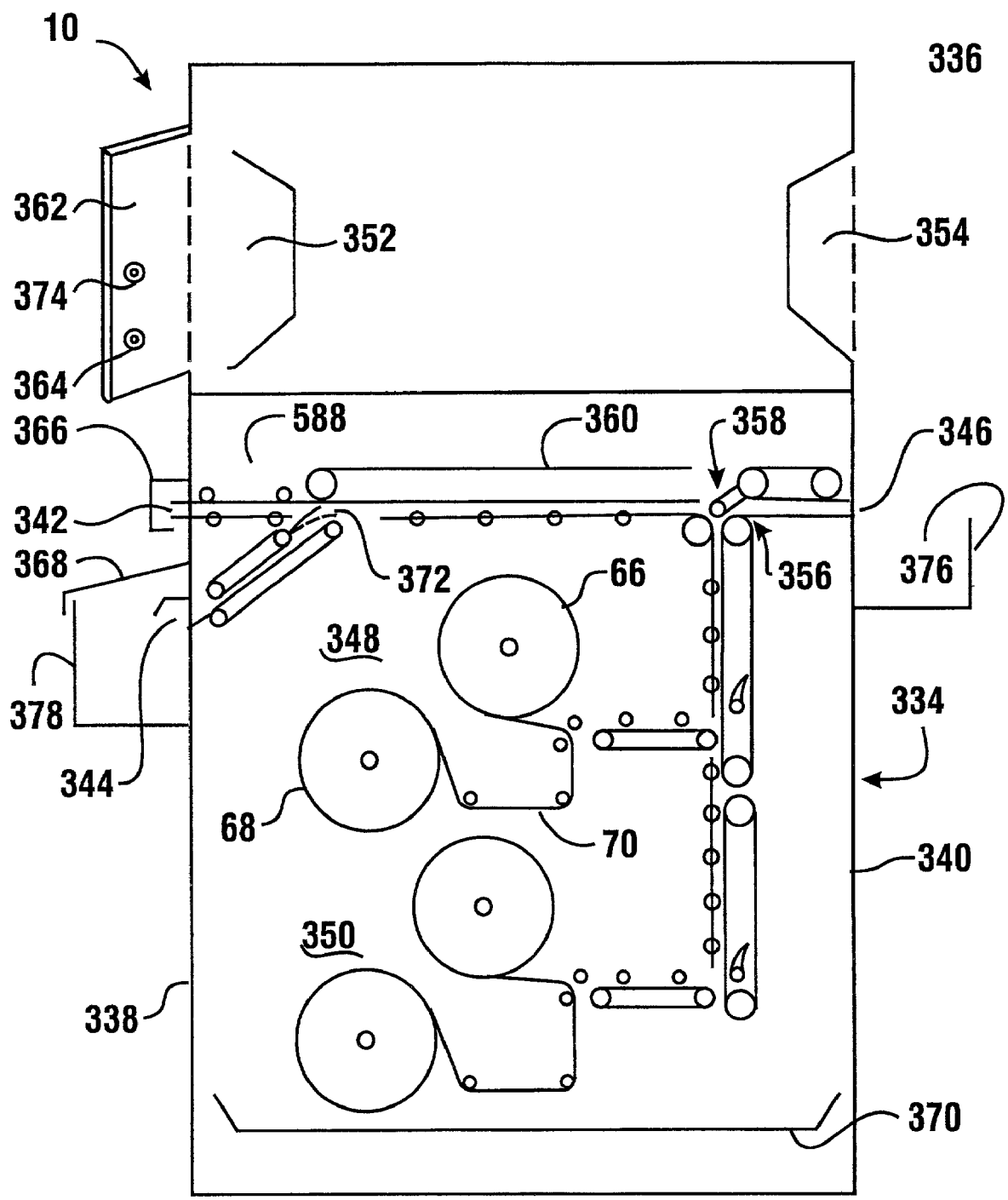
FIG. 31 is a transparent side view of an alternative exemplary embodiment of an automated transaction machine of the present invention.

An alternative exemplary embodiment is shown in FIG. 31. Features previously discussed in relation to FIGS. 1-30 may likewise be incorporated into the exemplary embodiment shown in FIG. 31. The element numerals used in FIGS. 1-30 represent like elements when used in FIG. 31.

The exemplary automated transaction machine 10 maybe used in numerous establishments, including but not limited to restaurants, stores, casinos, and amusement parks. The machine 10 would be useful in any location where cash transactions occur. Furthermore, the exemplary machine 10 has the benefits of both a safe and an automated transaction machine. An authorized merchant, such as an employee or owner, may safeguard excess cash in the machine as needed. An authorized merchant, perhaps a cashier, may also remove cash from the machine 10 as needed for business operations. The machine 10 also permits replenishing of notes by the merchant when needed, thereby avoiding the expenses of paying a third party to carry out cash replenishment. Additionally, consumers may use the machine 10 to withdraw cash as needed.

As can be appreciated from FIG. 31, the exemplary automated transaction machine apparatus of this configuration has a housing 12 which comprises a lower portion and an upper portion. The machine 10 of FIG. 31 also enables dual usage. A consumer or customer may use the machine 10 from a front side to dispense notes such as currency notes. A merchant may use the machine from a rear side to either store or dispense notes such as currency notes as needed in the merchant's business operations. Hence, the machine 10 includes a common storage area for the currency notes that enables notes to be dispensed to either the consumer or the merchant.

The lower portion of the exemplary housing 12 comprises a chest portion 334. The chest portion 334 includes a merchant side 338, and a consumer side 340. Although the two sides of the exemplary machine 10 are described herein as a merchant side 338 and a consumer side 340, it should be understood that these designations are descriptive of how a machine 10 of this configuration is frequently used, not limitation on how the sides may be used. The merchant side 338 of the chest portion 334 includes a merchant inlet opening 342 and a merchant note outlet opening 344. The consumer side 340 of the chest portion 334 includes a consumer note outlet opening 346. Pockets 376, 378 for retaining the dispensed notes may be provided adjacent to the note outlet openings 344. The chest portion 334 further comprises a note storage area that is comprised of note storage areas 348, 350. Additionally, the chest portion 334 may comprise one or more access doors, including locking mechanisms, for controlling access to the note storage areas 348, 350. The different note storage areas 348, 350, for example, may be used to store different denominations of currency notes. The notes may be either new or used. Hence, the automated transaction machine 10 of FIG. 31 is an automated transaction machine of the recycler type, which is capable of recycling inserted cash for later disbursement.

The lower portion of the automated transaction machine 10 may also incorporate additional features, as previously discussed in detail in relation to other embodiments. For example, the chest portion 334 may include a connector 36 operative to releasibly receive a plug-in memory 38 or other memory. The chest portion 334 may also house a journal device 46, a communications device 48 and other devices as previously discussed in detail in relation to FIGS. 1-30.

In this exemplary embodiment the upper portion of the exemplary automated transaction machine comprises a distinct top enclosure portion or top hat 336. The top hat 336 is in supporting connection with the chest portion 334. The top hat 336 further includes in supporting connection therewith input and output devices which make up a merchant interface 352 and a consumer interface 354. Although the two user interfaces 354, 354 are described herein as a merchant interface and a consumer interface, it should be understood that these designations are descriptive of a common use of this configuration of interfaces, not limitations on the potential uses of a machine containing such a user interface configuration. As previously discussed in detail, the user interface 14 may comprise a card reader 16, keypad 20, function keys 22, display 24, and receipt printer 50. It should be appreciated that these input and output devices are exemplary and that other embodiments may include additional or different types of input devices which operate to receive information or instruction from users and/or output devices which provide information or instructions to users. Either user interface 354, 356 may be of the arrangement and operation of the type discussed in U.S. Pat. No. 6,082,616 or U.S. Pat. No. 6,024,027, the disclosures of which are fully incorporated herein by reference. Additionally, the top hat 336 may comprise an access door 362 for providing selective access to the merchant interface 352. The door may have a handle 374 and a locking mechanism 364 for permitting access to authorized users of the merchant interface 352. It should be understood that this two compartment housing construction is exemplary and other embodiments may house all the components within a single chest type housing or in housings having a plurality of separated areas.

Each note storage area 348, 350 comprises a note receiving and dispensing mechanism similar to mechanism 77 previously described. Each note receiving and dispensing mechanism is operated responsive to one or more controllers which may be similar to controller 52 as previously discussed in detail, for example, in relation to FIG. 4. The note receiving and dispensing mechanisms may each comprise a removably mounted storage module similar to module 44. The storage modules may each comprise a note storage reel 66 and a take up reel 68. The note storage reel 66 and a take-up reel 68 may be rotatably mounted in the machine 10 and driven by a reel drive mechanism, similar to the reel drive mechanism 72 previously discussed. A flexible web 70 extends between the note storage reel 66 and take-up reel 68 as previously discussed in detail in relation to FIG. 4. Separator members may be used in separating notes from the web 70 as previously discussed in detail in relation to FIGS. 9 and 10. One or more controllers 52 are in operative connection with the first user interface 352, the second user interface 354, and the note receiving and dispensing mechanisms. At least one of the one or more controllers 52 controls the movement of notes in the automated transaction machine 10. Additionally, the chest portion 334 may comprise one or more access doors for enabling access to the note storage areas 348 and 350. The doors may have locking mechanisms for restricting access to the note storage areas 348 and 350 to particular authorized personnel.

A passage area 356 and a gate 358 operatively connect the note receiving and dispensing mechanisms with a note transport mechanism 360. Although the transport mechanism 360 may comprise several transports used in the movement of notes, as previously discussed in detail, the transport mechanism 360 may also be a single common transport extending adjacent the merchant inlet opening 342 to adjacent the consumer note outlet opening 346. A common transport would be common to notes passing from the merchant inlet opening 342 to a note storage area 348, 350; to notes passing from a note storage area 348, 350 to the merchant note outlet opening 344; and to notes passing from a note storage area 348, 350 to the consumer note outlet opening 346. The transport mechanism 360 may comprise a belt arrangement and operation of the type discussed in U.S. Pat. No. 5,850,075, the disclosure of which is fully incorporated herein by reference. Other configurations of cooperating belts and rollers, or other members suitable for engaging and moving notes, may be used.

The gate 358 may have the arrangement and operation like the sheet directing gates discussed in U.S. Pat. No. 6,109,522, the disclosure of which is incorporated herein by reference. FIGS. 32-35 show such an alternative gate arrangement. As shown, the transports may include a supporting surfaces 398, 424 which may include dimpled projections and/or elongated projections 426. This structure enables notes to be transported in engaged relation between the projections and belt flight 422. The gate 358 may include one or more arms 428. The arms 428 are engaged to move together responsive to an actuator. The actuator is in operative connection with a controller 52. The arms 428 are selectively movable about an axis of rolls 390. Each arm 428 has a roll 430 movably mounted thereon. Each roll 430, which serves as a diverter member, is positioned in alignment with a corresponding inner belt flight 396. The rotation of the rolls 390 and the position of the diverter member 430 determines the direction of note movement as notes pass through the gate 358. A controller 52 operatively controls the rotation of the rolls 390 and the position of the diverter member 430.

Figure 32:
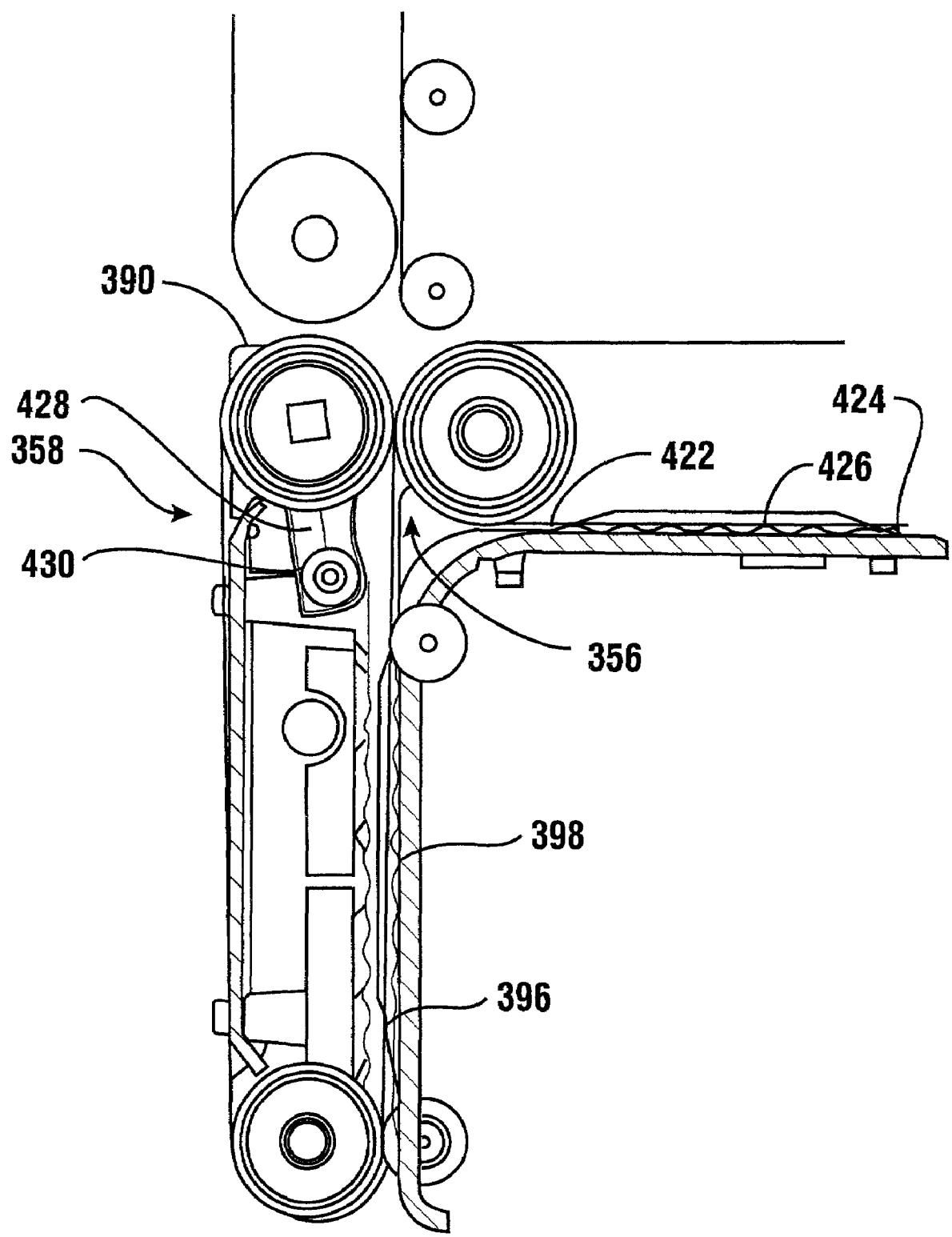
FIG. 32 is a schematic view of an alternative embodiment of a gate arrangement of FIG. 31.
Figure 33:
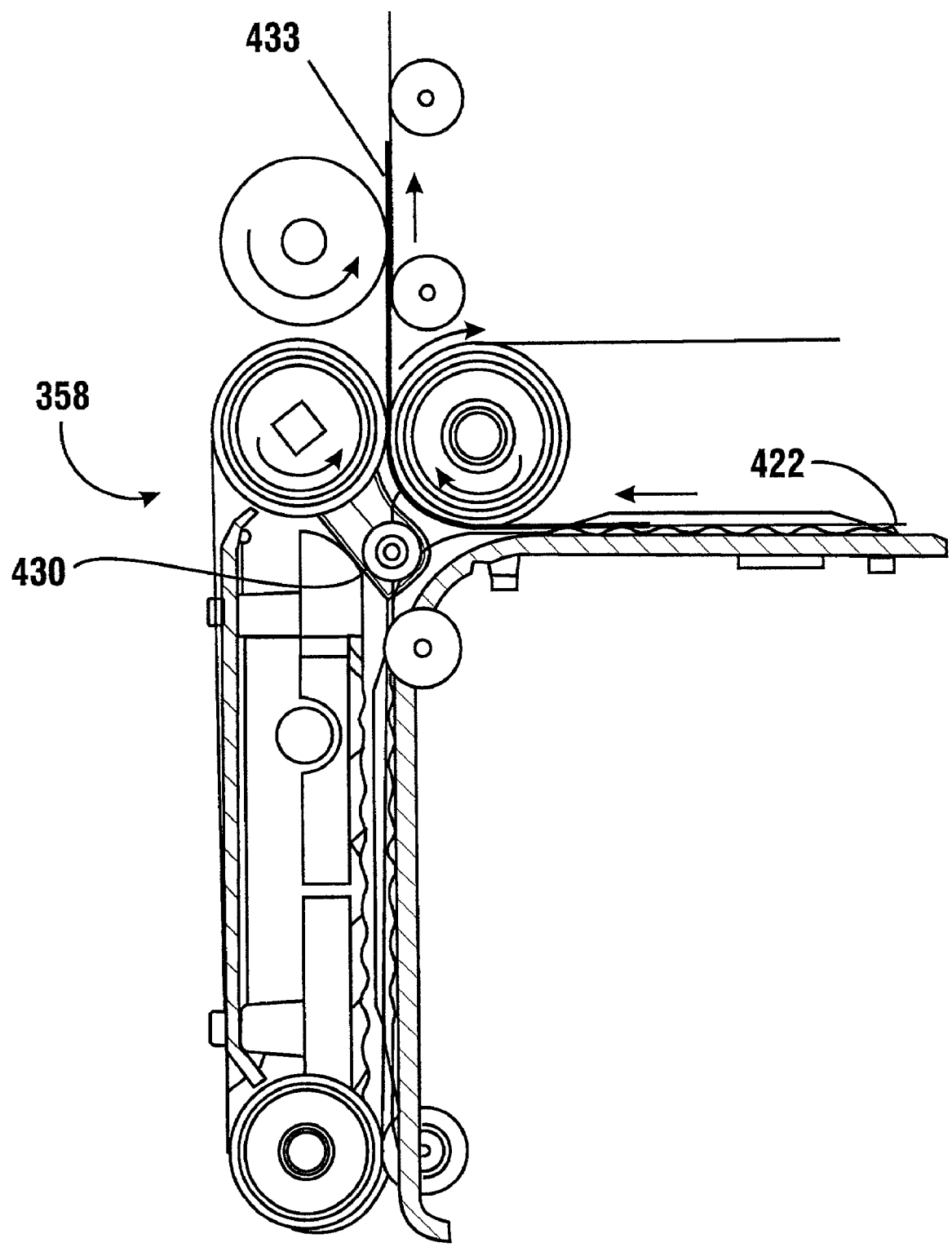
FIG. 33 shows a note being moved from a storage area toward the consumer note outlet opening with the gate arrangement of FIG. 32.
Figure 34:
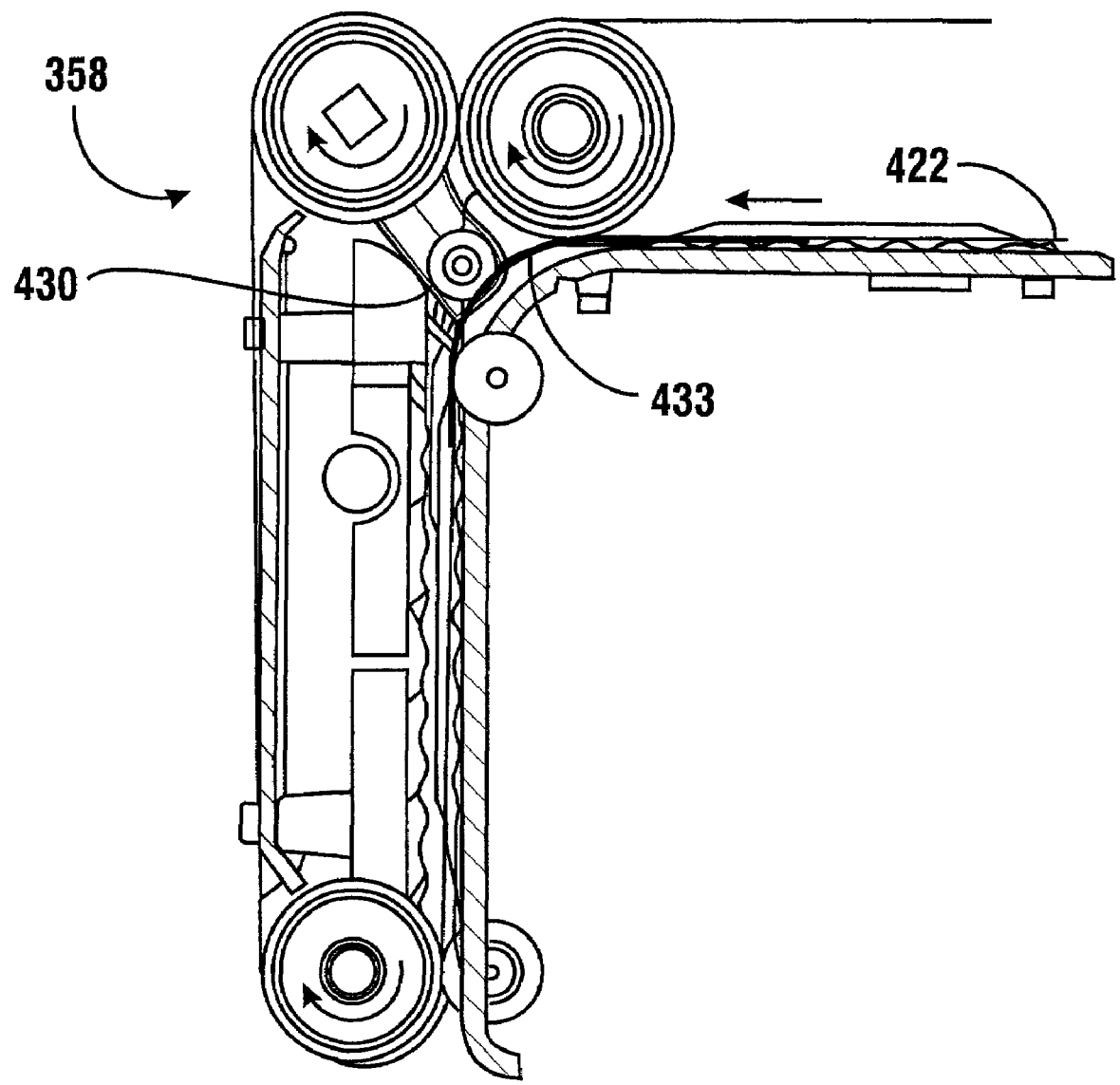
FIG. 34 shows a note being moved from a storage area toward the merchant side note outlet opening with the gate arrangement of FIG. 32.
Figure 35:
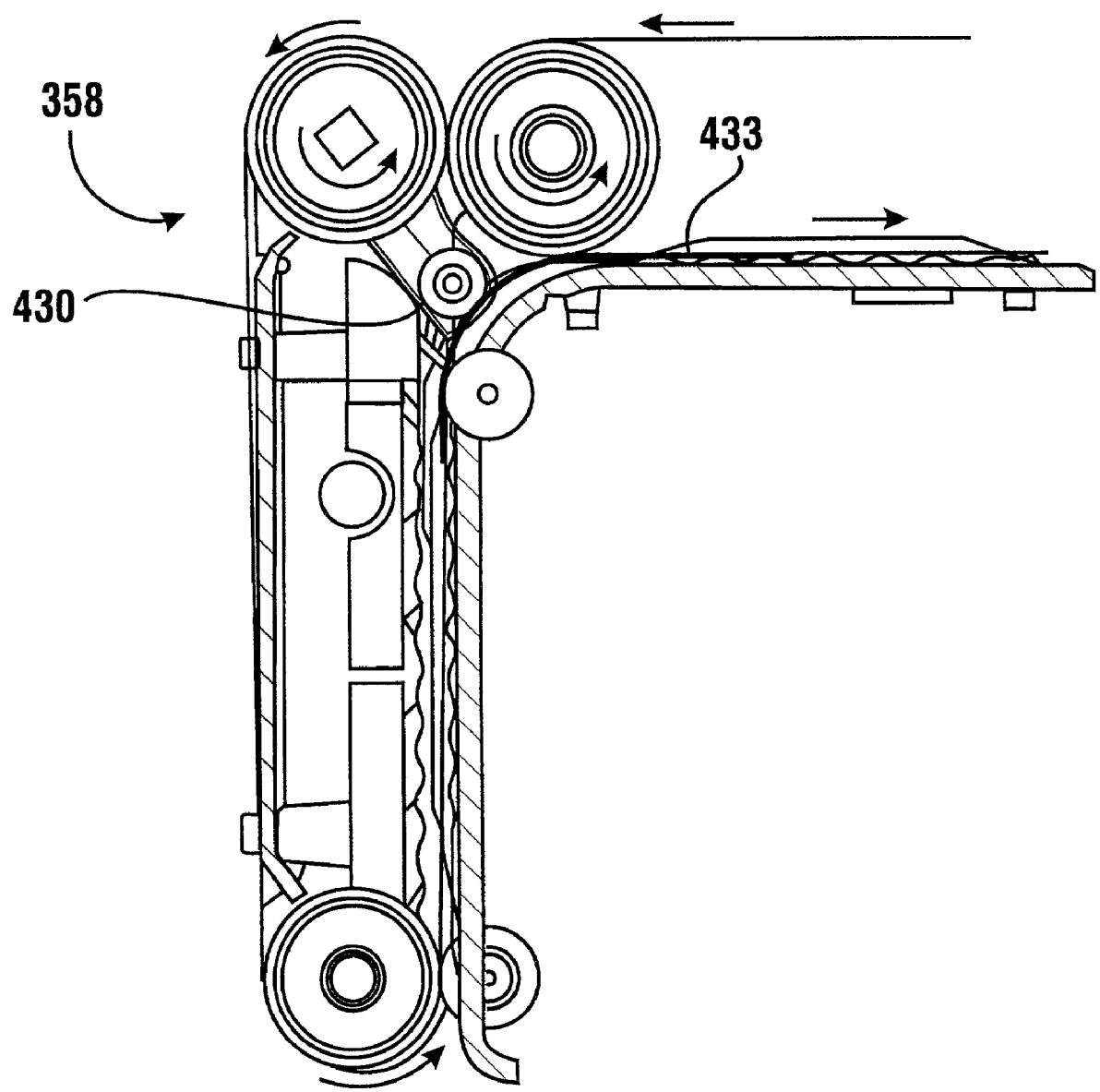
FIG. 35 shows a note being moved from the inlet opening toward a storage area with the gate arrangement of FIG. 32.

FIG. 32 shows an exemplary gate arrangement in the passage area 356. FIG. 33 shows a note 433 being moved from a note storage area 348, 350 toward the consumer note outlet opening 346. FIG. 34 shows a note 433 being moved from a note storage area 348, 350 toward the merchant note outlet opening 344. FIG. 35 shows a note 433 being moved from the merchant inlet opening 342 toward a storage area 348, 350.

Figure 44:
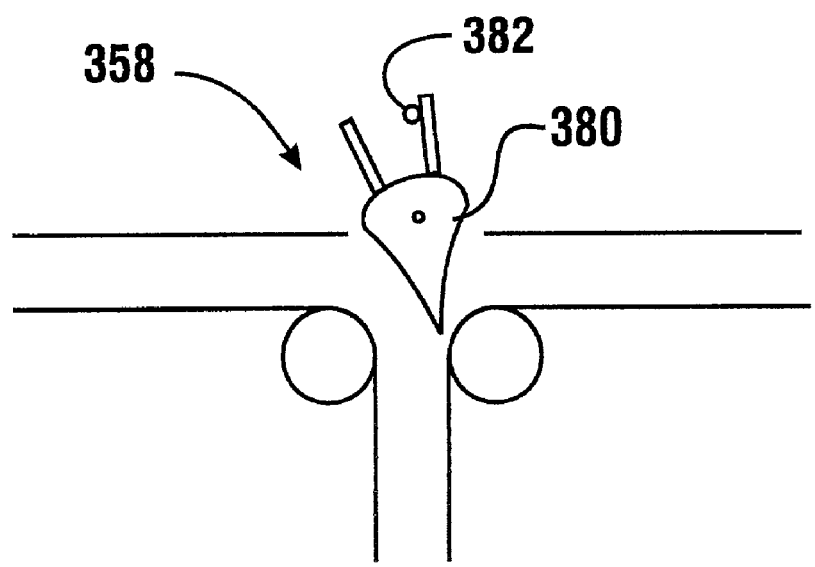
FIG. 44 shows a schematic view of a gate arrangement in the passage area of FIG. 31 in a side position.

Alternatively, the gate 358 in the passage area 356 may be of the arrangement and operation as shown in FIG. 44. The gate may comprise one or more gate members 380. The gate 358 may be electrically or electromagnetically driven to rotate or pivot between two positions. A stop 382 may be provided to limit movement of the gate member 350. The gate 358 may be operably positioned between a single belt having an open center portion or in between two adjacent belts. A belt arrangement and operation of this type is explained in the above mentioned in U.S. Pat. No. 5,850,075, the disclosure of which is incorporated herein by reference.

The gate 358 operates adjacent the passage area 356 to selectively direct the notes toward a note storage area, 348, 350 the merchant note outlet opening 344, or the consumer note outlet opening 346. The gate member 380 is able to be moved or pivoted either to the right or left as shown in FIG. 44.

Alternatively, the gate may be of the arrangement and operation as discussed in relation to any of the previous gates, such as gates 114, 248, or 284. The gate movement is operatively controlled by a controller. The gate movement enables notes to pass through the passage area 356 to/from the desired opening.

In the exemplary machine 10 of FIG. 31, a note validator 588, of one of the types previously discussed in detail, may be adjacent the merchant inlet opening 342. Invalid notes may be returned to the user at the first interface through the merchant inlet opening 342. In other embodiments a controller 52 may direct notes that cannot be identified by note validator 588 to divert area 370. In such an embodiment, a lower area of the chest portion 334 may comprise a divert area 370 for notes which cannot be handled by the machine 10. These may be, for example, damaged or unidentifiable notes.

Another gate 372 operates adjacent the note validator 588 to direct incoming notes toward note storage areas 348, 350 and outgoing notes toward the merchant note outlet opening 344. The exemplary gate 372 is able to be moved or pivoted between the positions shown in solid and dashed lines in FIG. 31. In the position shown in solid lines, outgoing notes are able to be moved to a merchant note outlet opening 344. In the dashed line position, incoming notes are able to be moved from the note validator 588 toward a note storage area 348, 350. In this exemplary embodiment the gate 372 may be movable responsive to the force applied by passing notes. The gate movement may be controlled by a controller 52. Alternatively, the gate 372 may be of the arrangement and operation as discussed in relation to any of the previous gates, such as gates 114, 248, or 284.

The note transport mechanisms may be driven by at least one drive, for example, as shown in FIG. 4, or there may be several drives. The drives may operate to move note moving members such as the belts previously discussed in detail. Alternatively, the drives may operate to move rollers, slides or other devices suitable for moving or directing notes.

As shown in FIG. 31, the merchant inlet opening 342 may have access thereto controlled by a movable closing cover 366. The cover 366 may be hinged at a location adjacent the side of the chest portion 334 as shown, to enable the cover 366 to be pivoted in a manner permitting access to the merchant inlet opening 342. In the pivoted open position, the cover 366 may rest against the side of the chest portion 334. This arrangement permits the cover 366 to remain open in a hands-free position. Alternatively, doors or other types and arrangements of closing members may be used. Another movable closing cover 368 may be provided for the merchant note outlet opening 344. Such doors or covers may be manually operated or automatically operated by drive devices responsive to a controller 52. The covers 366 may be of any shape or size desired to prevent the deposit and/or accumulation of dirt or other unwanted material in the openings. Additionally, the merchant interface 352, when located inside of door 362 in the top hat 336 is likewise protected from dirt and unwanted material.

Figure 36:
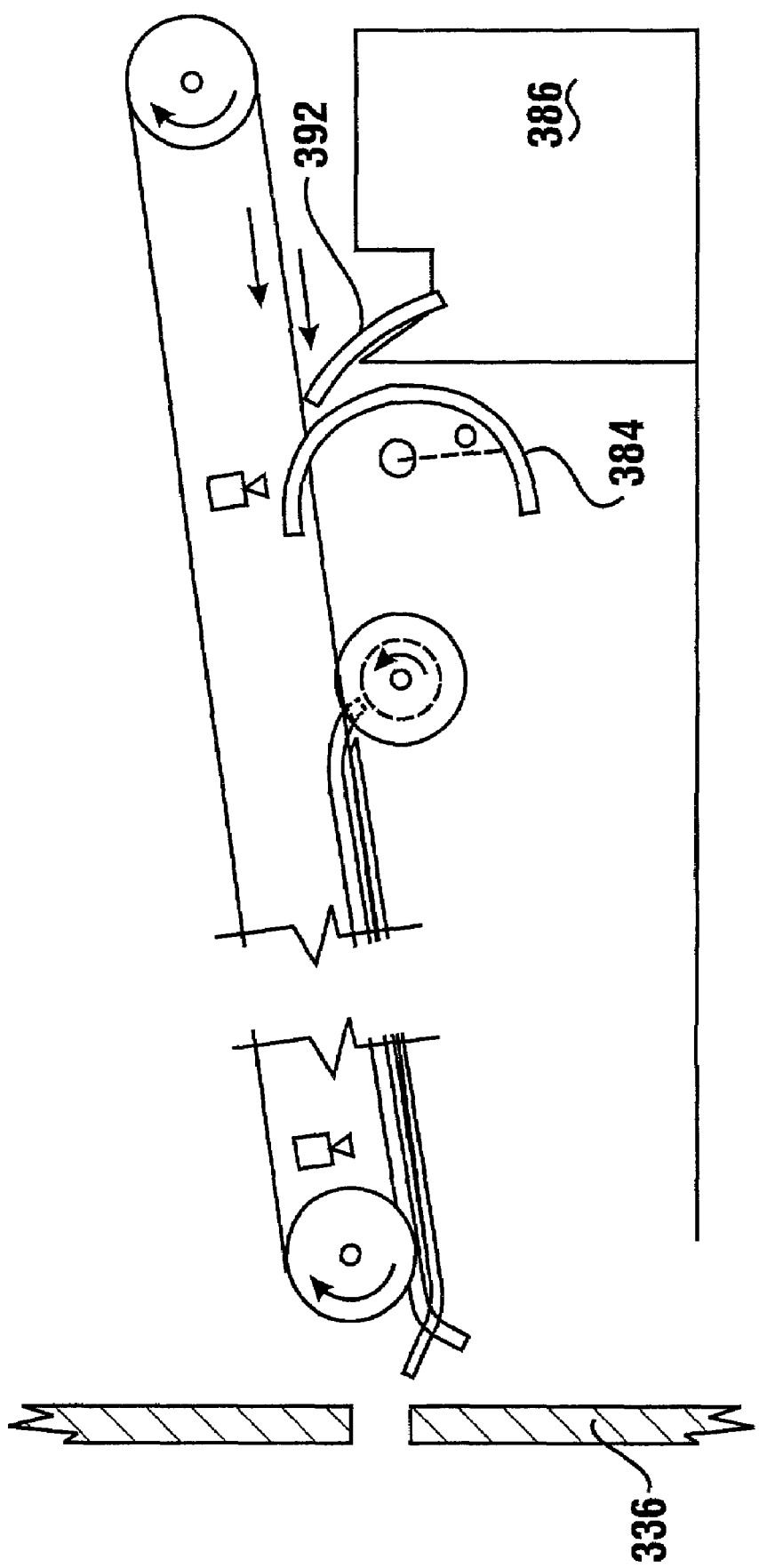
FIG. 36 shows a view of a receipt dispensing and transport arrangement for dispensing a printed receipt to a receipt outlet.
Figure 37:
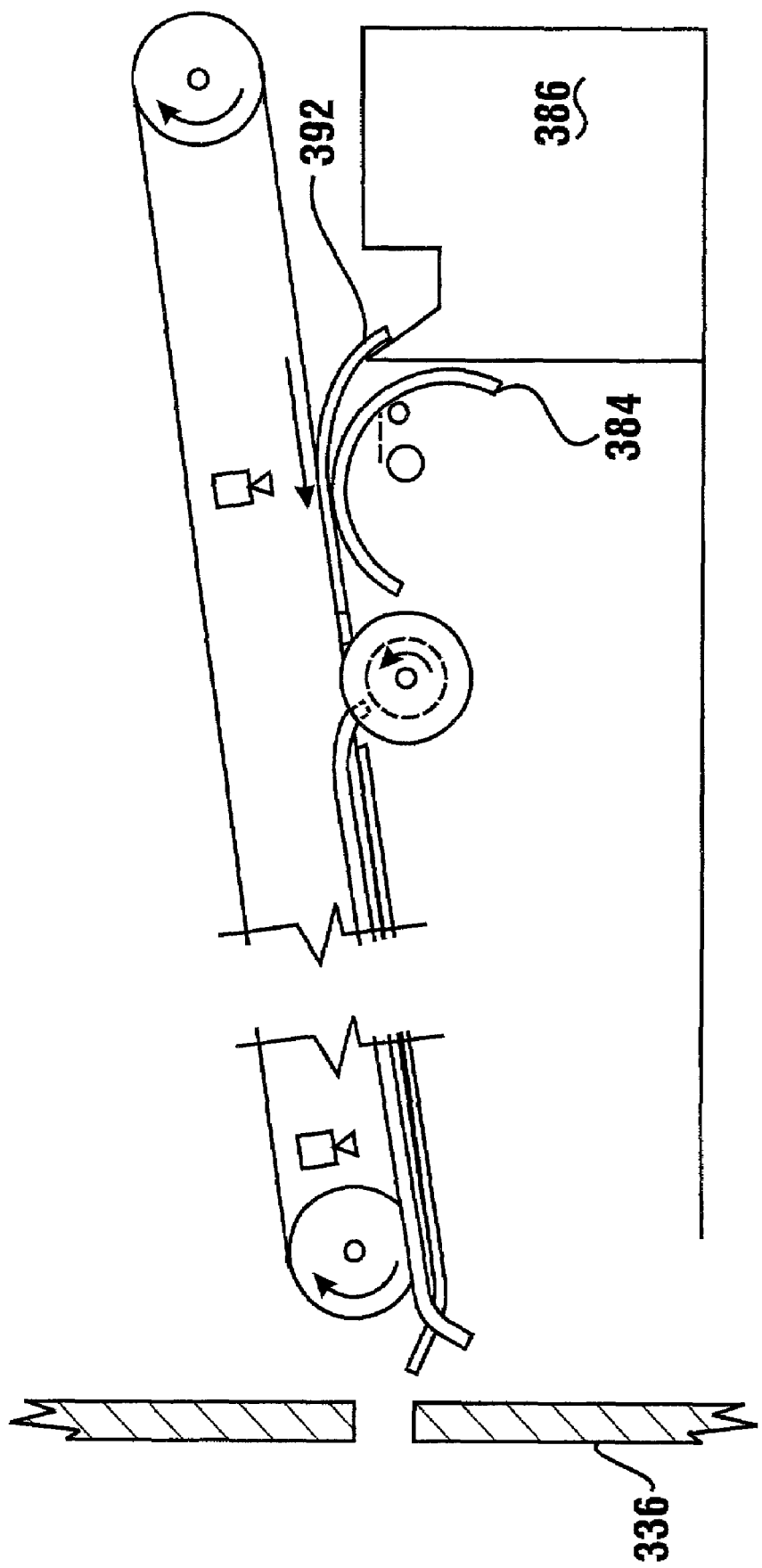
FIG. 37 shows the receipt transport of FIG. 36 in another dispensing and transport state.

Each user interface 352, 354 may include or be in connection with a corresponding printer, as previously discussed in detail, for example, in relation to FIGS. 2 and 3. The printer or printers are operative to produce printed receipts or other documents that are dispensed to the user. FIGS. 36 and 37 show a dispensing and transport arrangement for the receipt 392 from a printer 386. Additionally, gate member 384 is operatively controlled to retract into the machine 10 a receipt not taken by a user. A printer receipt dispensing and transport arrangement and operation of this type is explained in the above mentioned U.S. Pat. No. 5,850,075 which is incorporated herein. Furthermore, each user interface 352, 354 may share a common printer 386. As schematically shown in FIGS. 38 to 44, different gate arrangements may be used to direct a printed receipt from a common printer 386 toward a receipt outlet 385 at either the merchant or consumer interface 352, 354.

Figure 38:
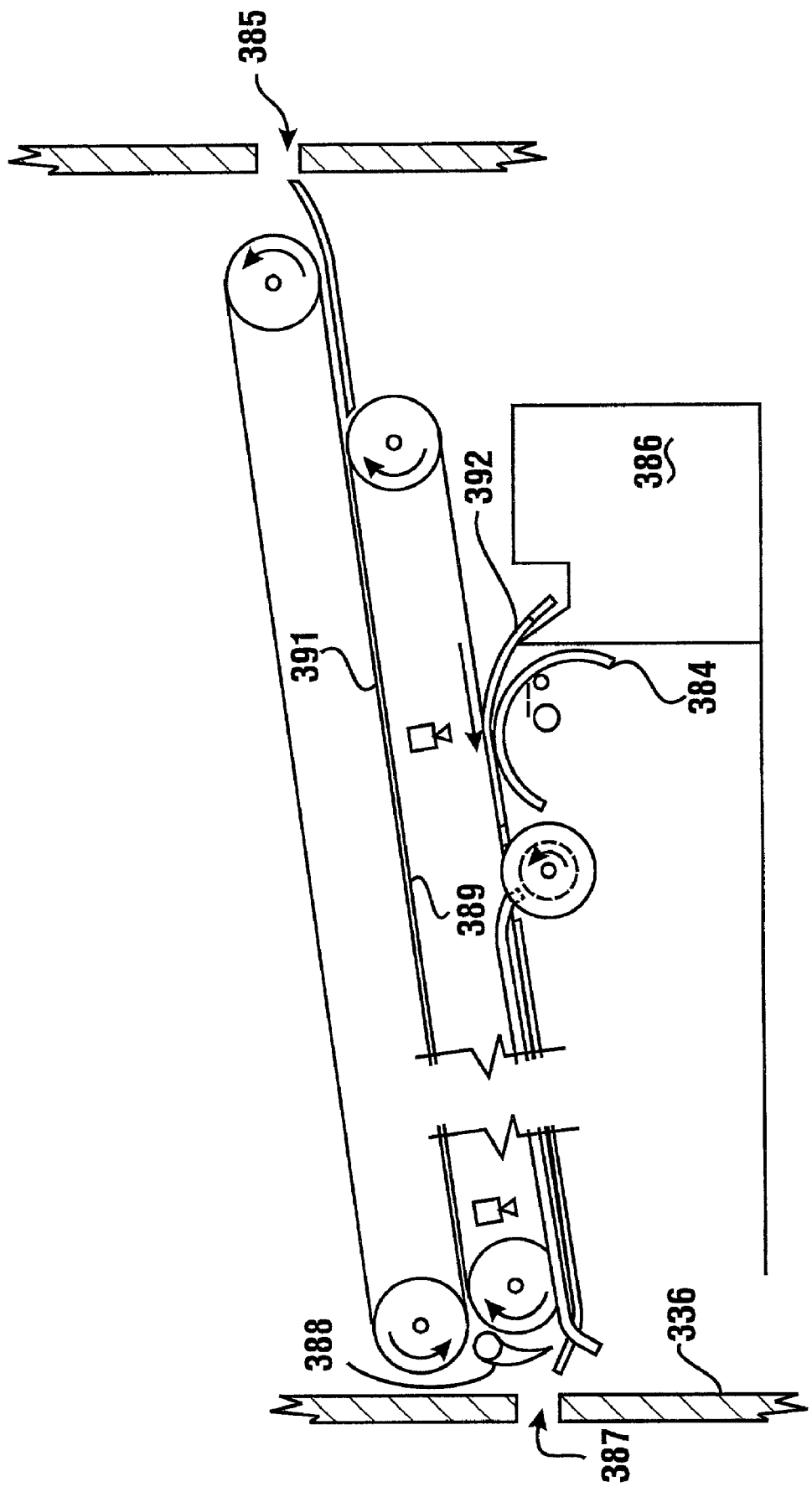
FIG. 38 shows an alternate view of a common printer dispensing arrangement based on the dispensing and transport arrangements of FIGS. 36 and 37.
Figure 39:
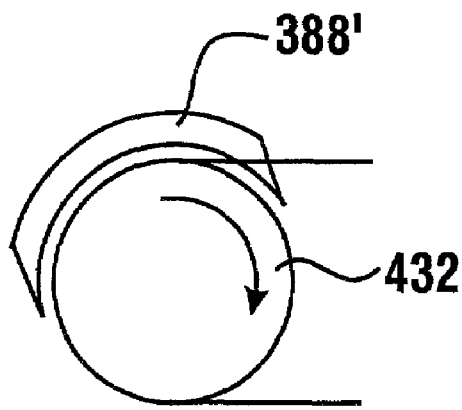
FIG. 39 shows an alternate gate member in a first position.

The dispensing and transport arrangement of FIG. 38 is based on the arrangement shown in FIGS. 38 and 39. The portion depicted to the left of the broken lines in FIG. 38 includes the receipt opening included in one user interface 352, 354 of the machine 10 while the area depicted on the right includes the receipt opening 385 for the other user interface 354, 352. In FIG. 38 gate member 384 is operative to store a receipt not taken by either a merchant user or a consumer user. FIG. 38 also shows a change of direction gate member which is selectively movable relative to roll 432. Gate member 388 is selectively operative to direct a receipt to either the first or second receipt outlet 385, 387 of top hat 336. As shown in FIG. 38, when gate member 388 is in a first position relative to roller 432, then the receipt is permitted to exit the adjacent receipt outlet 387. When gate member 388 is positioned in a second position relative to the roll 432, the receipt is redirected to pass in the opposite direction to exit the opposite receipt outlet 385 in engagement with the upper roller and belt arrangement. In this arrangement the receipt is directed by the gate 388 to move in engaged relation between upper belt flight 389 and a lower belt flight 391. Alternatively the receipt may move in other transport arrangements.

Figure 40:
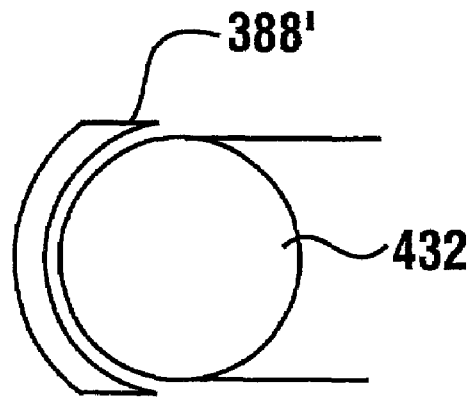
FIG. 40 shows an alternate gate member in a second position.

FIGS. 39 and 40 show an alternative gate member 388' that may be used in directing a receipt or other type note. The gate member 388' is rotatable or pivotal about the axis of rotation of roller 432. The gate member 388' of FIG. 40 may also be arranged to move laterally relative to roller 432. As shown in FIGS. 39 and 40, the gate member 388' may be selectively positioned to either permit a receipt to pass (FIG. 39) to the adjacent receipt outlet 387 or redirects (FIG. 40) the receipt to the opposite receipt outlet 385. The gate member 388' also acts as a turnover member. Several turnover members may be used to achieve the desired receipt orientation prior to reaching the opposite outlet. The gate member 388' and transport arrangements may also be of the arrangement and operation as discussed in U.S. Pat. No. 6,273,413, the disclosure of which is fully incorporated herein by reference.

Figure 41:
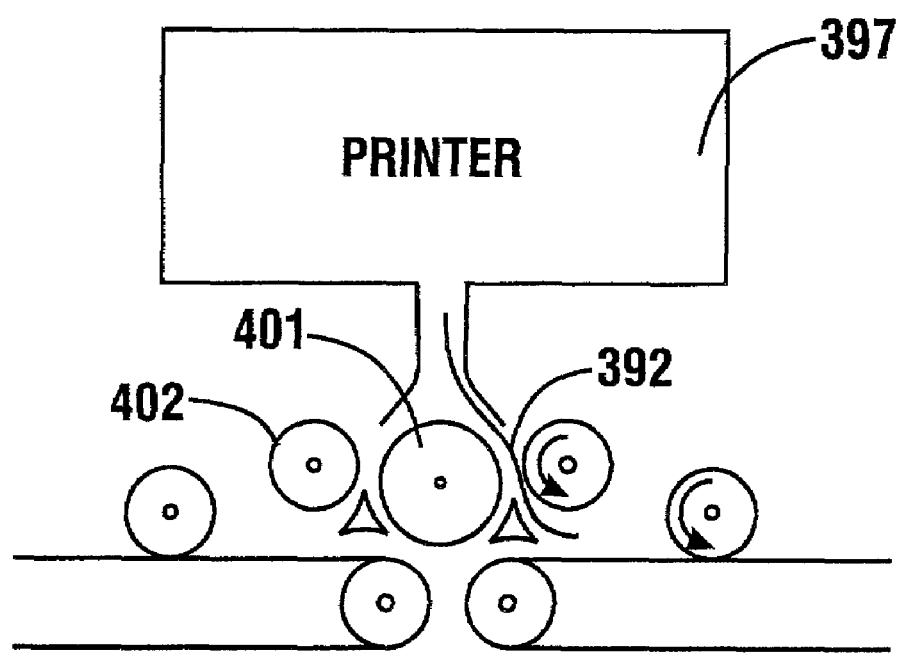
FIG. 41 shows an alternate view of a common printer dispensing and transport arrangement.

FIG. 41 shows an alternative configuration of a printer 397 which provides printed documents selectively to receipt outlets 385, 387. The rotational direction of a directing roll 401 and cooperating rolls 402 operate to selectively direct a note 392 to a transport path.

Figure 42:
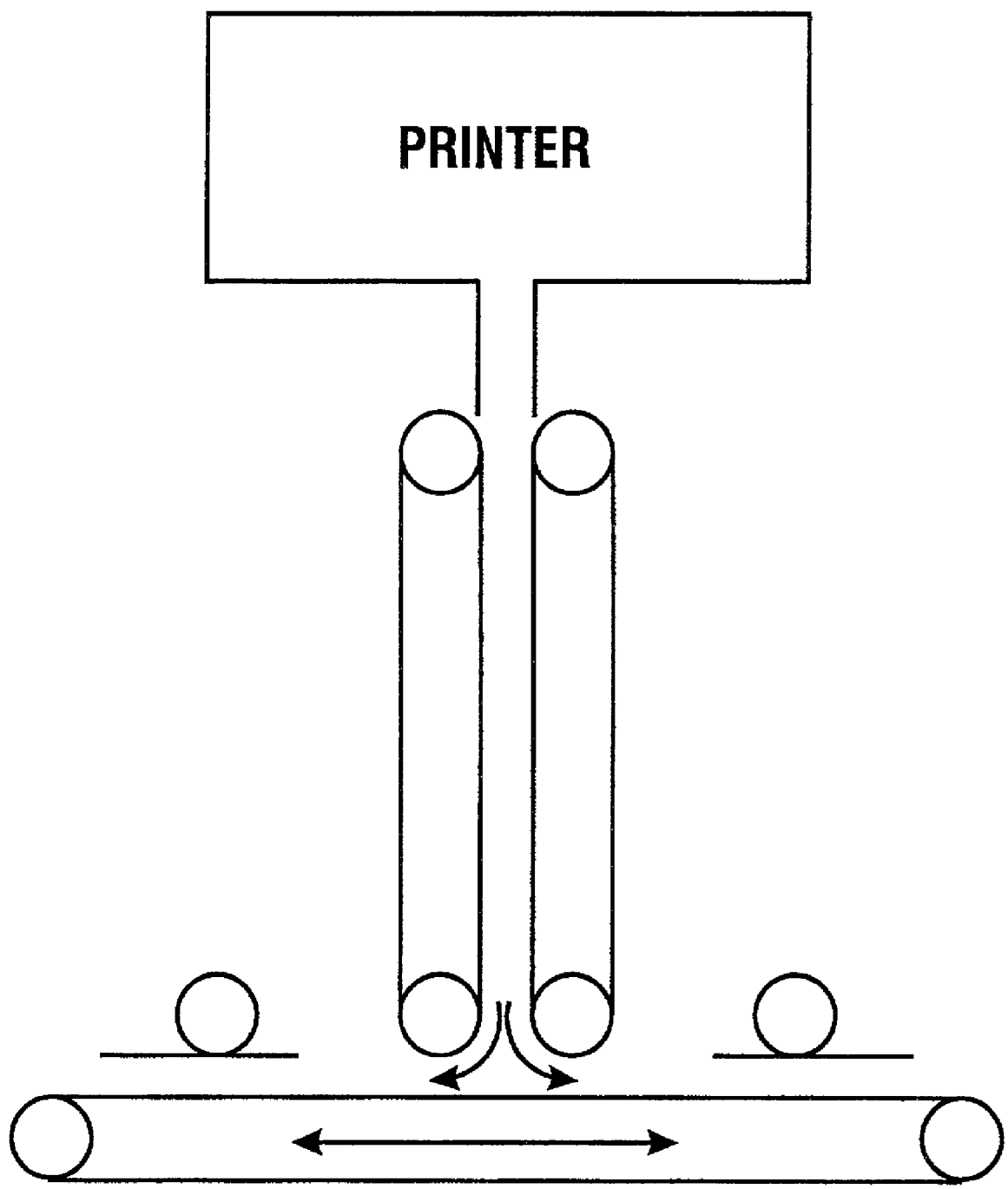
FIG. 42 shows an alternate view of a common printer dispensing and transport arrangement.
Figure 43:
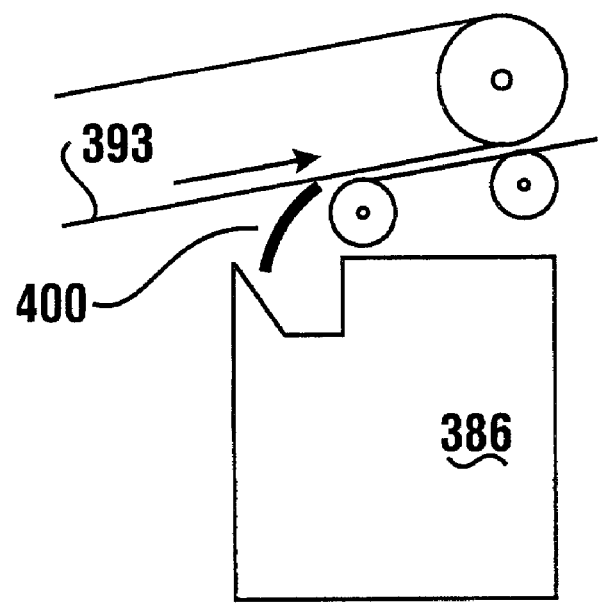
FIG. 43 shows an alternate view of a common printer dispensing arrangement based on the dispensing and transport arrangements of FIGS. 36 and 37.

FIG. 42 shows a further alternate configuration of a printer dispensing and transport arrangement. A printed receipt or other document may be directed to either receipt outlet 385, 387. FIG. 43 shows an alternative arrangement similar to that shown in FIG. 37 in which the direction of belt flight 393 is controlled to selectively direct a printed receipt or other document 400 from a common printer 386 to either outlet. A gate arrangement similar to that shown in FIG. 44 may also be used to direct a printed receipt from a common printer 386 toward a receipt outlet at either the merchant or consumer interface.

Figure 45:
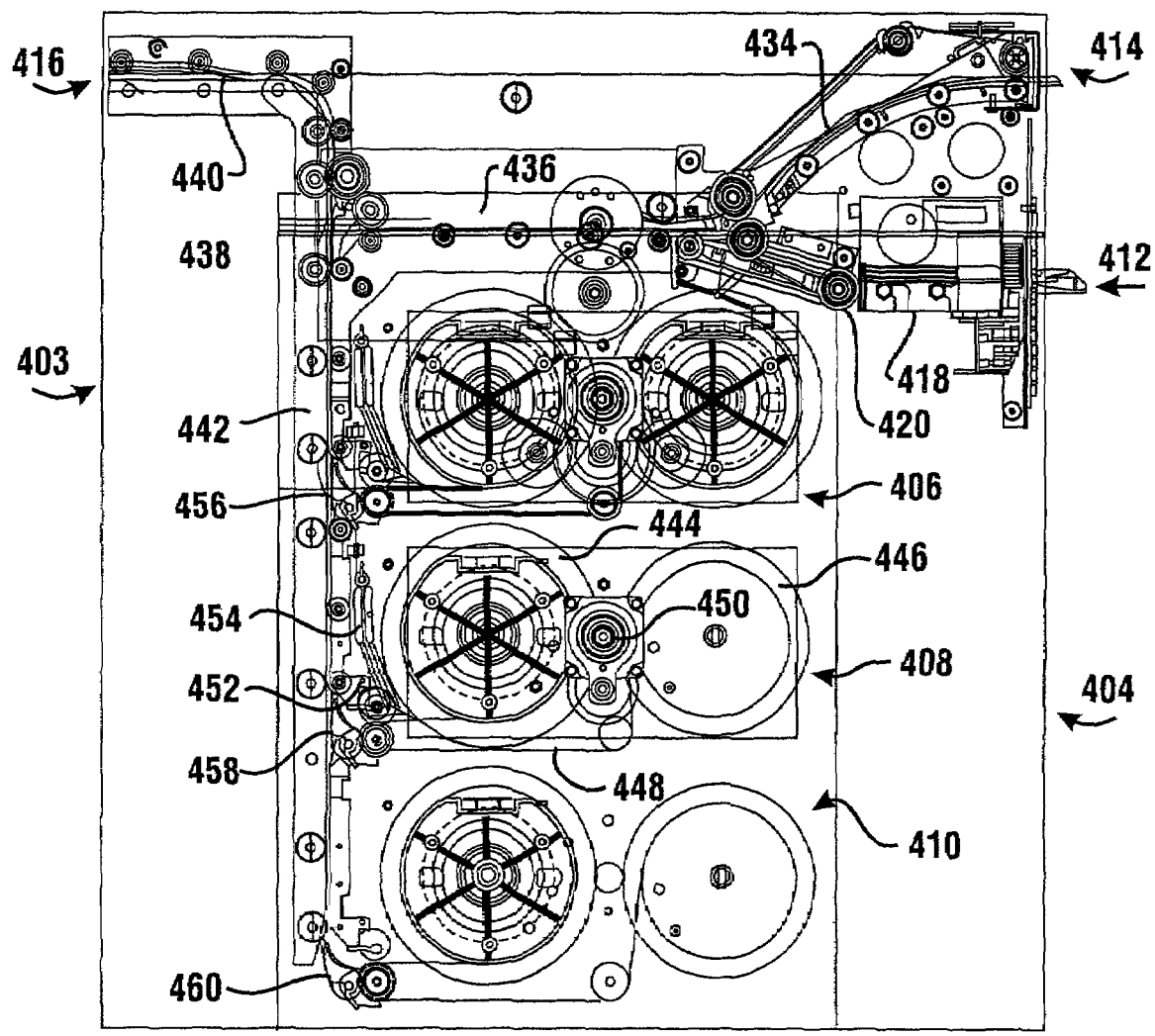
FIG. 45 is a side schematic view of an alternate exemplary embodiment of a note receiving a dispensing mechanism used in an alternative automated transaction machine of the present invention.
Figure 46:
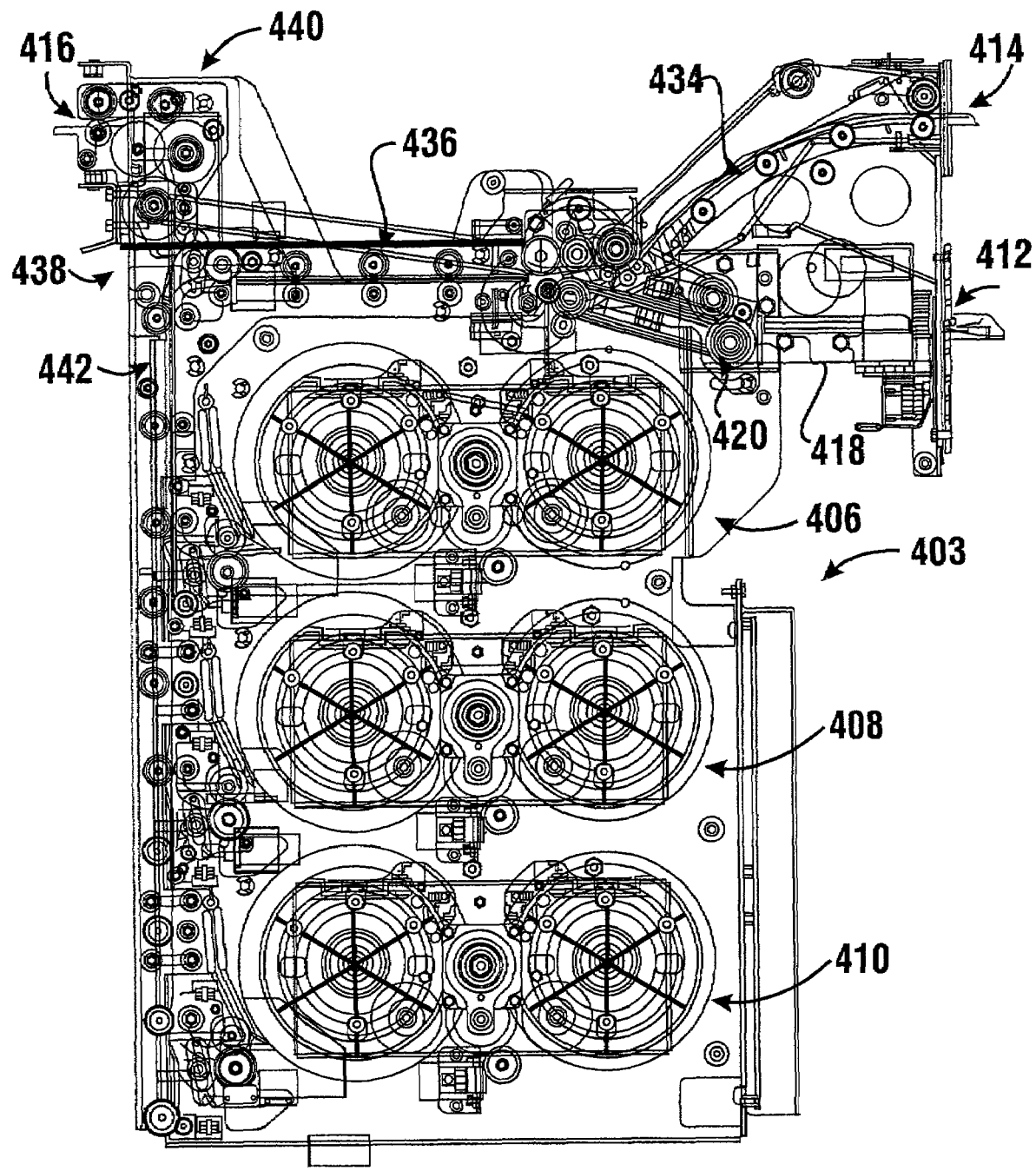
FIG. 46 is a detailed view of the note receiving and dispensing mechanism shown in FIG. 45.

FIGS. 45-46 show another exemplary embodiment of a currency recycler type of automated transaction machine 403. FIG. 45 shows a chest portion 404 which has a note storage area which includes note receiving and dispensing mechanisms 406, 408 and 410. Mechanisms 408 and 410 are shown in partial schematic form in FIG. 45. The detailed arrangement of the machine 403 is similar to those previously discussed. Machine 403 includes an inlet opening 412, a first note outlet opening 414, and second note outlet opening 416. Typically, the inlet opening 412 and the first note outlet openings 414 are on the side of the machine 403 used by the merchant and note outlet opening 416 is on the side used by the customer. Additionally, a note validator 418 may be located adjacent the inlet opening 412 for validation of notes prior to storage. Inserted notes not found valid by the note validator 418 for use in the machine 403 may be returned to the inlet opening 412. Alternatively notes not determined as valid for the machine may be routed for return through first note outlet opening 414. In this exemplary embodiment the note validator 418, of a type previously discussed, operates to distinguish the denomination of valid notes to enable notes to be selectively routed for storage in the machine 403.

In machine 403, note validator 418 is connected to an note inlet transport 420 which may be similar to limited slip transport 108 previously described. First note outlet opening 414 is in connection with a note outlet transport 434. Note outlet transport 434 functions in a manner similar to note outlet transport 96 previously described. In this exemplary embodiment a gate similar to gate 114 is positioned in a passage area adjacent to the intersection of note inlet transport 420 and note outlet transport 434. The gate operates in the manner previously discussed to selectively route notes to and from the appropriate transport.

Note inlet transport 420 and note outlet transport 434 are operatively connected to a lateral transport section 436. Lateral transport section 436 is selectively operative responsive to a controller in the machine 403 to move notes either to or from the intersection of the inlet and note outlet transports 420, 434. Lateral transport section 436 is in operative connection with a gate 438. Gate 438 is positioned at an intersection of the lateral transport section 436 and a second note outlet transport section 440. Gate 438 is also positioned at the intersection of the lateral transport section 436 and a note storage transport section 442. Gate 438 is selectively operated under the control of a controller to selectively direct notes either to or from the lateral transport section 436, consumer note outlet transport section 440 or note storage transport section 442.

Figure 52:
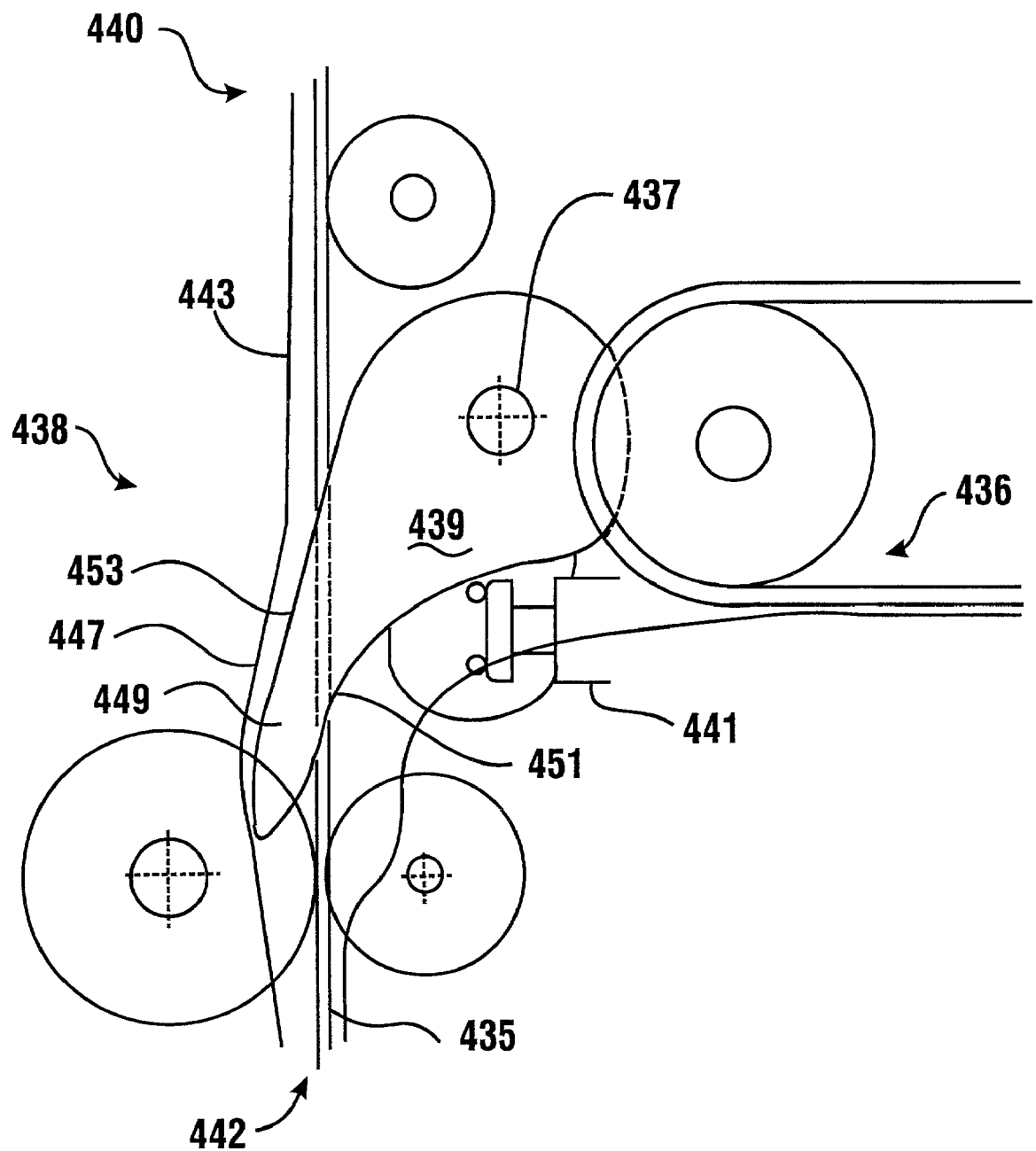
FIG. 52 is a view of a gate which may be used for directing notes between transport paths in the note receiving and dispensing mechanism shown in FIG. 46.

FIG. 52 shows a schematic view of gate 438. In this exemplary embodiment gate 438 includes a movable member 439 that is selectively rotated about an axis 437. The movable member 439 is rotated about the axis 437 by an actuator 441 which is partially shown. The actuator 441 is operatively connected to a controller so as to selectively move the movable member 439 between the positions shown in FIG. 52 and a position in which the movable member 439 is rotated counterclockwise from the position shown in FIG. 52 about axis 437.

Figure 47:
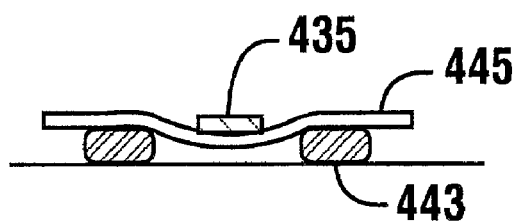
FIG. 47 is a schematic side view of a note transport configuration shown in connection with a note.

In the embodiment shown, notes are moved adjacent to gate 438 in connection with a movable belt flight 435. The belt flight 435 is disposed between a pair of elongated projecting rails 443. FIG. 47 shows an end view of a belt flight 435 and rail 443 arrangement in connection with a note 445 that moves with the belt flight 435. As should be appreciated, although in the exemplary embodiment only one belt flight 435 and two rails 443 are shown, in other embodiments different numbers of belts and projecting rails may be used. For example in some embodiments two belts and an intermediate projecting rail may be used to transport notes. The number of belts and rails used in a transport of this type will depend on the particular type of machine and the notes to be transported.

As shown in FIG. 52, the surface of each rail 443 includes an elongated recess 447. The recesses 447 and the rails 443 are positioned so as to generally accept therein a projecting nose portion 449 of the movable member 439. As can be appreciated from FIG. 52 in the exemplary embodiment, the nose portion 449 of the movable member 439 is forked, with the legs of the forked nose portion 449 straddling belt flight 435 in the position shown. The movable member 439 includes an arcuate surface 451 which extends from the nose portion 449 toward the lateral transport section 436. In the position of the movable member 439 shown in FIG. 52, notes moving in an upward direction as shown from the note storage transport section 442 engage the arcuate surface 451 on the movable member 439 which deflects and guides the notes to engage the lateral transport section 436 so that a note may be carried thereby towards the passage area at the opposed end of the lateral transport section 436. Likewise a note moving in the lateral transport section 436 toward the gate 438 engages the arcuate surface 451 and is directed downward into the note storage area.

As can be appreciated the nose portion 449 further includes an outer surface 453. When the movable member 439 is rotated clockwise from the position shown in FIG. 52, the outer surface 453 of the nose portion 449 is disposed relative to the belt flight 435 so that notes moving upward in the note storage transport section 436 may continue moving upward past the movable member 439. This enables such notes to pass the gate 438 and move upward into the second note outlet transport section 440.

It should be appreciated that although in this exemplary embodiment a belt type transport arrangement is used, in other exemplary embodiments mating roller or other type transports may also be suitably employed to move notes and other note types through the gate 438. It should further be appreciated that the structure of the gate 438 is exemplary and in other embodiments of the invention, other types of gate structures including those previously discussed may be used.

The note receiving and dispensing mechanisms 406, 408 and 410 in the exemplary embodiment are all similar in construction to those previously discussed and operate in a generally similar manner except as described herein. Each of the mechanisms 406, 408 and 410 is operatively connected with the note storage transport section 442. In the exemplary embodiment each of the note receiving and dispensing mechanisms 406, 408, 410 is used for storing and dispensing a different denomination of currency notes. This enables the machine 403 to provide multi-denominational storage. Alternatively two of the mechanisms may be used to store particular selected denominations of notes while a third may be used for storing valid notes of various denominations. In this way the machine 403 may operate to recycle notes of particular types such as twenty and ten dollar bills, while other denominations which are not as frequently requested for dispense from the machine, for example fifty or one hundred dollar bills, are stored in mixed relation in the third storage mechanism. In response to the programming of a controller 52 in the machine 403 the operator of the facility may use the machine 403 for storing these notes until selected authorized personnel unload the notes stored on this storage reel for purposes of transporting them to a bank or other facility. Of course it should be understood that in alternative embodiments numerous types of storage mechanisms for holding various note denominations or mixed note denominations may be used.

As each of the note receiving and dispensing mechanisms 406, 408, 410 in this exemplary embodiment are similar, only mechanism 408 will be described in detail. As shown in FIG. 45, mechanism 408 includes a note storage reel 444 and a take-up reel 446. A flexible web 448 extends between the reels 444, 446. The reels 444, 446 are driven by a drive 450 similar to that previously described. Driving the note storage reel 444 in a counterclockwise direction as viewed in FIG. 45, enables notes to be stored in wrapped relation with the web 448 onto the note storage reel 444. Likewise in a manner similar to that previously described, driving the note storage reel 444 in clockwise directions as viewed in FIG. 45, causes notes to be unwrapped from the note storage reel 444 and delivered from the mechanism 408. Each note receiving and dispensing mechanism 408 further includes nip rolls 452 which are used for guiding the notes which are moved onto or off of the note storage reel 444. A separating member 454 similar to that previously described is also included for assuring that notes to be delivered are separated from the web 448.

In the embodiment shown diverter gates 456, 458 and 460 are positioned in operative connection with the note storage transport section and respectively adjacent to note receiving and dispensing mechanisms 406, 408 and 410. Positioning of the respective diverter gate 456, 458, or 460 responsive to signals from a controller 52 enables notes traveling generally downward as shown in the note storage transport section 442 to be engaged with a selected one of the receiving and dispensing mechanisms 406, 408, 410. This enables a note to be selectively delivered into engagement with the nip rolls 452 of the mechanism so that it may be stored on the note storage reel 444 thereof. This operation of a controller 52 of the machine 403 enables selected notes to be stored in selected receiving and dispensing mechanisms 406, 408, 410. Diverter gates 456, 458 and 460 may also be positioned so as to guide notes which are delivered from the respective mechanisms 406, 408, 410 into engagement with the note storage transport section 442. As a result dispensed notes are enabled to be transported through the gate 438 and selectively delivered to either the second note outlet opening 416 or the first note outlet opening 414.

Figure 48:
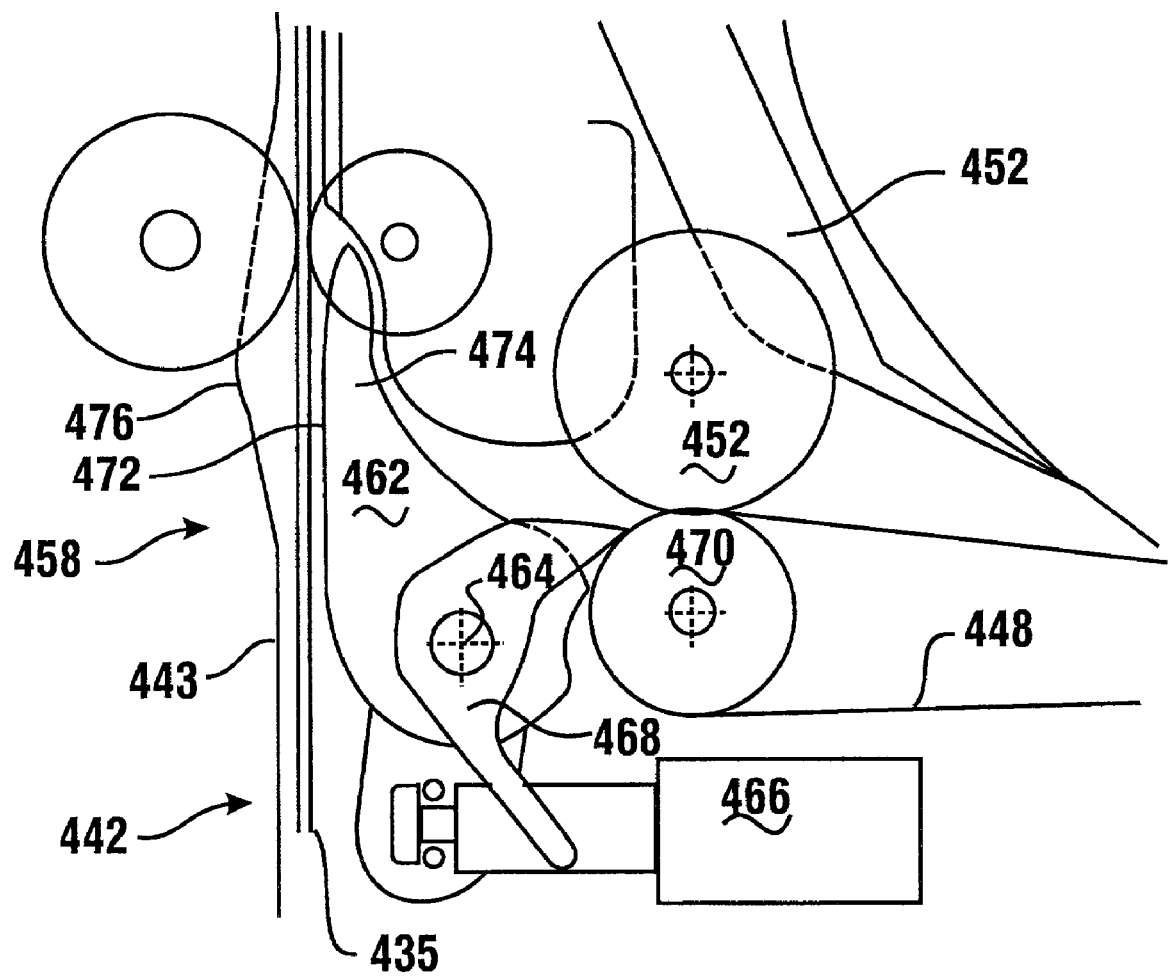
FIG. 48 is a side view of an alternative note directing gate positioned in a note passing configuration.

As the diverter gates 456, 458, and 460 used in connection with the note receiving and dispensing mechanisms 406, 408, 410 are similar, only gate 458 will be described in detail. As shown in FIG. 48, gate 458 includes a movable member 462 which is rotatable about an axis 464. Movable member 462 is selectively movable in response to an actuator 466, which in turn is responsive to signals from a controller 52 directing the actuator 466 to move the movable member 462. Also rotatably mounted about axis 464 is a separating member 468. Separating member 468 is biased to engage the web 448 and acts in a manner similar to separating member 124 of the previously described exemplary embodiment. Separating member 468 is biased in a clockwise direction about axis 464 so as to maintain generally continuous engagement with the web 448 and to guide notes to and from the nip formed by roll 452 and the web 448 which is supported on a roll 470.

Figure 49:
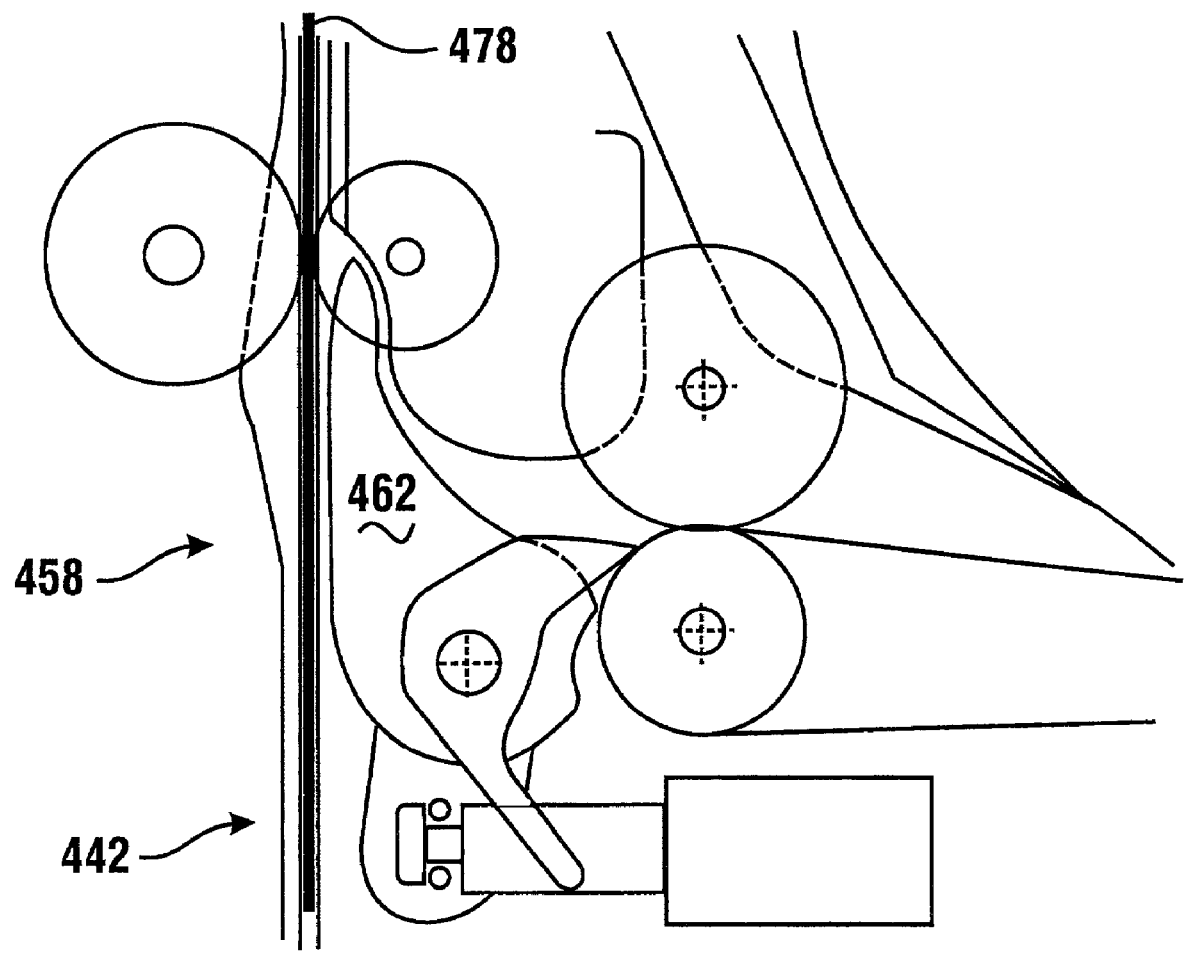
FIG. 49 shows the gate of FIG. 48 with a note shown adjacent thereto.

In the position of the movable member 462 shown in FIG. 48, an outer surface 472 bounding one side of a nose portion 474 of the movable member 462 is generally aligned with a belt flight 435 which moves notes adjacent to the gate 458 in a manner previously discussed. The belt flight 435 has adjacent thereto and opposed cooperating rails 443 to enable movement of the notes. The cooperating rails include recesses 476 in the area of the movable member 462 which perform a function that will be later discussed. As shown in FIG. 49 with the movable member 462 in the position shown, a note 478 is enabled to move past the gate 458 in the note storage transport section 442. As a result notes originating from other mechanisms and moving toward an outlet, or notes that have been received into the machine from an inlet and which are moving toward a lower positioned storage area, are enabled to pass the gate 458.

Figure 50:
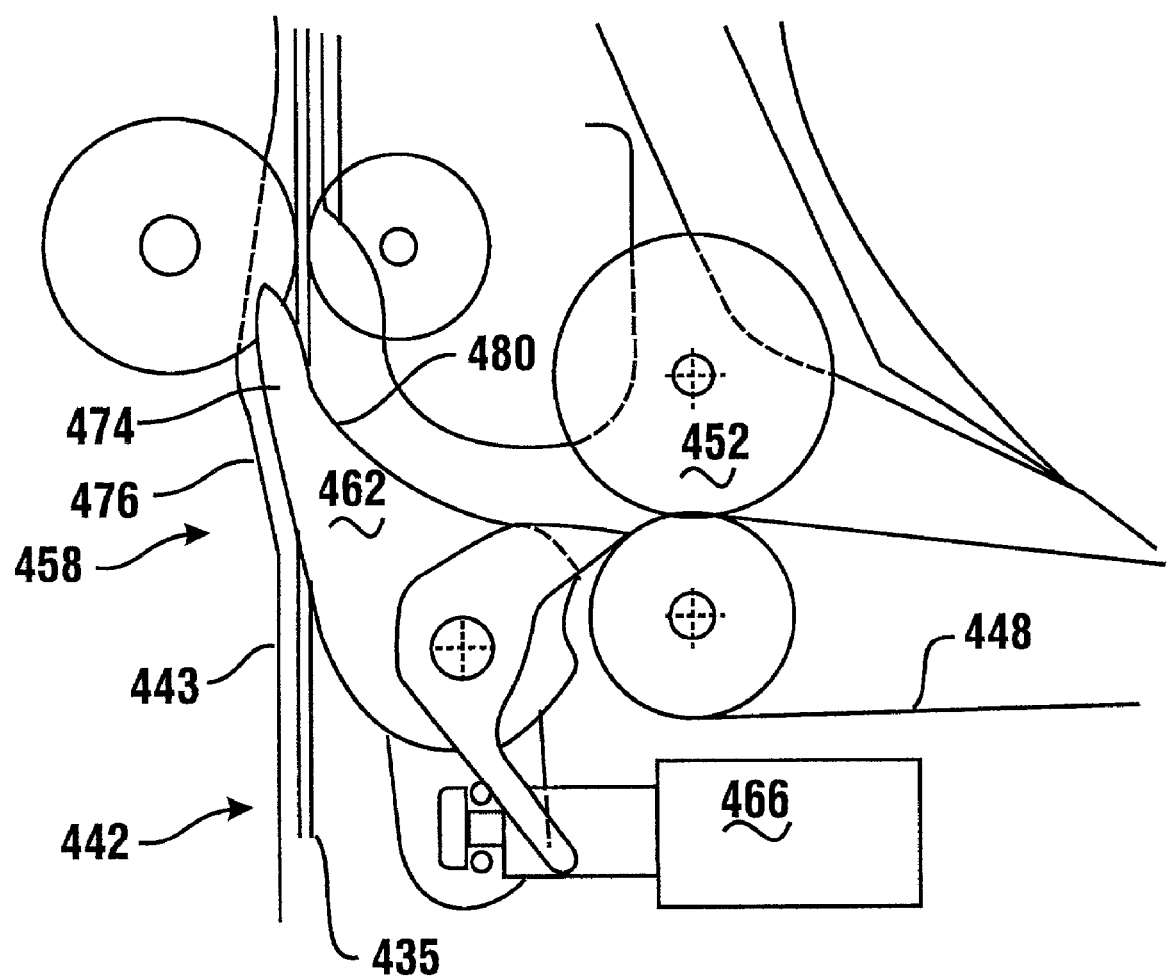
FIG. 50 shows the note directing gate of FIG. 48 configured for directing a note to or from a note storage reel.

As shown in FIG. 50 the movable member 462 is movable responsive to the actuator 466 to move in a counterclockwise direction from that shown in FIGS. 48 and 49. In this position the nose portion 474 extends in the recesses 476 of the rails 443. As can be appreciated the nose portion 474 in the embodiment shown is a generally fork-shaped portion and extends on both sides of the movable belt flight 435. The nose portion 474 also includes an arcuate surface 480 which extends from the nose portion 474. In the position of the movable member 462 as shown the arcuate surface 480 is adapted to guide notes to and from the note storage transport section 442 and the nip formed by the nip roll 452 and the web 448.

Figure 51:
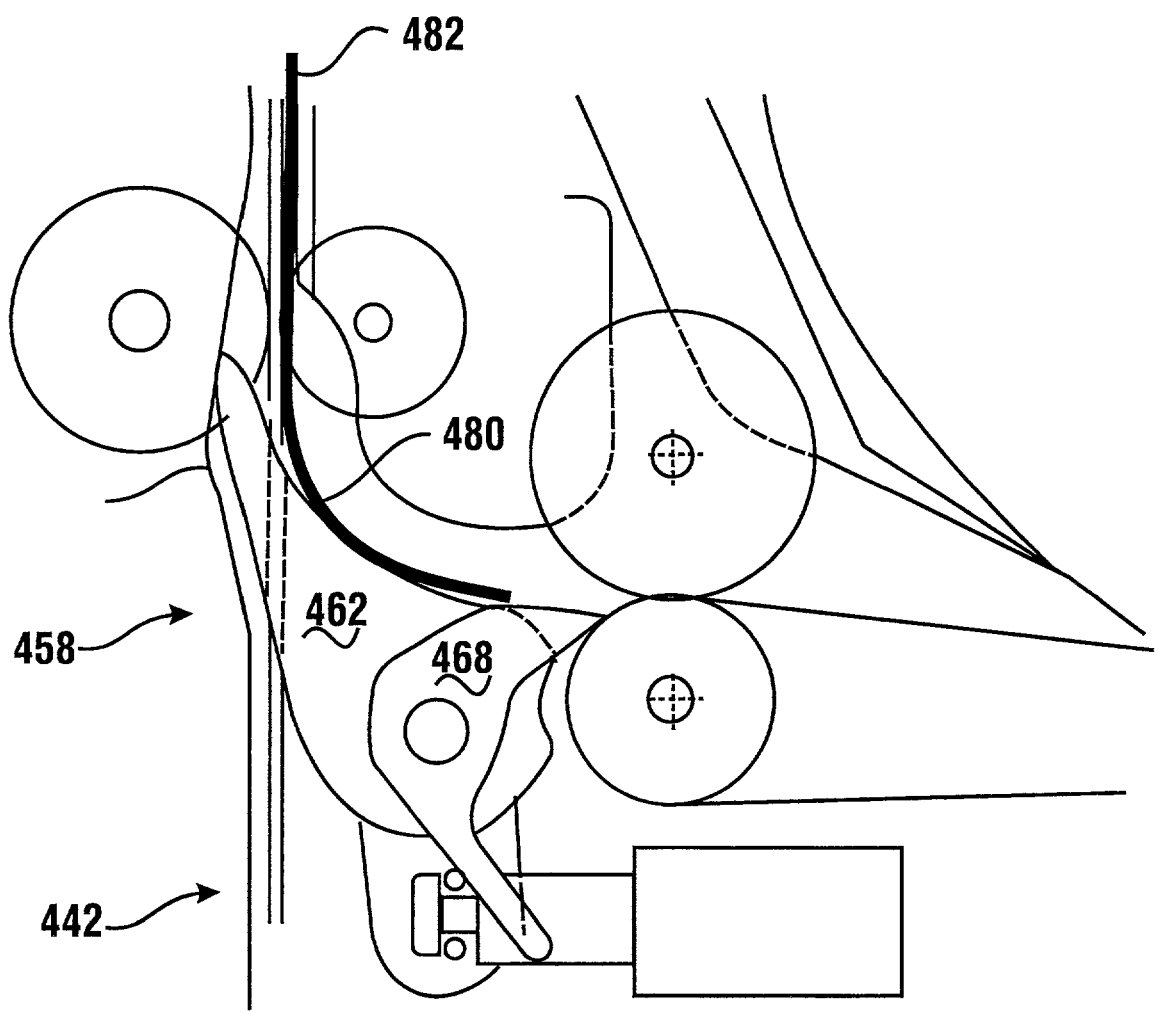
FIG. 51 is a view similar to FIG. 50 shown directing a note.

As shown in FIG. 51 a note 482 may move through the gate 458 either to or from the storage area. Moving note 482 engages the arcuate surface 480 on the movable member 462 and is guided by the movable member 462 as well as the separating member 468 to move between the note storage transport section 442 and the storage area of the mechanism.

It should be appreciated that the diverter gate structure is exemplary and that in other embodiments other configurations of diverter gates and note transports may be used. This includes diverter gates and transports of the type described elsewhere herein. It should also be mentioned that although a belt and projection type transport is discussed in connection with the exemplary embodiment, other embodiments may include transports of other types. This may include for example mating roll or belt type transports, belt and platen type transports and note transports of other types. It may be particularly useful in some embodiments to include opposed roll type transports wherein one roll in each pair is more readily deformed than the other. In such embodiments for example although both rolls are of a generally resilient material, one roll in the pair may be foam covered or include on its periphery other suitable material which achieves more ready deformation. Such readily deformable material may be particularly useful in controlling the pressure on the notes while achieving limited slip transport which may be desirable in some applications. Such limited slip capabilities may be particularly useful in areas adjacent to the gates where notes are held firmly when exiting the mechanism for dispense. A lead end of the note may reach the note storage transport section while a trailing end of the note is still held firmly in the nip. Such limited slip capabilities prevents tearing or other damage to the notes in such circumstances. Of course numerous types of limited slip type transport mechanisms may be provided by controlling the properties of the note moving members and the particular approach taken may depend on the configuration of the particular mechanism as well as the type and character of notes being handled in the machine.

Figure 53:
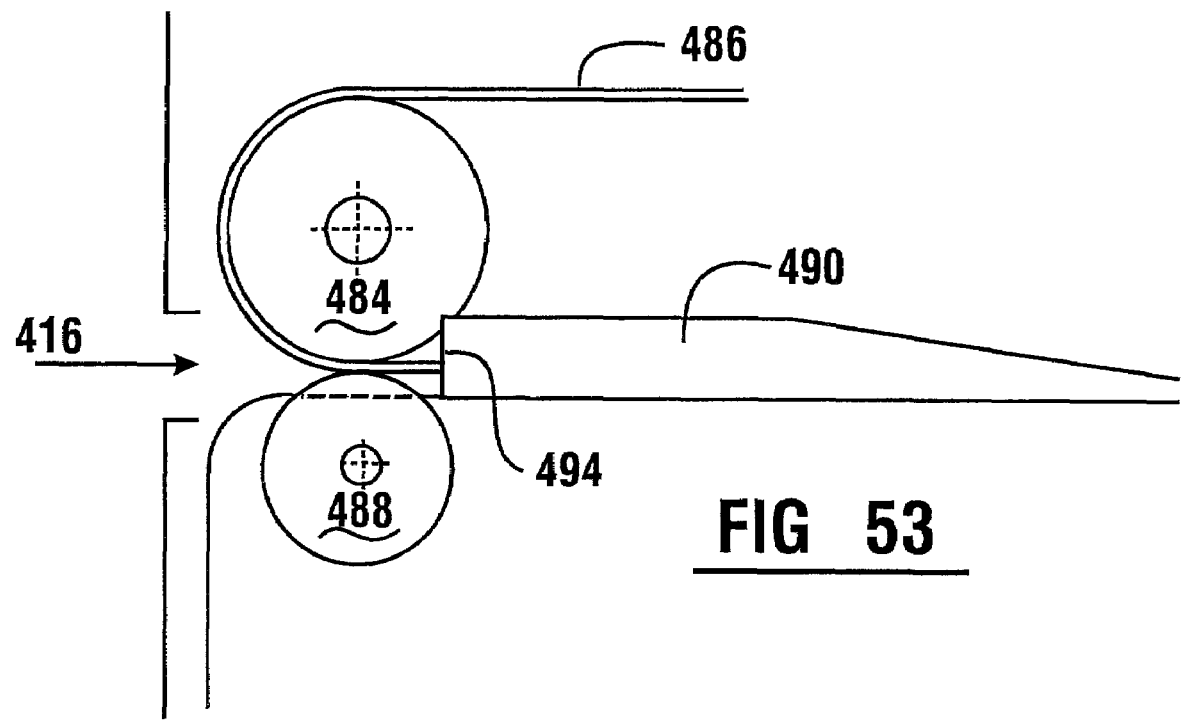
FIG. 53 is a cross sectional view of an arrangement for preventing the insertion of notes adjacent a consumer side note outlet opening.
Figure 54:
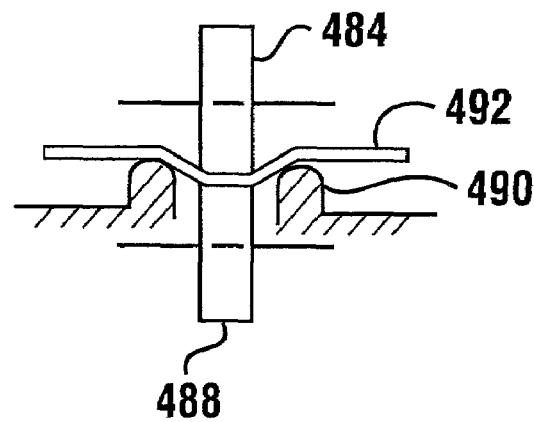
FIG. 54 is an end view of the structure shown in FIG. 53 with the note in connection therewith.

FIGS. 53 and 54 disclose a structure that is used in the exemplary embodiment of machine 403 to prevent users from attempting to insert foreign objects into the machine 403. As can be appreciated, children or persons attempting to engage in mischief may attempt to insert foreign objects into the second outlet 416 opening from which notes are dispensed. While on occasion such inserted items may include burglar tools and the like, it is more common for persons to attempt to insert cardboard notes, flexible containers or other items therein. While note outlet openings may be provided with gates or other suitable mechanisms to block the insertion of such foreign objects, the inclusion of such mechanisms and the associated control hardware may add cost to the machine.

FIGS. 53 and 54 schematically represent a useful way of preventing the insertion of such foreign objects by including a rail configuration which restricts the insertion of foreign objects. FIG. 53 shows the roller configuration adjacent to second note outlet opening 416 of the machine. Adjacent to second note outlet opening 416 are a roll 484 which has a movable transport belt 486 supported thereon. It should be appreciated that belt 486 and roll 484 operate to move notes outward to the second note outlet opening 416 from the note outlet transport 434. In the embodiment shown a pinch roll 488 is positioned in opposed relation to roll 484. A pair of note guide rails 490 extend on opposed sides of the rolls 484 and 498 such that the lower flight of belt 486 extends transversely in between the rails. Notes as represented by note 492 are moved by engagement with the lower flight of belt 486 between the rails 490.

In an area adjacent to the second note outlet opening 416 the height of the rails 490 is somewhat increased. This increases the transverse cross sectional wave configuration of the note 492 as it moves toward the second note outlet opening 416. This provides an added advantage in that by providing such a cross sectional wave configuration the rigidity of the note 492 is increased. This helps to assure that the note will pass straight outward from the rolls 484, 488 through the second note outlet opening 416. The enlarged rails 490 also terminate in a vertically extending blunt face 494. Face 494 in the exemplary embodiment extends generally transverse to the direction of note travel and is disposed somewhat inward from the axis of rotation of the rolls 484 and 488.

In the event that a person attempts to insert a note, piece of steel, cardboard, plastic or other unauthorized object inward through the second note outlet opening 416, such attempt will initially be restricted by the opposed rolls 484 and 488. In the event that the person is able to push the object past the rolls 484, 488, such object will engage the front face 494 of the rails 490. Such engagement will generally restrict any attempted further inward movement of such a foreign object. Further engagement of the flat object with the rolls 484, 488 and the height of the rails 490 will make it difficult to circumvent the blunt face 494 and extend the object inward.

It should be understood that while in the exemplary form shown the blunt face 494 extends generally transversely to the direction of note travel, in other embodiments other configurations may be used. For example it may be useful in some configurations to have the blunt face 494 extend in an angled direction such that an inserted object is deflected downward so as to engage the support surface upon which the rails 490 are supported. This wedging action may help to prevent the insertion of foreign objects and provide added strength to the object blocking configuration. Of course these structures are exemplary and in other embodiments other approaches to blocking the insertion of foreign objects may be used. It should be understood that while in this exemplary embodiment the rails 490 are associated with the second note outlet opening 416, in other embodiments similar rails may be associated with other note outlet openings.

It should be understood that while in the exemplary embodiment of the machine shown there are three note receiving and dispensing mechanisms, other embodiments may include different numbers of such mechanisms. In addition the type of mechanism shown herein is but one of several types of note storage and/or dispensing mechanisms that may be provided in embodiments of the present invention for purposes of storing and delivering notes. It should also be understood that while machine 403 is shown in FIGS. 45 and 46 without a top hat 336 which includes the merchant and consumer interfaces, such interfaces as previously described may be used in connection with embodiments of the machine 403.

Figure 55:
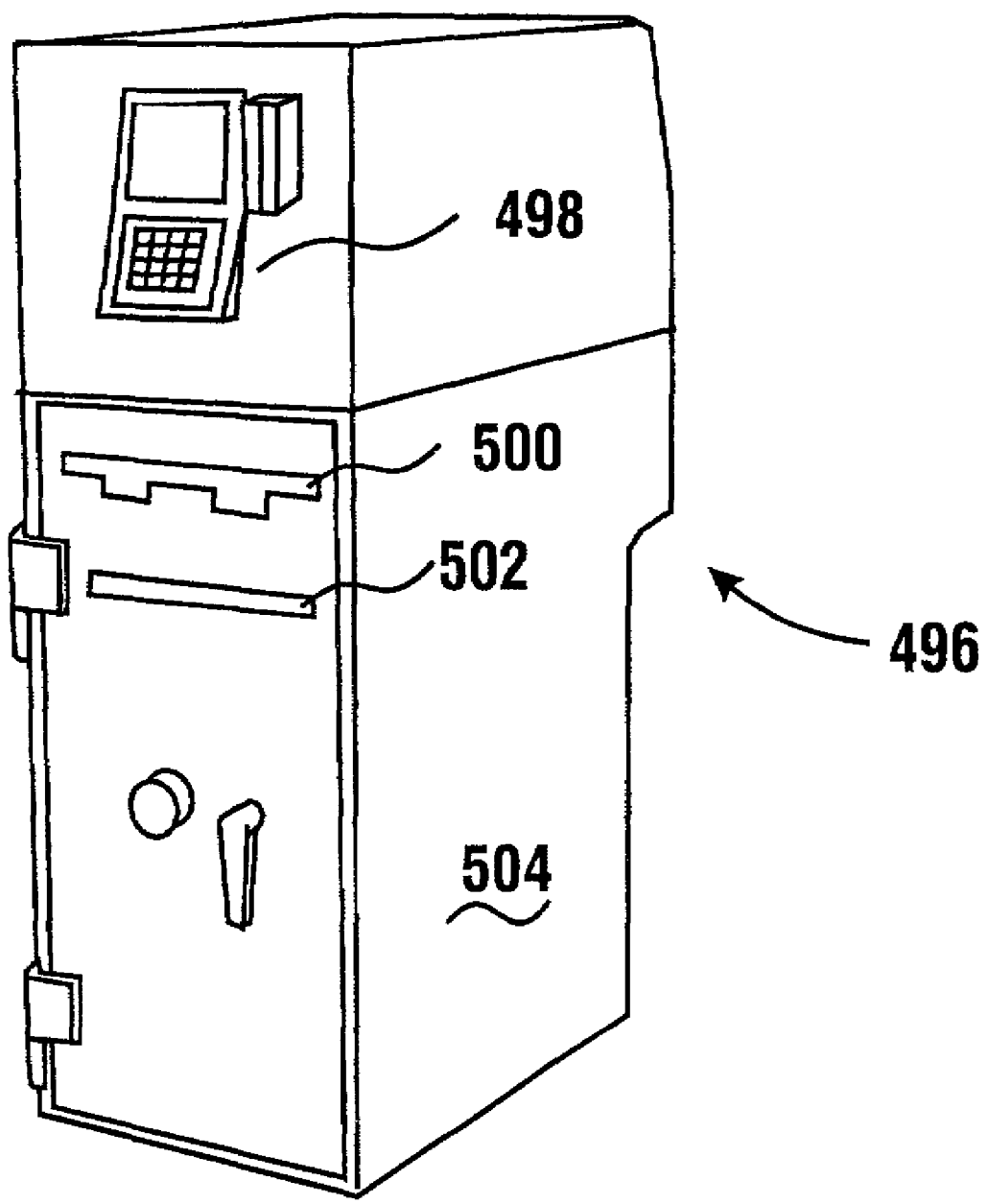
FIG. 55 is a rear isometric view of a stand alone automated transaction machine.

FIG. 55 shows an example of a stand alone type of automated transaction machine 496. The machine 496 may be used at a business/customer environment for transactions, such as through a counter. FIG. 55 shows an exposed merchant interface 498 on the rear surface of the machine 496. A consumer interface is adjacent the front side of the machine 496. A door and lock mechanism for the chest portion 504 are also shown. The machine 496 has a merchant side cash outlet 500 and a cash inlet 502.

The designations merchant and consumer are exemplary and are typical, but are not intended to be limiting. Generally, the merchant interfaces 498 provides greater access to the contents of the automated transaction machine 496 than do the consumer interfaces. This arrangement may be useful to permit appropriate levels of access to merchants and consumers. There may also be circumstances in which such an arrangement may be useful to permit appropriate levels of access to different classes of merchant employees. For example, such an arrangement may be useful to permit management employees a greater level of access, through the merchant interface, than cashiers, who might be permitted access only through the consumer side.

Figure 56:
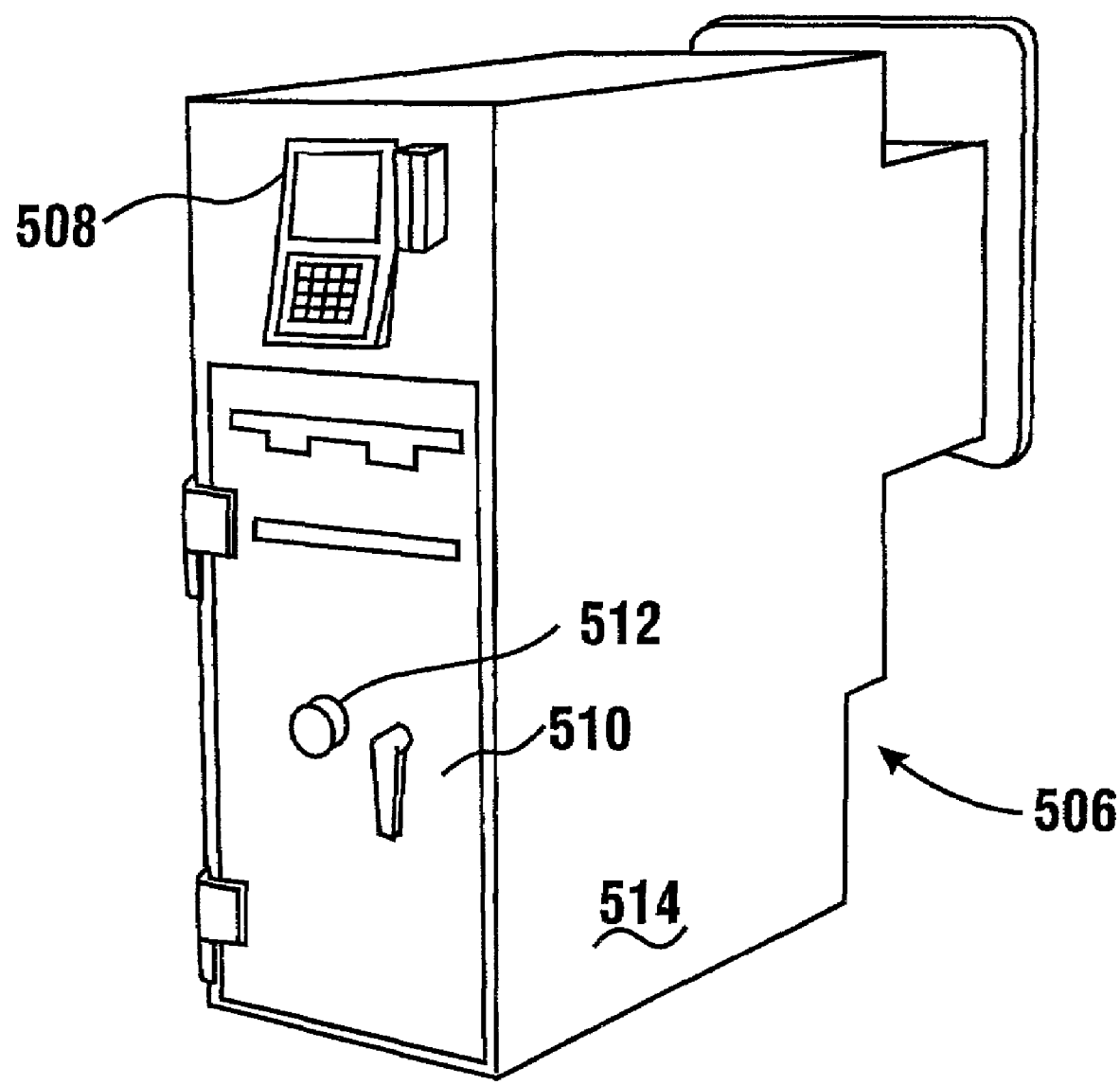
FIG. 56 is a rear isometric view of a through the wall type automated transaction machine.

FIG. 56 shows an exemplary through the wall type automated transaction 506 machine which may be located to extend through a wall. The arrangement may be used when it is desirable to have the merchant interface 508 on one side of the wall and the consumer interface on the other side of the wall. This view shows the merchant interface 508 on the rear side of the machine 506. The consumer interface is adjacent the front side of the machine 506. A door 510 and lock mechanism 512 for the chest portion 514 are also shown. Each of the machines 496, 506 shown in FIGS. 55 and 56 may use the note storage and dispensing mechanisms of FIG. 45 or other suitable arrangements. It should be understood that machines like that in FIGS. 55 and 56 may also have the merchant interface positioned within the machine in a manner like that described in connection with the machine shown in FIG. 31. In the alternative the merchant interface of either machine type may be mounted on a lockable access door which may be used to provide access to the interior of the top half portion of the machine.

In other exemplary embodiments, customers may use the automated transaction machine not only to obtain cash but also to pay for purchases by crediting the merchant's account. Customers may also use the machine to order items, such as food, and credit the merchant's account for the purchase. Additionally, a voucher, receipt or similar item may be printed and delivered to the customer showing a credit was made to the merchant's account. The voucher may then be used to make purchases or to receive goods or services from the merchant or an affiliated entity.

In operation of an exemplary automated transaction machine, the merchant side user may be required to input information through one or more input devices. In an exemplary operation of the machine 10 having the configuration shown in FIG. 31 the merchant user may first need to unlock the locking mechanism 364 to open the access door 362 to access the merchant interface 352 in the top hat 336. The merchant user may then be required to pass a card through a card reader which includes account data corresponding to the business. Additionally, the merchant user may also be required to input a personal identification number through the keys of a keypad. The user may then be prompted with a series of prompts or questions. In response to the user's inputs a controller 52 is operative to determine whether the user is authorized to operate the machine 10 and/or to deposit or withdraw amounts as requested. This may be done in some embodiments based on data stored in local memory in the machine 10. Alternatively, a controller 52 may communicate with a remote computer system through a communications device to verify whether the merchant user may operate the machine 10.

If it is determined that the merchant user is authorized to operate the machine 10, a controller 52 operates in accordance with its programming to present the merchant user with one or more prompt messages through the output device of the merchant interface 352. These output messages in the exemplary embodiment request that the merchant user provide an input to indicate whether they wish to withdraw cash from the machine or to input cash. If the merchant user provides an input through an input device of the merchant interface 352 indicating that they wish to input funds, the output device then prompts the user to input cash through the merchant inlet opening 342. As previously discussed, this may be done one note at a time or in embodiments which include the capabilities of handling a stack of bills, an entire stack may be input to the machine 10. As the merchant user performs the cash input operation, a controller 52 operates the output device on the merchant interface 352 so that the user is instructed to provide a further input to indicate when they have completed the cash input operation. In alternative embodiments a controller 52 may operate to provide a running total on the output device as to the value of the bills that have been input by the merchant user. Thus as notes pass through the note validator 588 and are verified, the total amount input as indicated on the screen of the merchant interface 352 increases.

As the notes are received by the machine 10, a controller 52 operates the transports and note receiving and dispensing mechanisms to route the notes to the appropriate mechanism for storage. The note receiving and dispensing mechanisms are then operated as the notes arrive so that they are stored in note storage area 348, 350. Notes which are unsuitable or unidentifiable may be returned to the merchant user or routed to a divert area 370 based on the programming of a controller 52.

In machines having a configuration like that shown in FIG. 45, unidentified notes may be stored in a selected one of the note receiving and dispensing mechanisms 406, 408, or 410 in the note storage area. Additionally or in the alternative the unidentified notes may be stored in a note receiving and dispensing mechanism 406, 408, or 410 which is dedicated to various denominations of bills which are not to be recycled by the machine 403.

Upon completion by the merchant user of the note input transaction, the merchant user may indicate that they are finished by providing an input through the merchant interface 352. In the exemplary embodiment a controller 52 is then operative to cause a receipt to be printed for the merchant user. This receipt may include the total amount of money input and may be used as evidence by the merchant user that the money was deposited. Embodiments may be programmed to provide the merchant user with additional information which may be of value in the operation of the merchant's business. This may include for example the particular name of the merchant user associated with the card and/or PIN used for accessing the machine 10. The receipt information may also include in addition to the total value of money input, the particular number and denomination of each bill type deposited. The receipt may also include other information such as the character of any unsuitable notes which were deposited, the time the deposit was made, the amount and/or numbers of denominations of notes in the machine 10 before and/or after completion of the transaction or any other information that may be useful in the operation of the merchant's business.

The printed receipt may be delivered to the merchant user by an appropriate transport mechanism. This may include for example a transport and gate mechanism which delivers the receipt through the housing 12 of the machine 10 when the merchant interface is positioned outside of the machine 10. Alternatively in configurations of machines such as those shown in FIG. 31, the receipt may be delivered to the merchant user inside the top hat 336.

After the completion of the deposit transaction the merchant user may be prompted by messages output through the merchant interface 352 to indicate whether they wish to conduct another transaction. Such transactions may include additional deposits or the dispensing of cash from the machine 10. Assuming that the merchant user provides an input indicating that they do not wish to conduct further transactions, a controller 52 operates the machine 10 to close the session and the machine 10 is now ready for operation by consumers or further merchant users. In the case of an embodiment of the machine 10 where the merchant interface is within the interior of the machine, 10 the merchant user would also close the door used to access the interface. They may also be secured by locking a lock. This protects the first interface from dirt and other contaminants that may be found in the merchant's environment. It has been found that the use of a merchant interface which is enclosed within the machine 10 is particularly well adapted for use in fast food environments and other environments where airborne contaminants otherwise may collect and eventually impede the operation of a merchant interface.

Merchant users may also use exemplary embodiments to obtain cash for use in operation of the merchant's business. This may be done by the merchant user accessing the machine in the manner previously described such as through use of a card and PIN number. If the machine is of the type where the merchant interface is disposed within the machine it is necessary for the merchant user to open the machine in order to gain access to the card reader and key pad and other input and output devices. Once the user has identified themself to the machine and has been determined to be an authorized user, the merchant user is presented with the prompt messages which request an input concerning the type of transaction to be conducted. Alternatively after a merchant user has conducted a prior transaction such prompt messages may be presented. If the merchant user inputs a request to withdraw funds, a controller operates the machine so as to provide appropriate output messages. In response to these messages, the merchant user may indicate the amount of funds that they wish to withdraw.

In some embodiments a controller may operate to provide the merchant user with messages prompting the user to indicate the number and denomination of notes they wish to receive. This may be valuable to a merchant user who requires particular denominations of notes from the machine to carry out the efficient operation of their business, such as for making change. Various approaches to presenting merchant users with withdrawal options may be provided in embodiments through programming of a controller which controls operation of the machine.

In response to the merchant user providing the inputs corresponding to the amount and/or types and numbers of notes they wish to withdraw, a controller operates the machine to deliver the requested bills through the merchant note outlet opening. A controller operates the appropriate note receiving and dispensing mechanisms, transports, gates and other mechanisms to direct the bills to the merchant user. Once the bills have been delivered the merchant user may take them for use in operation of the business. After the completion of the dispensing operation the machine may provide the merchant user with a receipt indicating the amounts, types of notes and other information concerning the withdrawal transaction and/or status information concerning the machine. The merchant user may use the receipt for purposes of tracking the whereabouts of cash within the business as well as for auditing the operation of the machine. Of course a controller may also operate to present the merchant user with additional transaction options. The merchant user may provide inputs requesting such additional transactions or may provide an input ending the session so that they are signed off the machine. As previously discussed, in embodiments where the merchant interface is positioned within the machine the merchant user will generally close and/or lock the door when merchant transactions are not being conducted.

It should be understood that while merchant transactions are authorized in the exemplary embodiment using data encoded on a card and a corresponding PIN number, other approaches to authorizing operation of the machine by merchant users may be used. This may include for example a card or access code alone. Other embodiments may use other types of identifying articles or features to identify merchant users. This may include for example tokens which can be read by token readers or other types of identifying articles which can be read by a machine. Alternatively, the machine may include biometric type reading devices which are capable of reading a physical feature associated with a merchant user. These may include for example fingerprint readers, retina scanners, iris scanners, facial recognition features, voice recognition features or combinations of any of the above.

In the exemplary embodiment the merchant users are provided with paper receipts relating to transactions that are conducted. It should be understood however that in other embodiments other forms of documentation may be provided to merchant users. This may include storing information regarding transactions on a card or other object. Such transaction data may be stored for example on a magnetic stripe card or in memory on a smart card. Alternatively merchant users may have contactless cards or tokens which are electronically or magnetically programmable so as to record information concerning transactions. Various approaches may be used by embodiments to providing merchant users with a record that can later be recovered concerning the transactions that they have conducted at the machine.

In exemplary embodiments merchant users may have various levels of authorizations which determine the transactions that can be conducted at the machine. For example certain merchant users may be restricted to only providing cash for storage in the machine. Other merchant users may have authority both to deposit cash as well as to receive cash. For example in some situations operators of establishments may wish to limit the capability of receiving cash to management type employees who may need such cash to replenish cash registers or otherwise use money from the machine in the operation of the business. Alternatively or in addition, additional levels of authority may be provided depending on the circumstances and the nature of the machine. For example in the case of machines such as that shown in FIG. 45 where a storage area contains bills which are not being recycled, only management type personnel who are authorized to unload the machine may be granted access to dispensing notes from the particular storage area. This may be limited to for example management level employees who are responsible for making deposits. In such circumstances those employees when operating the machine may be presented with additional options for unloading the notes in the storage areas which hold notes which are not to be recycled. Further in alternative embodiments where numerous denominations of notes are stored, levels of authorization may be provided so that certain authorized merchant employees may only receive certain denominations of notes while others may have access to higher denominations as well. As can be appreciated limits upon withdrawals may also be imposed by programming of a controller in the machine or related systems. Such programming may limit the amount of a withdrawal that a merchant employee can make and may also limit the amount that can be withdrawn within any time period in successive transactions. Such controlled access and transaction options may be provided for in numerous ways depending on the requirements of the establishment and the configuration of the machine being used.

It should further be understood that records of all transactions conducted by exemplary embodiments may be recorded and stored in a data store. Records of such transactions may be held within the machine and/or may be recorded in remote storage associated with other computers which are in communication with the machine through a communications device. This enables the operator of the machine to review transaction activities conducted through the machine. It further enables the merchant user to compare records of merchant transactions which are provided through receipts in hard copy form, to the electronic data concerning the operation of the machine. Various approaches to auditing and balancing the machine may also be employed to assure that transactions and monetary amounts are accounted for in the operation of the business.

As can be appreciated, the exemplary embodiments also enable consumers to operate the automated transaction machine. Consumers operate the machine through the consumer interface which includes input and output devices. For example, a consumer may present a card to a card reader which provides an input including an account number associated with the consumer. Likewise the consumer may present a PIN number which corresponds to the consumer or their account and is used to verify that the consumer is authorized to use the account associated with the card. Thereafter a controller operates in response to the input data from the consumer to determine whether the consumer is authorized to conduct a withdrawal of cash from the machine. Generally this is done through communication by a controller through a communications device to a remote computer. The consumer interface also operates responsive to a controller to prompt the consumer to indicate through inputs to input devices the amount of money they wish to withdraw. The interface may also provide the consumer with an indication of the transaction surcharges that may be associated with a requested transaction. Of course other information may also be presented to the consumer such as advertising or promotional information as previously discussed.

Assuming that the consumer is authorized to conduct a transaction a controller will operate the note receiving and dispensing mechanism within the machine to provide the consumer with the requested cash. In addition a controller will cause a receipt to be printed which provides the consumer with information concerning the transaction. A controller will also route the receipt to the consumer interface through an appropriate gate or transport mechanism so that the receipt may be taken by the consumer.

Thus the exemplary embodiments herein described may operate to provide consumers with cash in the manner of an automated teller machine while providing a merchant with a device which can be used to store, retrieve and track cash used in the operation of business. Exemplary embodiments also reduce the need for merchant users to access the interior areas of the machine for purposes of loading or dispensing cash therefrom. Exemplary embodiments may also enable merchant users to limit access to cash to selected employees and to do so in a manner that provides a reliable audit trail related to the input and dispensing of cash. Other embodiments may enable a merchant user to make more effective use of the cash that they receive in their business and to pursue profit making opportunities for the merchant by being able to collect a portion of transaction fees that may be charged on transactions conducted by consumers at the machine. In addition exemplary embodiments as described herein may be better suited for use in environments where contaminants may be present. Likewise exemplary embodiments of automated transaction machines may be configured in a variety of ways suitable for use in various types of transaction environments.

Figure 58:
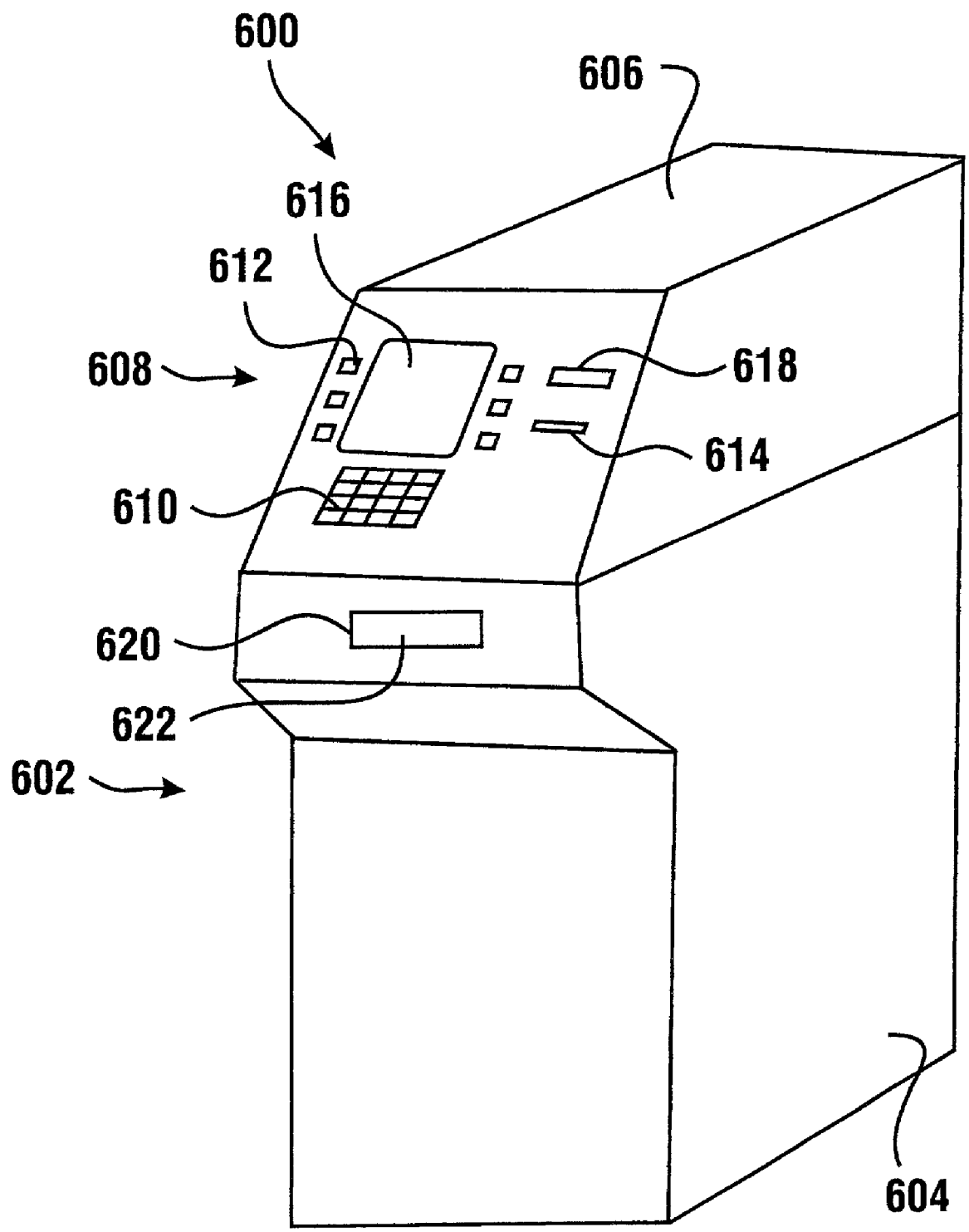
FIG. 58 is a front isometric view of an exemplary automated transaction machine that may include the note receiving and dispensing mechanism of FIG. 57 or other mechanisms of the types described herein.

FIG. 58 shows an exemplary automated transaction machine 600 which may incorporate the note receiving, storing and dispensing mechanisms that have been previously discussed. Machine 600 may alternatively include other types of note dispensing and/or storage mechanisms as well as other types of devices for carrying out transactions. The rear of machine 600 like the machines previously discussed, may include devices for receiving and dispensing notes to merchant users. Likewise machine 600 may include a merchant user interface, either positioned at the rear of the machine or within the interior thereof. It should be understood that various configurations and features may be used in connection with machines that incorporate aspects of the present invention.

Exemplary machine 600 has a housing 602. Housing 602 includes a chest portion 604. Housing 602 further includes an upper portion 606 which may alternatively be referred to as a top hat.

Housing 602 has supported thereon a user interface 608 which enables users of the machine 600 such as consumers to conduct transactions. The user interface 608 includes input and output devices. In the embodiment shown the input devices include a keypad 610 and function keys 612. A further input device in the exemplary embodiment is a card reader which is schematically represented by a card entry slot 614. It should be understood that embodiments may read various types of cards such as magnetic stripe cards, smart cards, cards with optical or other types of indicia. Output devices in the exemplary user interface 608 include a screen 616 and a printer represented by a receipt outlet slot 618. It should further be understood that these input and output devices are exemplary and other types of devices for receiving information or instructions from a customer and for providing information to a user may be used in other embodiments.

The exemplary machine 600 is a currency recycling automated transaction machine like the machines previously described. In this embodiment the consumers who operate the machine 600 conduct transactions related to the receipt of notes such as currency. In this embodiment currency is delivered to customers at the machine 600 through an opening 620. The opening 620 in the exemplary embodiment is normally blocked by a cover 622. Cover 622 is movable in response to a motor, solenoid or other type of movement device which is controlled by the one or more controllers 52 which operate within the machine 600. A controller 52 within the machine 600 controls the operation of the devices therein to carry out transactions in a manner like that discussed in connection with the machines previously described. It should be appreciated that while machine 600 is an ATM, embodiments may be incorporated in numerous types of machines, examples of which have been previously discussed which carry out transactions involving transfers of value.

Figure 57:
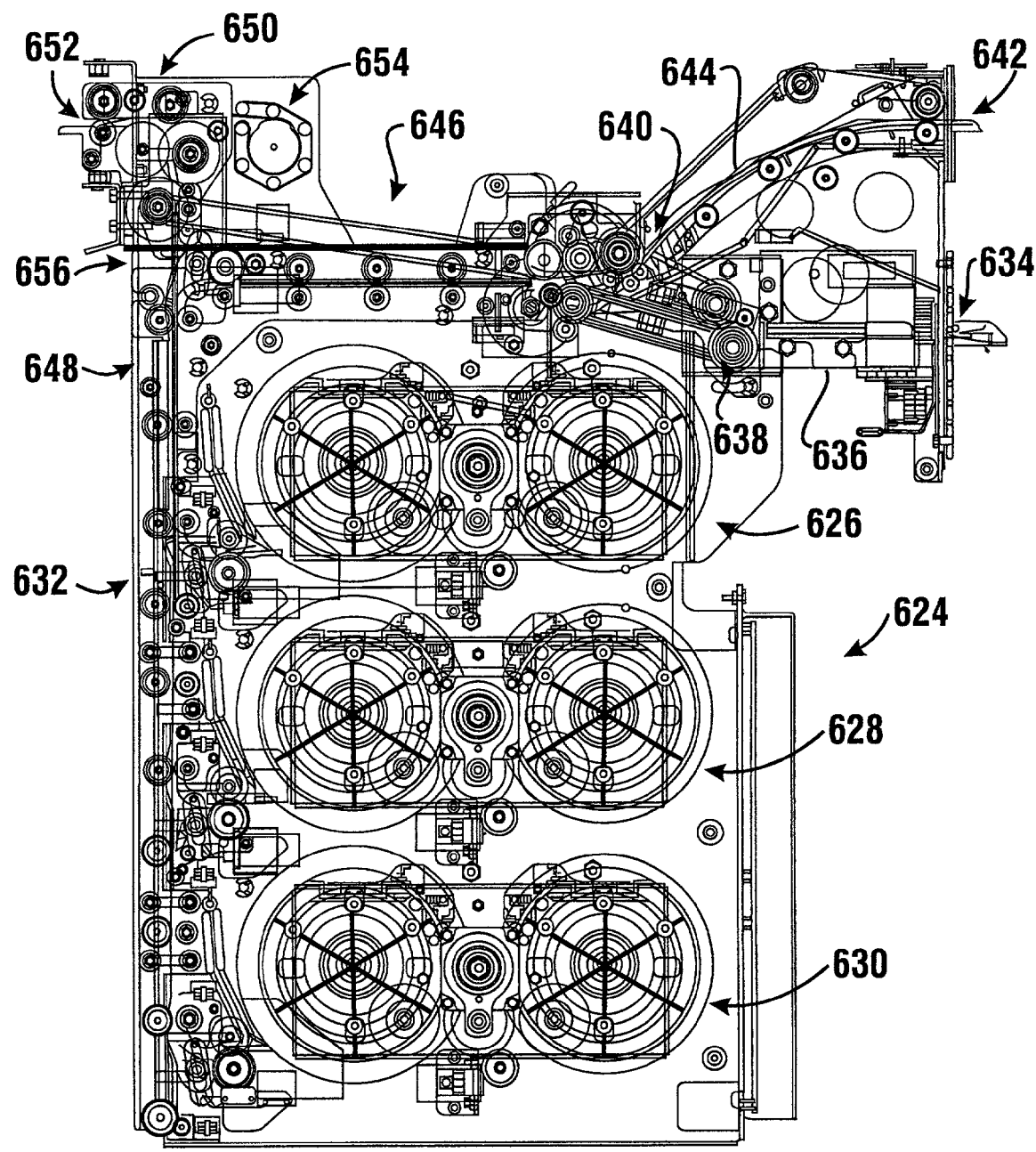
FIG. 57 is a transparent side view of an alternative note receiving and dispensing mechanism which includes a note stacking mechanism.

FIG. 57 shows an exemplary note receiving and dispensing mechanism 624 which may be used in an exemplary automated transaction machine 600. Note receiving and dispensing mechanism 624 is generally similar to the mechanisms previously described except as specifically discussed. Note receiving and dispensing mechanism 624 includes a first note storage area 626, a second note storage area 628 and a third note storage area 630. The note storage areas 626, 628, 630 are like those previously discussed which store and deliver notes from a flexible web which is supported on rotatable reels. The note storage areas 626, 628, 630 are connected to a vertical note transport 632 which operates to move notes to and from note storage areas 626, 628, 630 in a manner that has been previously discussed.

Note receiving and dispensing mechanism 624 further includes a merchant note inlet 634 and a note validator 636, of a type previously discussed. The merchant note inlet 634 and note validator 636 in the exemplary embodiment enable the merchant user to deliver currency bills into the machine 600 for storage. The note validator 636 is in connection with an note inlet transport section 638 which leads to a passage area 640.

Exemplary machine 600 also includes a merchant note outlet 642. The merchant note outlet 642 is in connection with a note outlet transport 644 which delivers notes from the passage area 640 to the merchant note outlet 642. In this exemplary embodiment the passage area 640 may be similar to those previously described and may include a note directing mechanism so that incoming notes are directed inward through the passage area 640 from the note inlet transport 638 and outgoing notes are directed through the passage area 640 to the note outlet transport 644.

In this exemplary embodiment the passage area 640 passes notes to and from a horizontal transport section 646. The horizontal transport section 646 is configured to receive notes from and deliver notes to the vertical note transport 632. The horizontal transport section 646 extends adjacent to the vertical note transport 632 at an intersection 648.

A consumer note outlet transport section 650 extends from adjacent the intersection 648. In this embodiment the consumer note outlet transport section 650 includes an outlet 652 from which notes including stacks of notes are delivered. Outlet 652 is positioned inside the housing 602 of the machine 600 adjacent the opening 620 in the housing. A consumer note outlet transport section 650 is also in connection with a stacker mechanism 654. The stacker mechanism 654 which is later described in detail enables accumulating notes that are dispensed from the note storage areas 626, 628, 630 into a stack so that the stack may be presented to a consumer at the machine 600. A note transport gate 656 is positioned adjacent to the intersection 648 so that notes may be directed to and from the vertical transport 632 and the horizontal transport section 646 or alternatively from the vertical transport 632 to the consumer note outlet transport section 650. Note transport gate 656 may be one of the types previously described or may be one or more other types of note directing mechanisms.

In exemplary machine 600 merchant users are enabled to deliver currency bills for storage in the machine 600 through the merchant note inlet 634. As in the previously described exemplary embodiments, notes of particular denominations may be stored in accordance with the programming of the one or more controllers operating the machine. Notes of particular denomination may be for example, stored in a selected one of the note storage areas 626, 628, or 630 so that the notes may be later recovered and delivered to consumers in cash dispensing transactions. Because three note storage areas 626, 628, 630 are shown in the exemplary embodiment, up to three different denominations of notes may be stored and selectively dispensed from the machine 600. It should be understood however that various numbers of note storage areas may be used in embodiments of the invention. Alternatively while certain note storage areas may be used for particular denominations of bills, other note storage areas or other types of mechanisms may be used to store notes that are not to be delivered to consumers. Such notes may be stored for example for later recovery by authorized merchant users. Merchant users may receive notes from the machine 600 as needed for operation of the business through the merchant note outlet 642.

It should be appreciated that while in the exemplary embodiment shown note storage areas 626, 628, 630 are provided which may receive and dispense notes, other embodiments may include different or additional note handling devices. These may include for example devices which only dispense notes or which only receive notes for storage. Some embodiments may include recycling type mechanisms as well as other types of note handling devices. The particular devices included in a particular machine will be dependent on the types of functions being performed and transactions being offered.

In an exemplary machine 600 notes are dispensed from a note storage area 626, 628, 630 and are moved to a consumer through the vertical note transport 632 and the consumer note outlet transport 650. As shown in FIG. 67, consumer note outlet transport 650 includes a note transport gate 658. In the position of gate 658 shown in FIG. 67, a note 660 moving outward in the consumer note outlet transport 650 is directed by the gate 658 into a throat area 662 which is associated with the stacker mechanism 654. As shown in FIG. 67, note 660 is urged to move into the throat area 662 by note moving members 664, 666. It should be understood that while in the exemplary embodiment note engaging rolls are used as note moving members, in other embodiments belts, fingers or other devices for moving notes may be used.

In an exemplary embodiment when a consumer operates the machine 600 the consumer provides one or more inputs through the input devices on the user interface 608. This may commonly include for example in the case of an ATM, the input of a card and PIN number as well as manual instructions which request the dispense of an amount of currency bills from the machine 600 responsive to the at least one input from the consumer. The machine 600 operates responsive to its at least one controller 52 and the programming associated therewith, to verify that the consumer is entitled to receive the amount requested. This may be done by various techniques depending on the type of machine and transaction involved, and often requires that the machine 600 communicate with a remote computer to verify that the user is authorized to conduct a transaction.

Responsive to the at least one input received from a consumer and a determination that the consumer is authorized to receive the notes requested, a controller 52 operates to dispense one and usually several currency bills from one or several note storage areas 626, 628, 630 in which the bills are stored. This may include for example dispensing one or more twenty dollar bills from the storage area where the twenty dollar bills are stored and one or more ten dollar bills from another storage area where ten dollar bills are stored. The number of notes removed from the storage areas 626, 628, 630 and their denominations will have a value equal the amount of money the consumer has requested to withdraw from the machine 600.

In this exemplary embodiment a controller 52 operates the transports and gates so that the notes the user has requested are accumulated into a stack in the stacker mechanism 654. The stack of notes accumulated are then moved as a stack from the stacker mechanism 654 to the outlet 652 of the consumer note outlet transport 650. The stack is delivered through the opening 620 in the housing 608 to the consumer.

Figure 59:
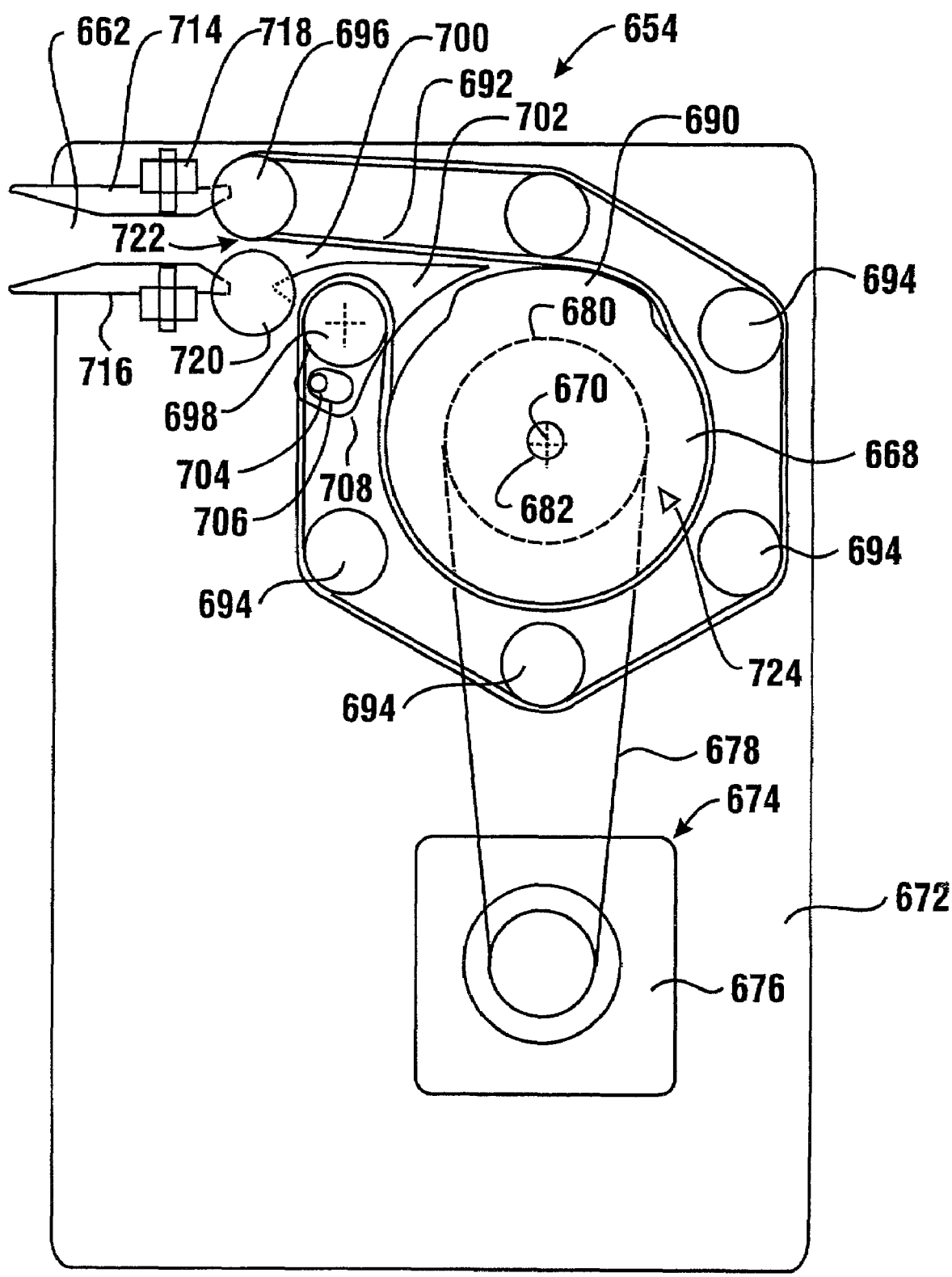
FIG. 59 is a side schematic view of a stacker mechanism used in conjunction with a note storage and dispensing mechanism of FIG. 57.

FIGS. 59-66 are representative of the stacker mechanism 654 and its operation. As shown in FIG. 59, the exemplary form of the stacker mechanism 654 includes a stack support member 668. The stack support member 668 is a generally cylindrical member that is rotatable about an axis 670. Stack support member 668 is rotatably mounted relative to a frame portion 672 which is in supporting connection with the housing 608 of the machine 600. The stack support member 668 is in operative connection with a drive 674. The drive 674 is operative to selectively rotate the stack support member 668 in response to signals from the one or more controllers 52 operating in the machine 600. In the exemplary embodiment the drive 674 includes a stepper motor 676 which rotates the stack support member 668 through movement of a drive belt 678. The drive belt 678 is connected to a pulley 680 which drives the stack support member 668 through a shaft 682.

Figure 66:
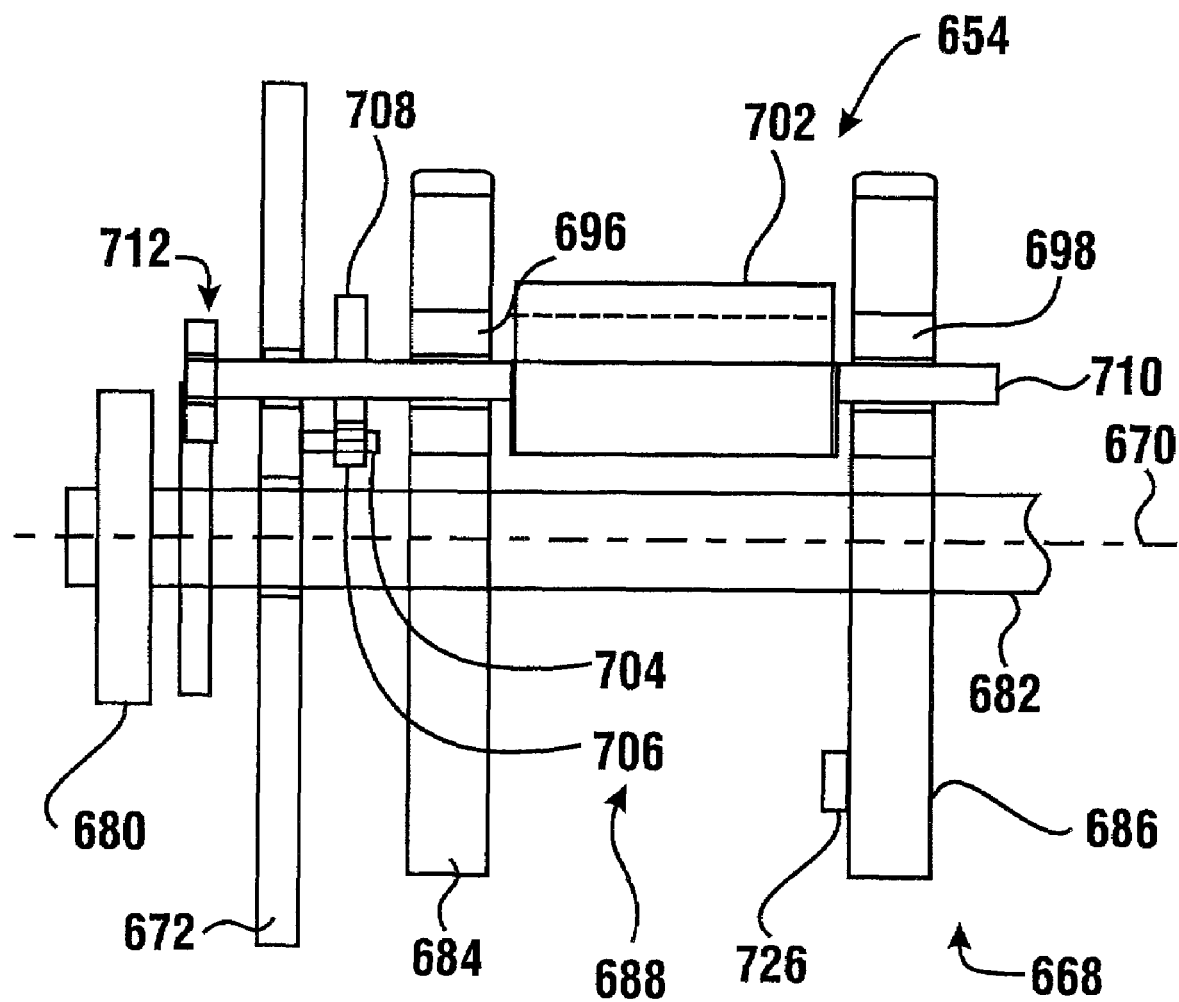
FIG. 66 is a front schematic view of the stacker mechanism shown in FIG. 59.

As shown in FIG. 66, in an exemplary embodiment the stack support member 668 includes a pair of disposed disk shaped rotatable portions 684, 686. The rotatable portions 684, 686 bound an arcuate recess 688 which extends between the rotatable portions 684, 686. It should be understood however that this configuration of the stack support member 668 is exemplary and in other embodiments other configurations of the stack support member may be used.

As shown in FIG. 59 the exemplary stack support member 668 includes a radially outward projecting portion 690. The projecting portion 690 is arcuately elongated in the exemplary embodiment for purposes that will be later discussed in detail.

A flexible member 692 extends in generally surrounding relation of the stack support member 668. The flexible member 692 in the exemplary embodiment includes a continuous belt that is supported on a plurality of arcuately spaced supports 694. In the exemplary embodiment the arcuately spaced supports 694 include rotating members such as rollers which rotate in supporting connection with the frame member 672.

The flexible member 692 in the exemplary embodiment includes a pair of continuous belts, each of which is supported on one of the rotatable portions 684, 686. It should be understood that this flexible member configuration is exemplary of arrangements that may be used. The flexible member 692 extends between an entry support 696 and an end support 698. The supports generally cause the flexible member 692 to surround the stack support member 668 except in an opening area 700 which extends between the entry and end supports. As later discussed, notes in this embodiment are enabled to move through the opening area 700 to and from supported connection with the stack support member 668.

A gate member 702 is mounted adjacent to the opening area 700. The gate member 702 is coaxially mounted in the exemplary embodiment with the end support 698. Gate member 702 is configured to rotate between first and second positions in a manner later discussed. The extent of travel of gate member 702 is controlled. In the exemplary embodiment this is done using a stop projection 704 which extends in a slot 706 in a member 708. As shown in FIG. 66 in the exemplary embodiment the gate member 702 is supported on a shaft 710 which is journaled in the frame portion 72. The end support 698 comprises a pair of disposed rollers that are journaled to freely rotate on the shaft 710. As a result the rollers which comprise the end support 698 are enabled to move responsive to the movement of the flexible member 692. The member 708 is connected to the shaft 710 so as to control the extent of movement thereof and to thereby limit the extremes of travel of the gate member 702.

The movement of the gate member 702 is controlled responsive to the movement of the stack support member 668 in the exemplary embodiment. A limited slip drive 712 operatively connects shaft 682 and shaft 710. In the exemplary embodiment the limited slip drive 712 is a slipping belt type drive of the type previously described for orienting a gate in the passage area. Of course in other embodiments a limited slip drive may be used which includes rollers, clutches or other devices which provide movement of the gate member. Alternatively solenoids and other independently actuatable moving devices may also be provided for controlling the position of the gate in other embodiments. Alternatively embodiments may also encompass passive gate devices or gate devices that operate and position responsive to the movement of supports or other mechanisms. It should be appreciated that the embodiment shown is exemplary and those skilled in the art will be able to devise other structures which employ the features described herein.

As shown in FIG. 59 the throat area 662 is bounded by upper and lower guides 714, 716. An entry sensor 718 is positioned adjacent to the throat area 662 for purposes of sensing notes passing therein. The guides 714 and 716 also operate to guide notes to and from the stack support member 668. The exemplary form of the guides 714, 716 include tapered sections adjacent their end portions so as to facilitate the guiding of notes therethrough.

A nip roll 720 is positioned adjacent to entry support 696. Nip roll 720 in the exemplary embodiment is movably mounted and biased toward support 696 so as to achieve engagement therewith. As a result nip roll 720 is enabled to rotate with support 696 and move in coordinated relation with the flexible member 692 supported thereon. The nip roll 720 also moves in engagement with the lower surface of notes that pass into the opening area 700. The support 696 and the nip roll 720 form a first nip generally indicated 722 to engage and move notes between the opening area 700 and the throat area 662.

The stacker mechanism 654 further includes at least one position sensor schematically indicated 724. The position sensor 724 is operative to sense at least one rotational position of the stack support member 668. The position sensor 724 may be any one of numerous types of sensors such as optical sensors, mechanical sensors, magnetic sensors, encoders or any other type sensor suitable for sensing at least one rotational position of the stack support member. In the exemplary embodiment position sensor 724 is an optical sensor which senses the position of a homing projection 726 shown in FIG. 66. In the exemplary embodiment the position of the homing projection 726 is sensed to determine when the stack support member 668 is in a reference or a "home" position. Once a controller 52 knows that the stack support member 668 is in the reference position, a controller 52 is enabled to control the drive 674 in the manner later discussed so as to position the stack support member 668 and other components of the machine 600 in the manner desired to achieve the stacking and delivery of notes.

The operation of the exemplary embodiment of the stacker mechanism 654 will now be explained. The machine 600 operates responsive to the at least one input provided by a user of the machine 600. A controller 52 operates responsive to the at least one input to cause notes that are to be provided to the customer to be moved from the storage areas 626, 628, 630 toward the consumer note outlet transport section 650. The notes 660 in this exemplary embodiment move individually and are diverted in the consumer note outlet transport section 650 by the gate 658 to move into the throat area 662 between the guides 714 and 716 in the manner shown in FIG. 67.

Figure 60:
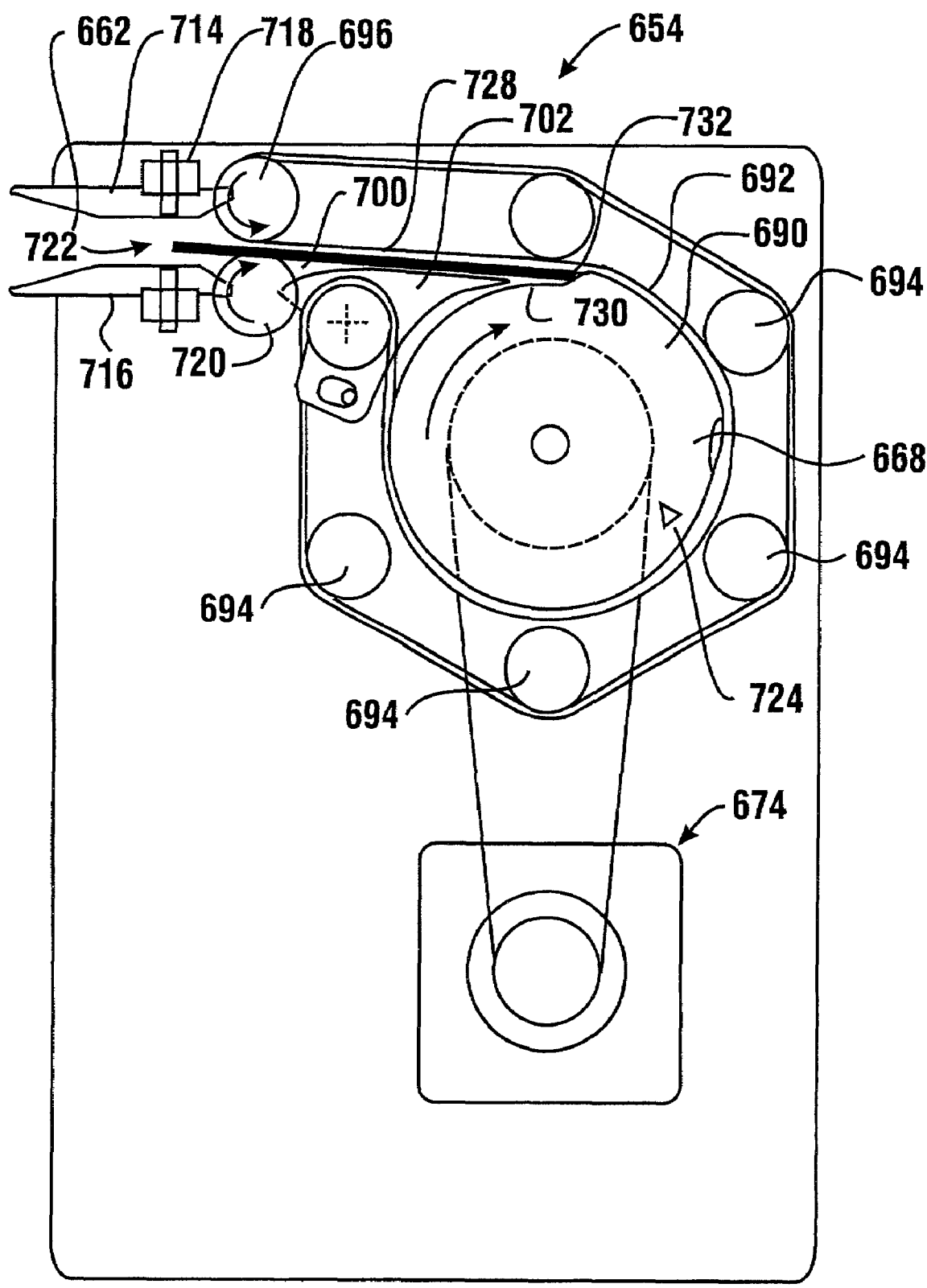
FIGS. 60-63 are views of the stacker mechanism shown in FIG. 59 receiving notes and accumulating a stack of notes.

As represented in FIG. 60, when a note 728 passes into the throat area 662, it is sensed by the entry sensor 718. A controller 52 in the machine 600 operates responsive to sensing the note position to begin operating the drive 674. A controller 52 operates to cause the stack support member 668 to rotate in a clockwise direction as note 728 moves into the opening area 700. As can be appreciated, the flexible member 692 is engaged with the stack support member 668 in the vicinity of the projecting portion 690. As a result movement of the stack support member 668 also moves the flexible support member 692. Movement of the flexible member 692 in coordinated relation with the stack support member 668 also causes the entry support 696 and the nip roll 720 to rotate in coordinated relation to accept note 728 therein. As a result note 728 is drawn through nip 722 into the opening area 700.

In the exemplary embodiment coordinated movement of the flexible member 692 responsive to movement of the stack support member 668 provides greater assurance that a controller 52 may accurately move and control the position of the notes 728. In the exemplary embodiment assurance that the flexible member 692 and a stack support member 668 do not substantially slip relative to one another, is enhanced by the configuration of the arcuately spaced supports 694 and the arcuately elongated projecting portion 690. As can be appreciated from FIG. 60, when the projecting portion 690 is adjacent to and disposed radially inward from a support 694, the flexible member 692 is placed in sandwiched relation between the support 694 and the projecting portion 690. This results in the application of a radial force on the flexible member 692 which helps to assure that it does not substantially slip relative to the stack support member 668.

In addition in the exemplary embodiment the projecting portion 690 is arcuately elongated so that regardless of the rotational position of the stack support member 668, the flexible member 692 is always placed in sandwiched relation between the projecting portion 690 and at least one adjacent support 694. In this way the flexible member 692 is solidly engaged with the stack support member 668 and urged to move in coordinated relation therewith. As will be appreciated from the following discussion, this coordinated movement of the flexible member 692 with the stack support member 668 helps to assure that notes 728 that are in stacked relation on the stack support member 668 remain generally aligned in a stack and do not substantially "shingle" relative to one another which may disturb the integrity of the stack or interfere with the operation of the stacker mechanism 654.

As shown in FIG. 60, rotation of the stack support member 668 causes the gate member 702 to rotate to its limit of travel in a clockwise direction to a first position. In the first position the gate member 702 is positioned to help guide note 728 through the opening area 700. The gate member 702 in the first position also helps guide the note 728 onto a stack supporting surface 730 of the stack support member 668. In this embodiment the stack supporting surface 730 is an arcuate surface positioned in arcuately disposed relation with the projecting portion 690. As can be appreciated from FIG. 60, the projecting portion 690 and the stack support surface 730 cause a pocket-like area to be provided trailing the projecting portion 690, which area is bounded by the stack support surface and the flexible member into which the note 728 may move.

Figure 61:
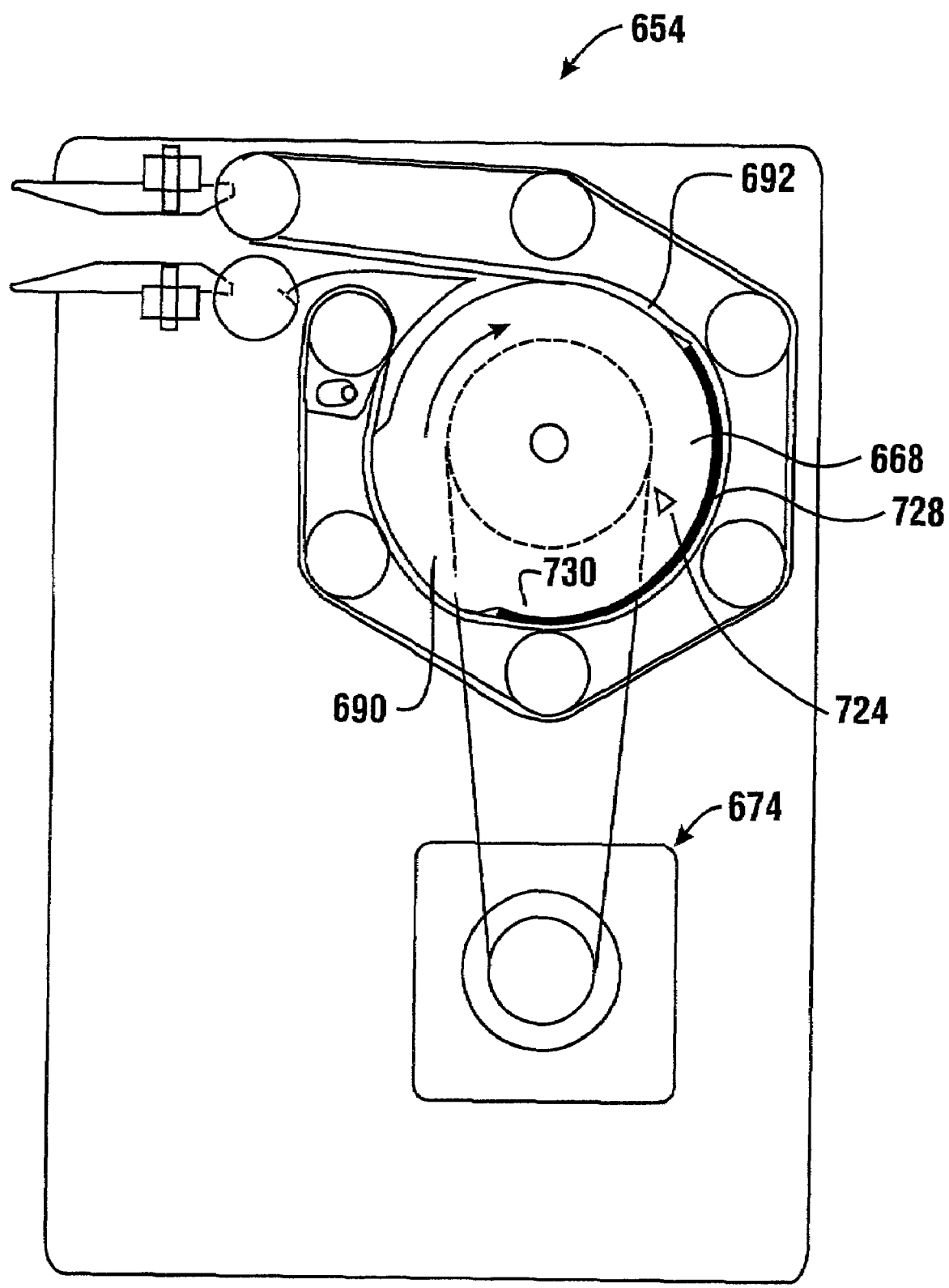

As the stack support member 668 moves further in the clockwise direction from the position shown in FIG. 60, the note 728 is engaged in a nip generally indicated 732 that is formed by the flexible member 692 and the stack support surface 730. As is further represented in FIG. 61, because the flexible member 692 is supported on and wraps around the stack support member 668 as the stack support member 668 rotates in the clockwise direction the note 728 is engaged in intermediate trapped relation between the stack support surface 730 and the flexible member 692. As represented in FIG. 61, rotation of the stack support member 668 eventually causes generally the full length of the note 728 in the direction of movement to be engaged with the stack support member 668.

Figure 62:
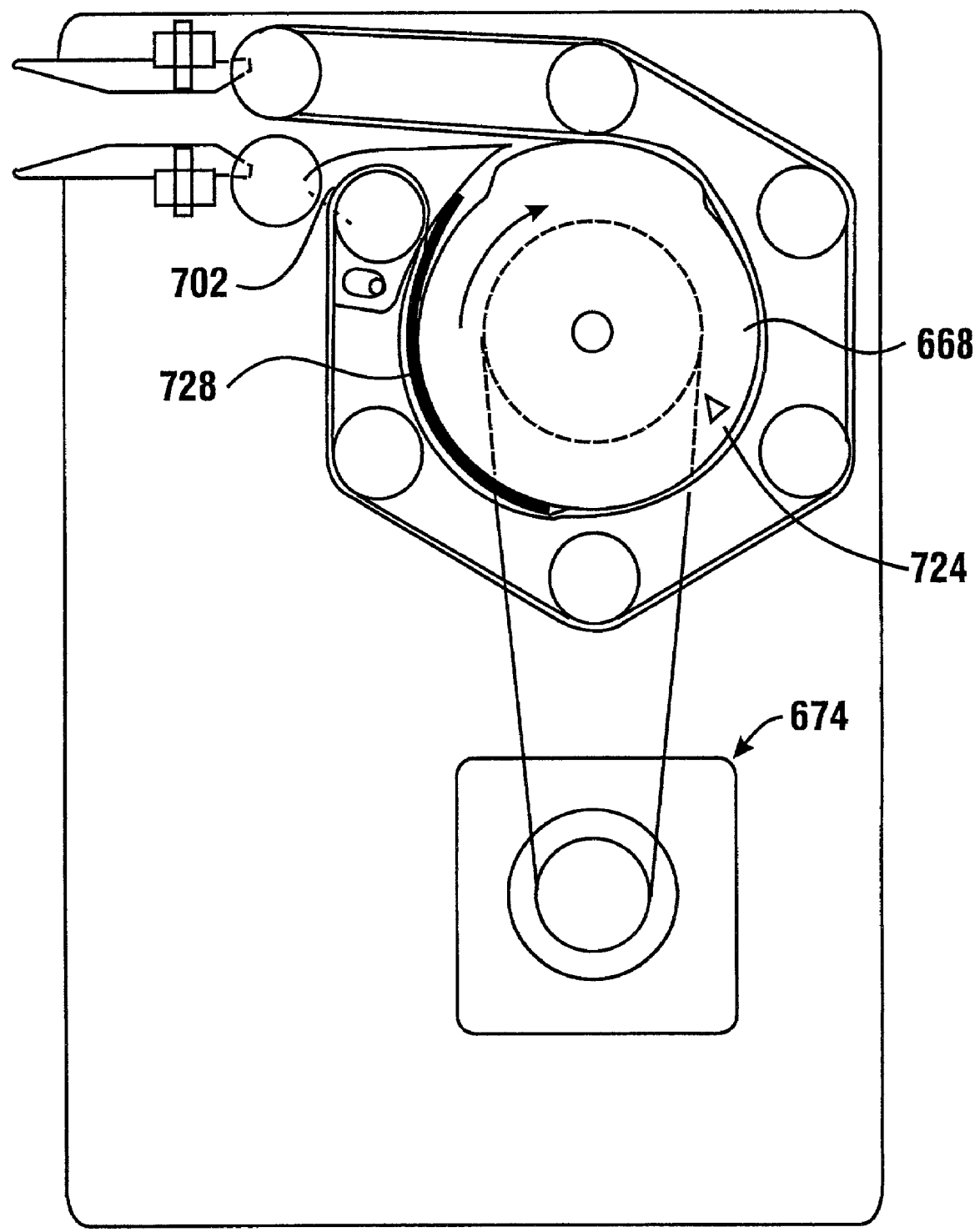

The stack support member 668 eventually rotates clockwise until the sensor 724 senses that the stack support member 668 has reached the reference position. Once in this position a controller 52 may operate to cause the drive 674 to stop. As a result the stack support member 668 is positioned as shown in FIG. 62 with the note 728 engaged therewith.

It should be understood that in circumstances where only a single note is going to be delivered to a customer, the stacker member may operate from this position so as to deliver a stack which comprises only a single note, out of the machine 600 to the consumer. However, in most circumstances additional notes delivered from the storage areas are added to the stack and then a stack comprising a plurality of notes is delivered out of the machine 600 to a user.

Figure 63:
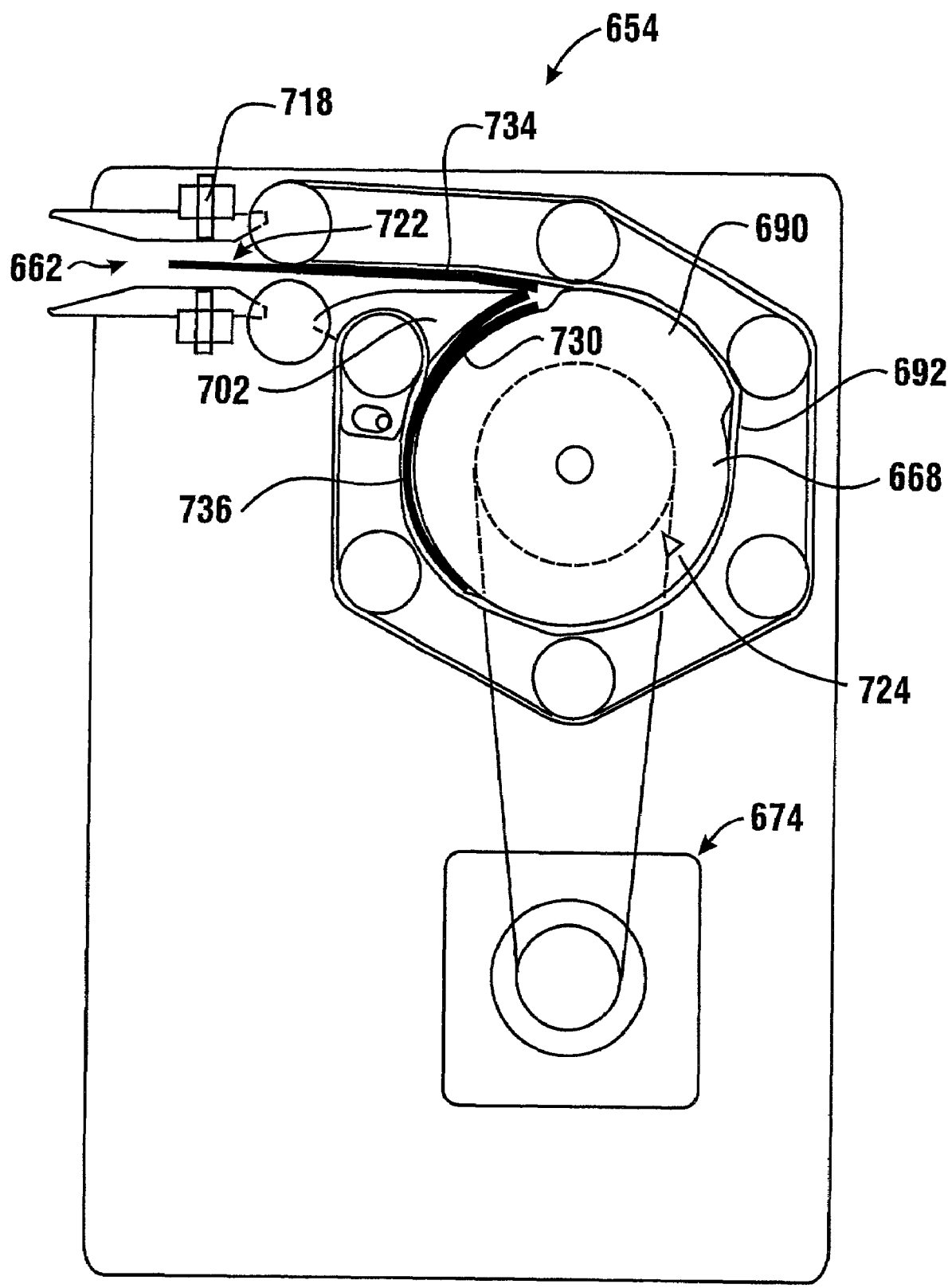
Figure 64:
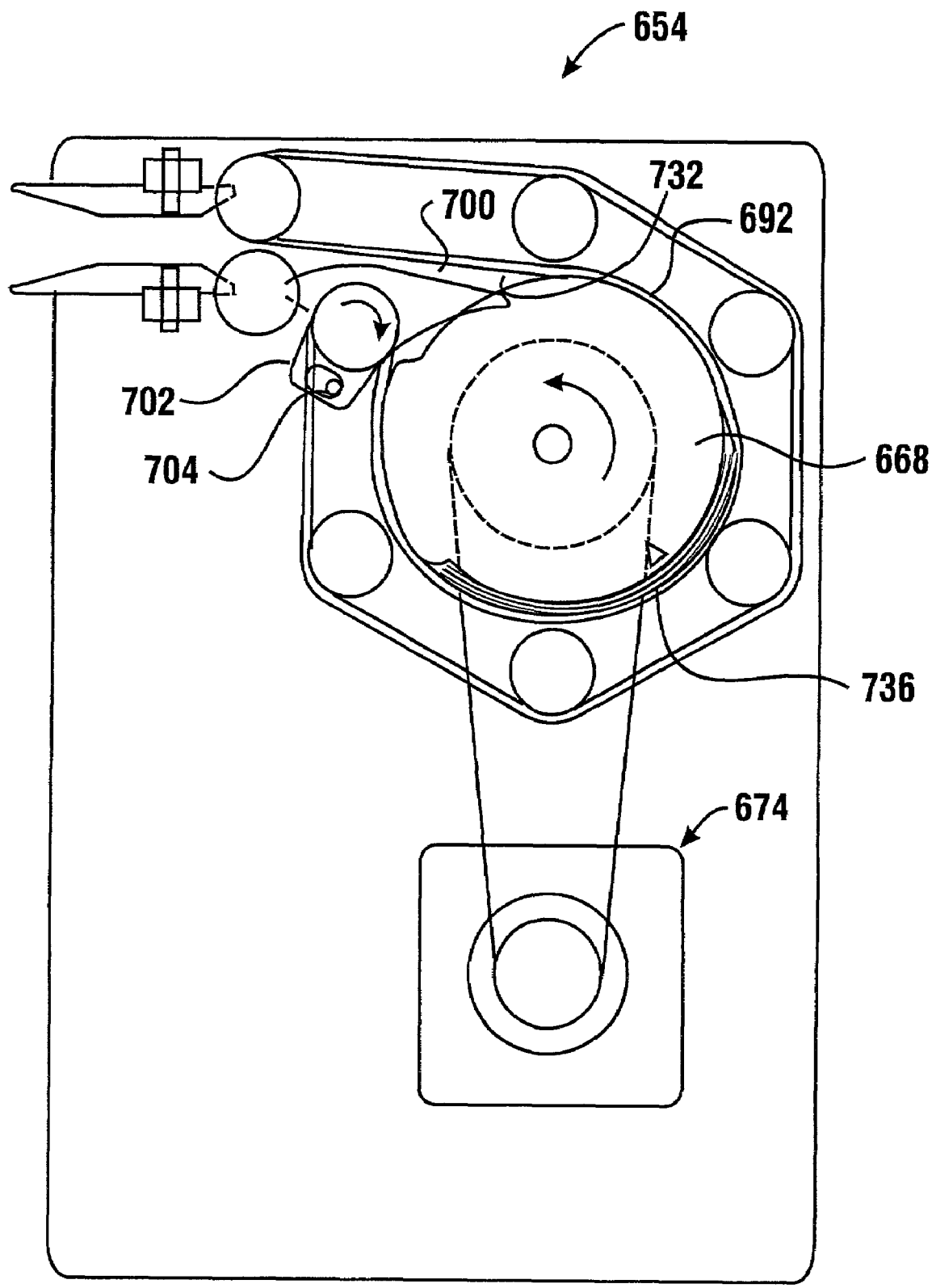
FIGS. 64-65 are views of the stacker mechanism shown discharging a stack of notes that have been accumulated in the stacker mechanism.

FIGS. 63 and 64 represent additional notes being added to the stack. Upon the entry sensor 718 sensing a further note positioned in the throat area 662 adjacent to the nip 722, a controller 52 begins operating the drive 674. A note represented by reference numeral 734 in FIG. 63, is pulled through the first nip 722 as the stack support member 668 rotates. The movement of the note 734 and the stack support member 668 is coordinated so that the note 734 engages the existing notes in a stack 736 in generally aligned relation. This is facilitated in this exemplary embodiment because the flexible member 692 is driven by rotation of the stack support member 668, and the leading edge of note 734 reaches the stack support surface 730 so that it is generally aligned with the leading edges of other notes in the stack. As can be appreciated, the gate member 702 in this embodiment operates to apply a somewhat compressive force on notes in the stack 736 as the notes are moved past the inside surface of the gate member 702. Of course it should be remembered that in the exemplary embodiment the gate member 702 is moved by a limited slip clutch so that the force applied by the gate member 702 is controlled so that the gate member 702 does not apply so much force that the notes in the stack are misaligned or otherwise significantly disturbed from their stacked condition.

Further rotation of the stack support member 668 in the clockwise direction from that shown in FIG. 63 results in note 734 being integrated into the stack 736. In the exemplary embodiment, stack support member 668 continues to rotate until it reaches the reference position as sensed by position sensor 724. In this position the stack support member 668 is ready to receive further notes into the stack 736 or to deliver the stack 736 in a manner which will now be discussed.

When a controller 52 determines that the notes which have been requested by the consumer have been placed in stacked relation in the stacker mechanism 654, a controller 52 operates to disengage the stack 736 from the stacker mechanism 634. To accomplish this, a controller 52 causes the drive 674 to rotate a stack support member 668 in a direction opposite to that in which the stack support member 668 moves when the stack 736 is being accumulated. This is represented by the counterclockwise rotation of stack support member 668, as shown in FIG. 64. As the stack support member 668 rotates in a counterclockwise direction, the stack 736 is moved in intermediate relation between the stack support member 668 and flexible member 692 toward the nip 732 where the flexible member 692 engages the stack support member.

As the stack support member 668 rotates counterclockwise as shown in FIG. 64, the gate member 702 rotates in a clockwise position as shown. As the gate member 702 moves to this note dispensing position the inward end of the gate member 702 extends in the arcuate recess 688 between the rotatable portions of the stack support member 668, illustrated in FIG. 66. In the exemplary embodiment the extent of movement of the gate member 702 is limited by the stop projection 704. As the stack 736 moves through the area of the nip 732, the gate member 702 extends below the stack to help guide it through the opening area 700.

Figure 65:
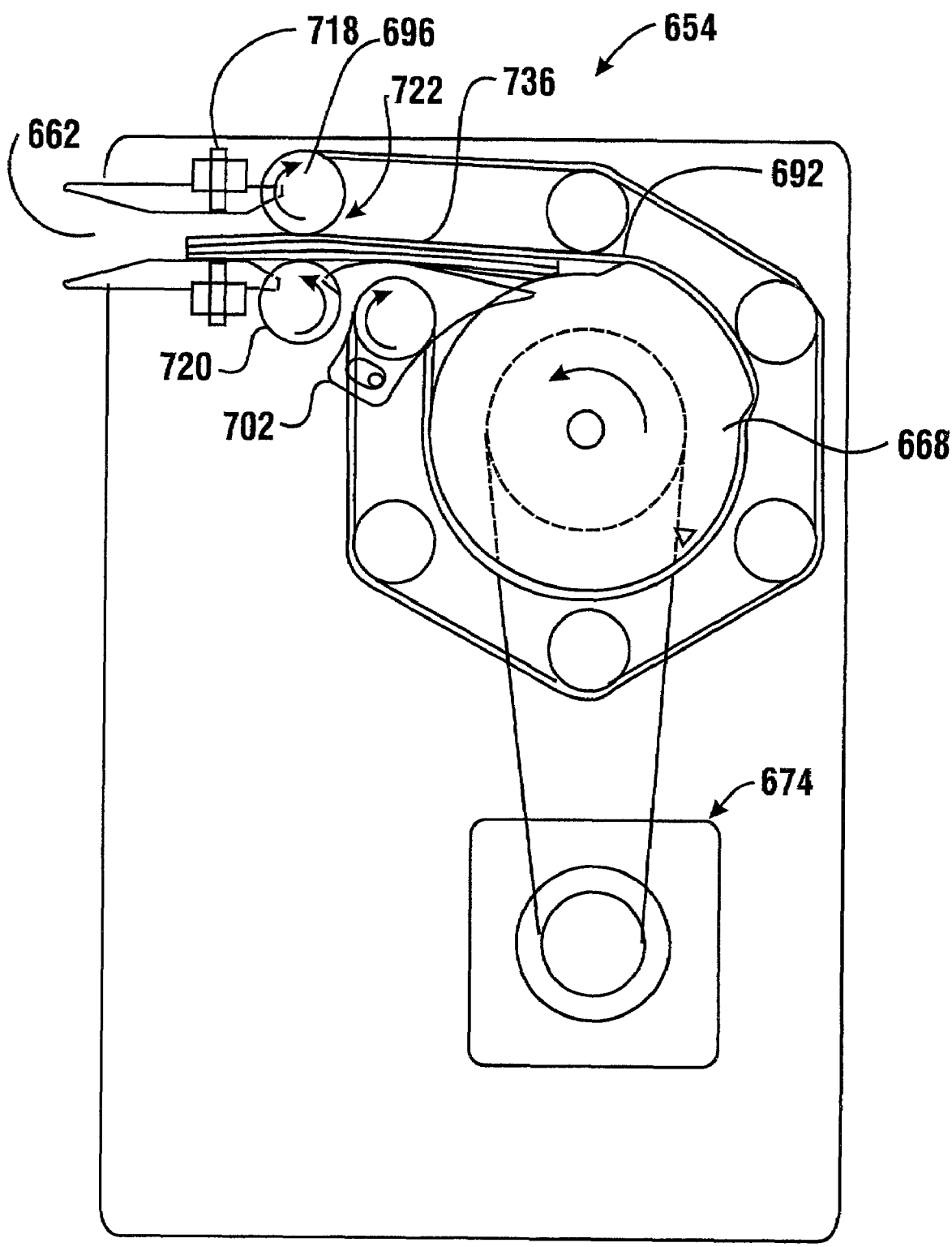

As shown in FIG. 65, as the stack support member 668 rotates further the stack 736 moves away from the stack support member 668 in engagement with the flexible member 692. The stack 736 is engaged in the nip 722 between the entry support 696 and the nip roll 720. In the exemplary embodiment the nip roll 720 is biased toward the entry support 696 but is enabled to move away therefrom to the extent necessary to pass stack 736 through the nip 722. This arrangement in the exemplary embodiment facilitates movement of the stack 736 responsive to movement of the entry support 696 and flexible member 692. Of course in other embodiments other approaches to moving the stack 736 may be used.

As the stack 736 is disengaging from the stack support member 668, the position of the stack 736 is sensed by the entry sensor 718. A controller 52 operates in response to the sensing of the stack 736 by the entry sensor 718 to continue rotating stack support member 668 to disengage the stack 736 therefrom. In this exemplary embodiment a controller continues to move the stack support member 668 until the stack 736 is sensed as having passed the sensor 718 in the throat area. A controller 52 then operates to cause the drive 674 to return the stack support member 668 to the reference position so that the stacker mechanism 654 is again ready to receive notes.

As shown in FIG. 68 as the stack 736 passes out of the throat area 662 it is engaged by the note moving members 664 and 666. A controller 52 operates to cause the gate 658 to move to the position shown in FIG. 68 which enables the stack 736 to move in the consumer note outlet transport section 650 toward the outlet 652.

The stack engages drive rolls 738, 740 and 742 which move the stack 736 toward the outlet 652. A controller 52 also causes the cover 622 to be moved by an actuator to an open position. This enables the stack 736 to pass outward through opening 620 of machine 600 shown in FIG. 58.

In the exemplary embodiment the drive rolls 738, 740 and 742 are rolls comprised of resilient material which are adapted to move the stack 736 in engagement therewith. It should be understood however that in other embodiments, other types of note moving devices may be used.

The exemplary embodiment of a stacker mechanism 654 enables the stacking of notes in generally aligned relation. The exemplary embodiment further enables the notes to be stacked generally without relative movement which is facilitated by the coordinated movement of the stack support member 668 and the flexible member 692. The apparatus further facilitates building a stack 736 including a plurality of notes and then delivering the stack 736 in a manner which may be quickly taken by the customer.

A further advantage of embodiments may be that notes to be dispensed can be arranged in a particular order. This may be accomplished for example through programming of a controller. For example notes of particular denominations can be stacked initially and then followed by other denominations. This may facilitate the user verifying the funds they have received. Alternatively additional notes or other items such as promotional coupons, receipts or other items that the machine operator wishes to have positioned on top, for example so they will be noticed by a consumer, can be moved through a note transport and placed on the top of the stack as it is delivered from the machine. Of course the opposite may also be achieved by placing selected notes at the bottom of the stacks. Various approaches may be taken depending on the types of notes being dispensed and the requirements of the machine operator.

While the exemplary embodiment of the stacker mechanism is used for accumulating and presenting stacks for purposes of dispensing notes, in other embodiments the principles described herein may be applied for other purposes. For example, similar principles may be used for note storage. This may include for example accumulating and storing currency bills that are placed in the machine. Other embodiments may use such principles for accumulating checks, deposit tickets, vouchers, receipts or other documents that it may be desirable to store and then recover in a stack. Other applications for use of the exemplary embodiments described herein will be apparent to those having skill in the relevant art.

Thus the exemplary forms of automated transaction machines of the present invention achieve one or more of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
   (a) engaging a first note in supporting connection with a generally cylindrical stack support member between the stack support member and a flexible member as the stack support member rotates in a first direction in an automated transaction machine, wherein the stack support member includes at least one projecting portion;
   (b) engaging a second note in generally aligned relation with the first note and in supporting connection with the stack support member while the stack support member rotates further in the first direction in coordinated relation with the flexible member, whereby the generally aligned first and second notes comprise a stack, wherein the at least one projecting portion engages the flexible member such that the flexible member moves responsive to movement of the stack support member, wherein the stack support member and flexible member move in coordinated relation;
   (c) disengaging the stack from the supporting connection with the stack support member while the stack support member rotates in a second direction with the at least one projecting portion engaging the flexible member such that the flexible member moves responsive to movement of the stack support member in coordinated relation with the stack support member, wherein the second direction is opposed of the first direction.

2. The method according to claim 1 and further comprising prior to step (c):
   repeating step (b) with at least one further note, whereby the at least one further note is placed in the stack.

3. The method according to claim 1 and further comprising:
   (d) presenting the stack through an opening in a housing of the automated transaction machine, wherein the stack is accessible from outside the automated transaction machine.

4. The method according to claim 1 wherein step (b) comprises engaging the second note between the stack support member and the flexible member.

5. The method according to claim 1 wherein step (b) comprises engaging the second note between the first note and the flexible member.

6. The method according to claim 1 wherein in step (b) the flexible member moves so that the first and second notes generally do not move relative to one another in the stack.

7. The method according to claim 1, and further comprising a plurality of arcuately spaced supports adjacent to the stack support member, and wherein the at least one projecting portion is configured so that in step (b) and in step (c) the flexible member is always disposed in intermediate relation between the at least one projecting portion and at least on arcuately spaced e support, wherein the flexible member is operatively engaged to move with the stack support member generally without slipping.

8. The method according to claim 1, and further comprising a plurality of arcuately spaced supports adjacent the stack support member, and wherein the at least one projecting portion includes an arcuately elongated projecting portion, wherein in step (b) and step (c) the flexible member is always disposed in intermediate relation between the arcuately elongated projecting portion and at least one arcuately spaced support, wherein the flexible member is operatively engaged to move with the stack support member generally without slipping.

9. The method according to claim 8, wherein at least one of the arcuately spaced supports comprises a rotating member, and wherein in step (b) and in step (c) the rotating member rotates when the arcuately elongated projecting portion is adjacent and in a position radially inwardly disposed from the rotating member.

10. The method according to claim 1 wherein the flexible member extends in generally surrounding relation of the stack support member, and wherein in step (b) the first and second notes are held in supporting connection with the stack support member by the flexible member.

11. The method according to claim 10 and further including an opening area wherein the flexible member does not surround the stack support member in the opening area, and wherein in step (c) the stack moves away from the stack support member through the opening area.

12. The method according to claim 11, and further including a gate member adjacent to the opening area, wherein in step (a) and in step (b) the gate member is in a first position, and wherein in step (c) the gate member is in a second position disposed of the first position.

13. The method according to claim 12, wherein the stack support member includes an arcuate recess, and wherein in step (c) the gate member extends in the recess.

14. The method according to claim 1 and prior to step (a) comprising moving the first note from a first storage area in the automated transaction machine.

15. The method according to claim 14, and prior to step (b) comprising moving the second note from a second storage area in the automated transaction machine.

16. The method according to claim 15, wherein the automated transaction machine includes a user interface, and prior to step (a) comprising receiving at least one input through at least one input device of the user interface from a user, wherein the first note is moved from the first storage location responsive to the at least one input.

17. The method according to claim 16, and after step (c) further comprising:
(d) delivering the stack from the automated transaction machine to the user.

18. The method according to claim 17, and prior to step (a) moving a note transport gate to a directing position wherein notes from the first and second storage areas are directed to move in the automated transaction machine to engage the stack support member.

19. The method according to claim 18, and prior to step (d) comprising:
moving the note transport gate from the directing position to a delivery position, wherein the stack is moved past the note transport gate toward delivery to the user.

20. The method according to claim 14, wherein the automated transaction machine includes at least one sensor and prior to step (a) comprising:
sensing with the sensor the first note, wherein the stack support member rotates in step (a) responsive to sensing the first note with the sensor.

21. The method according to claim 20, and prior to step (b) comprising:
sensing with the sensor the second note, wherein the stack support member rotates in step (b) responsive to sensing the second note with the sensor.

22. The method according to claim 1 wherein at least one of the first or second notes comprises a sheet which is not a currency note.

23. A method comprising:
(a) engaging a first note in supporting connection with a generally cylindrical stack support member as the stack support member rotates in a first direction in an automated transaction machine, including engaging the first note between the stack support member and a flexible member extending in generally surrounding relation of the stack support member;
(b) engaging a second note in generally aligned relation with the first note and in supporting connection with the stack support member while the stack support member rotates further in the first direction, wherein the first and second notes are held in supporting connection with the stack support member by the flexible member, whereby the generally aligned first and second notes comprise a stack;
(c) disengaging the stack from the supporting connection with the stack support member while the stack support member rotates in a second direction opposed of the first direction, wherein the stack moves away from the stack support member through an opening area wherein the flexible member does not surround the stack support member;
wherein in step (a) and in step (b) a gate member adjacent to the opening area and in operative connection with the stack support member is in a first position, wherein in step (c) the gate member is in a second position disposed of the first position, and wherein the gate member moves to the second position responsive to movement of the stack support member in the second direction.

24. A method comprising:
(a) engaging a first note in supporting connection with a generally cylindrical stack support member as the stack support member rotates in a first direction in an automated transaction machine, including engaging the first note between the stack support member and a flexible member extending in generally surrounding relation of the stack support member, wherein the flexible member is in operative connection with the stack support member;
(b) engaging a second note in generally aligned relation with the first note and in supporting connection with the stack support member while the stack support member rotates further in the first direction, wherein the first and second notes are held in supporting connection with the stack support member by the flexible member, whereby the generally aligned first and second notes comprise a stack;
(c) disengaging the stack from the supporting connection with the stack support member while the stack support member rotates in a second direction opposed of the first direction, wherein the stack moves away from the stack support member through an opening area wherein the flexible member does not surround the stack support member;
wherein in step (a) and in step (b) a gate member adjacent to the opening area and in operative connection with the flexible member is in a first position, wherein in step (c) the gate member is in a second position disposed of the first position, and wherein the gate member moves to the second position responsive to movement of the flexible member.

25. A method comprising:
(a) rotating a generally cylindrical stack support member in a first rotational direction to cause at least one first note to be positioned between the stack support member and a flexible member extending in generally surrounding relation of the stack support member, wherein the stack support member includes at least one projecting portion, wherein stack support member rotation is operative to cause movement of the flexible member during engagement of the at least one projecting portion with the flexible member; and
(b) further rotating the stack support member in the first rotational direction to cause at least one second note to be positioned in stacked relation with the at least one first currency note between the flexible member and the stack support member.

26. The method according to claim 25 wherein in both step (a) and step (b) the at least one projecting portion engages the flexible member such that the flexible member moves responsive to movement of the stack support member.

27. The method according to claim 26, wherein the at least one projecting portion comprises an arcuately elongated projecting portion, wherein during step (a) and step (b) the arcuately elongated projecting portion is in engaged with the flexible member.

28. The method according to claim 25 wherein step (b) includes engaging the at least one second note between the at least one first note and the flexible member.

29. The method according to claim 25, and further comprising:

(c) prior to step (a), removing the at least one first note from at least one first note storage area in an automated transaction machine; and (d) prior to step (b), removing the at least one second note from at least one second note storage area in the automated transaction machine.

30. The method according to claim 29 and further comprising:
(e) removing the first and second notes in stacked relation from between the flexible member and the stack support member.

31. The method according to claim 30, wherein step (e) includes rotating the stack support member in a second direction opposed of the first direction.

32. The method according to claim 31, and further comprising:
(f) prior to step (e), moving a gate member from a first position wherein notes are directed to engage the stack support member, to a second position wherein notes are directed to disengage the stack support member.

33. The method according to claim 30 wherein step (e) includes removing a stack comprising the at least one first note and the at least one second note, and subsequent to step (e) further comprising: delivering the stack from the automated transaction machine.

34. The method according to claim 25, wherein the at least one first note comprises at least one currency note and the at least one second note includes at least one promotional sheet 35. The method according to claim 25 wherein the automated transaction machine includes a user interface including at least one user input device, wherein the automated transaction machine is operative to execute steps (a) and (b) responsive to at least one input to the at least one user input device.

36. The method according to claim 25 wherein at least one of the at least one first or second notes comprises a sheet which is not a currency note.

37. The method according to claim 25 wherein the at least one first note comprises at least one currency note and at least one second note comprises a sheet which is not a currency note.

* * * * *